United States Patent
Yamada et al.

(10) Patent No.: US 8,064,144 B2
(45) Date of Patent: Nov. 22, 2011

(54) ZOOM LENS SYSTEM, IMAGING DEVICE AND CAMERA

(75) Inventors: Katsu Yamada, Osaka (JP); Keiki Yoshitsugu, Hyogo (JP); Shunichiro Yoshinaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/676,231

(22) PCT Filed: Sep. 11, 2008

(86) PCT No.: PCT/JP2008/002516
§ 371 (c)(1),
(2), (4) Date: Mar. 3, 2010

(87) PCT Pub. No.: WO2009/034713
PCT Pub. Date: Mar. 19, 2009

(65) Prior Publication Data
US 2010/0177217 A1  Jul. 15, 2010

(30) Foreign Application Priority Data

Sep. 12, 2007 (JP) ................. 2007-236924
Sep. 12, 2007 (JP) ................. 2007-236925
Jul. 4, 2008 (JP) ................. 2008-175474

(51) Int. Cl.
*G02B 15/14* (2006.01)
(52) U.S. Cl. ................................ 359/687
(58) Field of Classification Search .......... 359/687
See application file for complete search history.

(56) References Cited

U.S. PATENT DOCUMENTS

| 5,561,560 | A | 10/1996 | Tsutsumi |
| 5,737,127 | A | 4/1998 | Tsutsumi |
| 6,282,032 | B1 | 8/2001 | Tomita |
| 7,443,602 | B2 * | 10/2008 | Kushida et al. ......... 359/683 |
| 2003/0007256 | A1 | 1/2003 | Usui et al. |

(Continued)

FOREIGN PATENT DOCUMENTS

JP  07-248449 A  9/1995
(Continued)

OTHER PUBLICATIONS

International Search Report for PCT/JP2008/002516.

*Primary Examiner* — William Choi
(74) *Attorney, Agent, or Firm* — Pearne & Gordon LLP

(57) ABSTRACT

A zoom lens system according to the present invention, from an object side to an image side, comprises a first lens unit having positive optical power, a second lens unit having negative optical power, a third lens unit having positive optical power, and a fourth lens unit having positive optical power. In zooming, the first to the fourth lens units all move along the optical axis. The condition (8): $0.15<dG3/dG<0.27$ is satisfied (where, $16<f_T/f_W$, $\omega>35$; dG3 is an optical axial center thickness of the third lens unit; dG is a sum of the optical axial thicknesses of the first to the fourth lens units; $\omega$ is a half view angle at a wide-angle limit; $f_T$ is a focal length of the entire system at a telephoto limit; and $f_W$ is a focal length of the entire system at a wide-angle limit). As a result, the zoom lens system has a reduced size and still realizes a wide view angle at a wide-angle limit, as well as a remarkably high zooming ratio and high performance.

3 Claims, 29 Drawing Sheets

U.S. PATENT DOCUMENTS

| | | |
|---|---|---|
| 2005/0180024 A1 | 8/2005 | Toyama |
| 2006/0072213 A1 | 4/2006 | Shibayama et al. |
| 2006/0132928 A1 | 6/2006 | Nakatani et al. |
| 2006/0140606 A1 | 6/2006 | Terada et al. |
| 2006/0221460 A1 | 10/2006 | Saruwatari |
| 2006/0291070 A1 | 12/2006 | Terada et al. |
| 2007/0070524 A1 | 3/2007 | Sato |
| 2008/0100924 A1 | 5/2008 | Sato |

FOREIGN PATENT DOCUMENTS

| | | |
|---|---|---|
| JP | 08-114744 A | 5/1996 |
| JP | 11-072705 A | 3/1999 |
| JP | 2000-121939 A | 4/2000 |
| JP | 2000-321496 A | 11/2000 |
| JP | 2005-227494 A | 8/2005 |
| JP | 2006-106111 A | 4/2006 |
| JP | 2006-171655 A | 6/2006 |
| JP | 2006-184413 A | 7/2006 |
| JP | 2006-184416 A | 7/2006 |
| JP | 2006-189598 A | 7/2006 |
| JP | 2006-284763 A | 10/2006 |
| JP | 2006-285021 A | 10/2006 |
| JP | 2007-003554 A | 1/2007 |
| JP | 2007-010695 A | 1/2007 |
| JP | 2007-122019 A | 5/2007 |

\* cited by examiner

ZOOM LENS SYSTEM, IMAGING DEVICE AND CAMERA

TECHNICAL FIELD

The present invention relates to a zoom lens system, an imaging device and a camera. In particular, the present invention relates to: a zoom lens system having a reduced size and still realizing a wide view angle at a wide-angle limit, as well as a remarkably high zooming ratio and high performance; an imaging device employing this zoom lens system; and a thin and compact camera employing this imaging device.

BACKGROUND ART

Remarkably strong demands are present for improved performance of cameras such as digital still cameras and digital video cameras (simply referred to as digital cameras, hereinafter) provided with an image sensor for performing photoelectric conversion. In particular, in order that a single digital camera should be capable of covering a wide focal length range from a wide-angle condition to a high telephoto condition, cameras employing a zoom lens system having a remarkably high zooming ratio are strongly demanded from a convenience point of view. Further, in recent years, zoom lens systems are also desired that have a wide angle range where the photographing field is wide.

As zoom lens systems having high zooming ratios and suitable for the above-mentioned digital cameras, for example, the following zoom lens systems have been proposed.

For example, Japanese Laid-Open Patent Publication No. 2006-171655 discloses an image-taking optical system at least comprising a first lens unit having positive optical power, a second lens unit having negative optical power, a third lens unit having positive optical power, and a fourth lens unit having positive optical power, wherein any of the lens unit intervals is changed so that variable magnification is achieved, and wherein the ratio between the focal length of the third lens unit and the focal length of the fourth lens unit and the ratio between the focal length of the first lens unit and the focal length of the entire optical system at a wide-angle limit are set forth.

Japanese Laid-Open Patent Publication No. 2006-184413 discloses an image-taking optical system at least comprising a first lens unit having positive optical power, a second lens unit having negative optical power, a third lens unit having positive optical power, and a fourth lens unit having positive optical power, wherein at least the first lens unit is moved so that variable magnification is achieved, and wherein the ratio between the distance from the surface located on the most image-taking object side in the first lens unit at a wide-angle limit to the image formation surface and the focal length of the entire optical system at a telephoto limit and the ratio between the focal length of the first lens unit and the focal length of the entire optical system at a wide-angle limit are set forth.

Japanese Laid-Open Patent Publication No. 2006-184416 discloses an image-taking optical system at least comprising a first lens unit having positive optical power, a second lens unit having negative optical power, a third lens unit having positive optical power, and a fourth lens unit having positive optical power, wherein any of the lens unit intervals is changed so that variable magnification is achieved, and wherein the ratio between the focal length of the first lens unit and the focal length of the entire optical system at a wide-angle limit, the ratio between the ratio of the focal length of the second lens unit at a telephoto limit and at a wide-angle limit and the ratio of the focal length of the entire optical system at a telephoto limit and at a wide-angle limit, and the ratio between the magnification of the third lens unit at a telephoto limit and the magnification of the third lens unit at a wide-angle limit are set forth.

Japanese Laid-Open Patent Publication No. 2006-189598 discloses an image-taking optical system at least comprising a first lens unit having positive optical power, a second lens unit having negative optical power, a third lens unit having positive optical power, and a fourth lens unit having positive optical power, wherein the third lens unit at least includes two positive optical power lenses and one negative optical power lens, wherein at least the second, the third, and the fourth lens units are moved so that variable magnification is achieved, and wherein the ratio between the focal length of the first lens unit and the focal length of the entire optical system at a wide-angle limit, the ratio between the focal length of the negative optical power lens in the third lens unit and the focal length of the third lens unit, and the refractive index of the negative optical power lens in the third lens unit are set forth.

Japanese Laid-Open Patent Publication No. 2007-003554 discloses a variable magnification optical system at least comprising a first lens unit having positive optical power, a second lens unit having negative optical power, a third lens unit having positive optical power, and a fourth lens unit having positive optical power, wherein at least the first and the third lens units are moved so that variable magnification is achieved, wherein in this magnification change, the first lens unit is moved to the object side, and wherein the ratio between the amount of relative movement of the second lens unit at the time of magnification change and the focal length of the entire optical system at a wide-angle limit, the ratio between the focal length of the first lens unit and the focal length of the entire optical system at a wide-angle limit, and the ratio between the focal length of the third lens unit and the focal length of the entire optical system at a telephoto limit are set forth.

Japanese Laid-Open Patent Publication No. 2007-010695 discloses a variable magnification optical system at least comprising a first lens unit having positive optical power, a second lens unit having negative optical power, a third lens unit having positive optical power, and a fourth lens unit having positive optical power, wherein at least the first lens unit is moved so that variable magnification is achieved, and wherein the ratio between the focal length of the first lens unit and the focal length of the entire optical system at a wide-angle limit and the average refractive index to the d-line of all lenses in the second lens unit are set forth.

Patent Document 1: Japanese Laid-Open Patent Publication No. 2006-171655
Patent Document 2: Japanese Laid-Open Patent Publication No. 2006-184413
Patent Document 3: Japanese Laid-Open Patent Publication No. 2006-184416
Patent Document 4: Japanese Laid-Open Patent Publication No. 2006-189598
Patent Document 5: Japanese Laid-Open Patent Publication No. 2007-003554
Patent Document 6: Japanese Laid-Open Patent Publication No. 2007-010695

DISCLOSURE OF THE INVENTION

Problems to be Solved by the Invention

The optical systems disclosed in the above-mentioned publications have high zooming ratios sufficient for application to digital cameras. Nevertheless, width of the view angle at a wide-angle limit and size reduction are not simultaneously realized. In particular, from the viewpoint of size reduction, requirements in digital cameras of recent years are not satisfied.

Objects of the present invention are to provide: a zoom lens system having a reduced size and still realizing a wide view angle at a wide-angle limit, as well as a remarkably high zooming ratio and high performance; an imaging device employing this zoom lens system; and a thin and compact camera employing this imaging device.

Solution to the Problems (I) One of the above-mentioned objects is achieved by the following zoom lens system. That is, the present invention relates to a zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (8) is satisfied:

$$0.15 < dG3/dG < 0.27 \quad (8)$$

(here, $16 < f_T/f_W$ and $\omega > 35$)

where, dG 3 is an optical axial center thickness of the third lens unit, dG is a sum of the optical axial thicknesses of the first lens unit, the second lens unit, the third lens unit and the fourth lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following imaging device.

That is, the present invention relates to an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (8) is satisfied:

$$0.15 < dG3/dG < 0.27 \quad (8)$$

(here, $16 < f_T/f_W$ and $\omega > 35$)

where, dG 3 is an optical axial center thickness of the third lens unit, dG is a sum of the optical axial thicknesses of the first lens unit, the second lens unit, the third lens unit and the fourth lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following camera. That is, the present invention relates to a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (8) is satisfied:

$$0.15 < dG3/dG < 0.27 \quad (8)$$

(here, $16 < f_T/f_W$ and $\omega > 35$)

where, dG 3 is an optical axial center thickness of the third lens unit, dG is a sum of the optical axial thicknesses of the first lens unit, the second lens unit, the third lens unit and the fourth lens unit, $\omega$ is a half view angle (°) at a wide-angle limit, $f_T$ is a focal length of the entire system at a telephoto limit, and $f_W$ is a focal length of the entire system at a wide-angle limit.

(II) One of the above-mentioned objects is achieved by the following zoom lens system. That is, the present invention relates to a zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (9) is satisfied:

$$2.7 < \sqrt{(f_3^2 + f_4^2)}/|f_2| < 3.6 \quad (9)$$

(here, $16 < f_T/f_W$ and $\omega > 35$)

where, $f_2$ is a focal length of the second lens unit, $f_3$ is a focal length of the third lens unit, $f_4$ is a focal length of the fourth lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following imaging device. That is, the present invention relates to an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (9) is satisfied:

$$2.7<\sqrt{(f_3^2+f_4^2)}/|f_2|<3.6 \qquad (9)$$

(here, $16<f_T/f_W$ and $\omega>35$)

where, $f_2$ is a focal length of the second lens unit, $f_3$ is a focal length of the third lens unit, $f_4$ is a focal length of the fourth lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following camera. That is, the present invention relates to a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (9) is satisfied:

$$2.7<\sqrt{(f_3^2+f_4^2)}/|f_2|<3.6 \qquad (9)$$

(here, $16<f_T/f_W$ and $\omega>35$)

where, $f_2$ is a focal length of the second lens unit, $f_3$ is a focal length of the third lens unit, $f_4$ is a focal length of the fourth lens unit, $\omega$ is a half view angle (°) at a wide-angle limit, $f_T$ is a focal length of the entire system at a telephoto limit, and $f_W$ is a focal length of the entire system at a wide-angle limit.

(III) One of the above-mentioned objects is achieved by the following zoom lens system. That is, the present invention relates to a zoom lens system, in order from an object side to an image side, comprising a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (III-11) is satisfied:

$$0.036<d1NG/d1G<0.140 \qquad (\text{III-11})$$

(here, $16<f_T/f_W$ and $\omega>35$)

where, d 1 NG is an optical axial center thickness of the lens element having negative optical power contained in the first lens unit, d 1 G is an optical axial center thickness of the first lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following imaging device. That is, the present invention relates to an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (III-11) is satisfied:

$$0.036<d1NG/d1G<0.140 \qquad (\text{III-11})$$

(here, $16<f_T/f_W$ and $\omega>35$)

where, d 1 NG is an optical axial center thickness of the lens element having negative optical power contained in the first lens unit, d 1 G is an optical axial center thickness of the first lens unit, $\omega$ is a half view angle (°) at a wide-angle limit, $f_T$ is a focal length of the entire system at a telephoto limit, and $f_W$ is a focal length of the entire system at a wide-angle limit.

One of the above-mentioned objects is achieved by the following camera. That is, the present invention relates to a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following condition (III-11) is satisfied:

$$0.036 < d1NG/d1G < 0.140 \quad \text{(III-11)}$$

(here, $16 < f_T/f_W$ and $\omega > 35$)

where, d 1 NG is an optical axial center thickness of the lens element having negative optical power contained in the first lens unit, d 1 G is an optical axial center thickness of the first lens unit, $\omega$ is a half view angle (°) at a wide-angle limit, $f_T$ is a focal length of the entire system at a telephoto limit, and $f_W$ is a focal length of the entire system at a wide-angle limit.

EFFECTS OF THE INVENTION

The present invention provides a zoom lens system having a reduced size and still realizes a wide view angle at a wide-angle limit, as well as a remarkably high zooming ratio and high performance. Further, according to the present invention, an imaging device employing this zoom lens system and a thin and compact camera employing this imaging device are provided.

DESCRIPTION OF THE REFERENCE CHARACTERS

Figure 1:
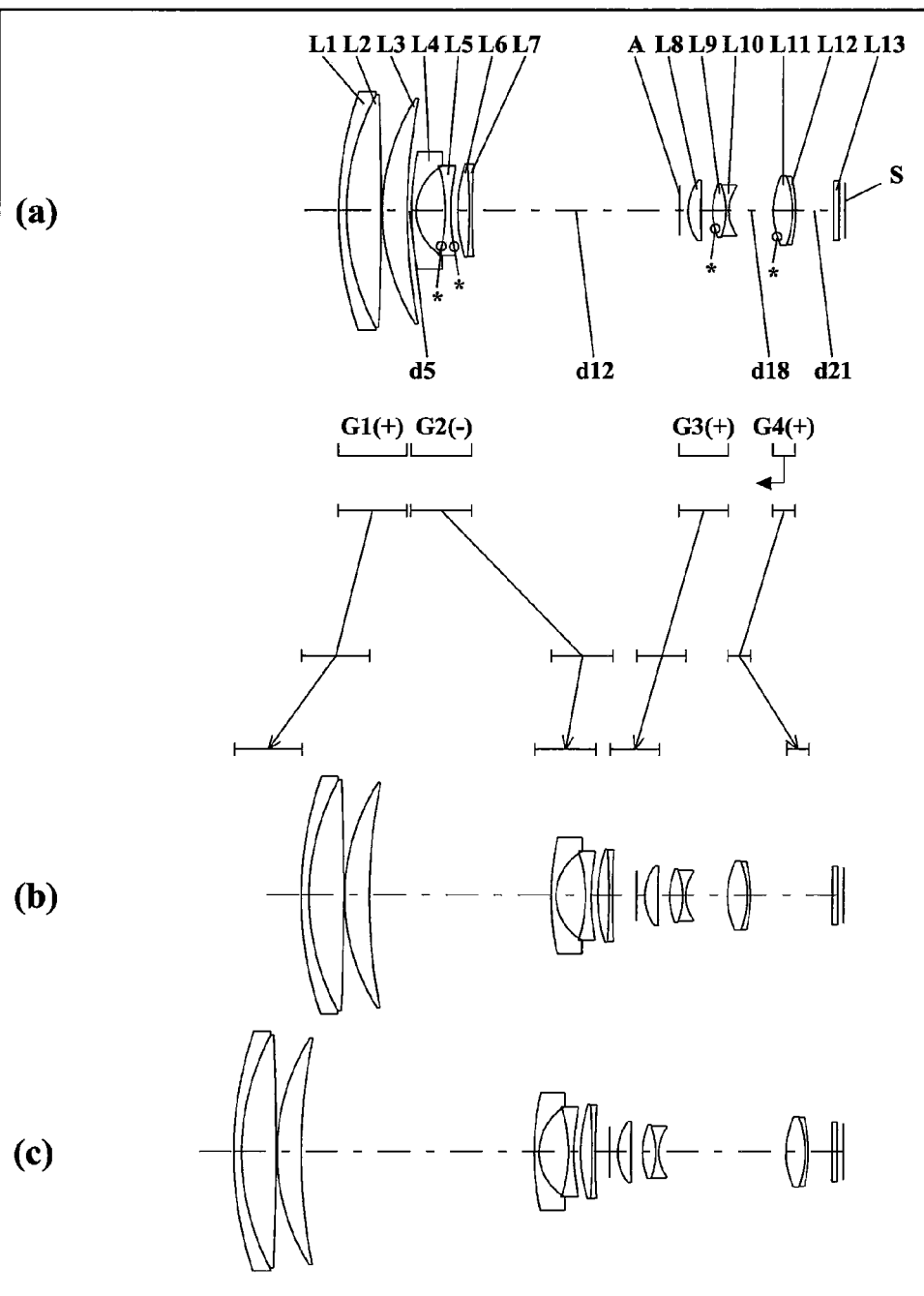
FIGS. 1(a)-(c) are a lens arrangement diagram showing an infinity in-focus condition of a zoom lens system according to Embodiments I-1 and II-1 (Examples I-1 and II-1).

G1 first lens unit
G2 second lens unit
G3 third lens unit
G4 fourth lens unit
L1 first lens element
L2 second lens element
L3 third lens element
L4 fourth lens element
L5 fifth lens element
L6 sixth lens element
L7 seventh lens element
L8 eighth lens element
L9 ninth lens element
L10 tenth lens element
L11 eleventh lens element
L12 twelfth lens element
L12, L13 plane parallel plate
A diaphragm
S image surface
1 zoom lens system
2 image sensor
3 liquid crystal display monitor
4 body
5 main barrel
6 moving barrel
7 cylindrical cam

BEST MODE FOR CARRYING OUT THE INVENTION

Embodiments I-1 to I-5 and II-1 to II-5

Figure 4:
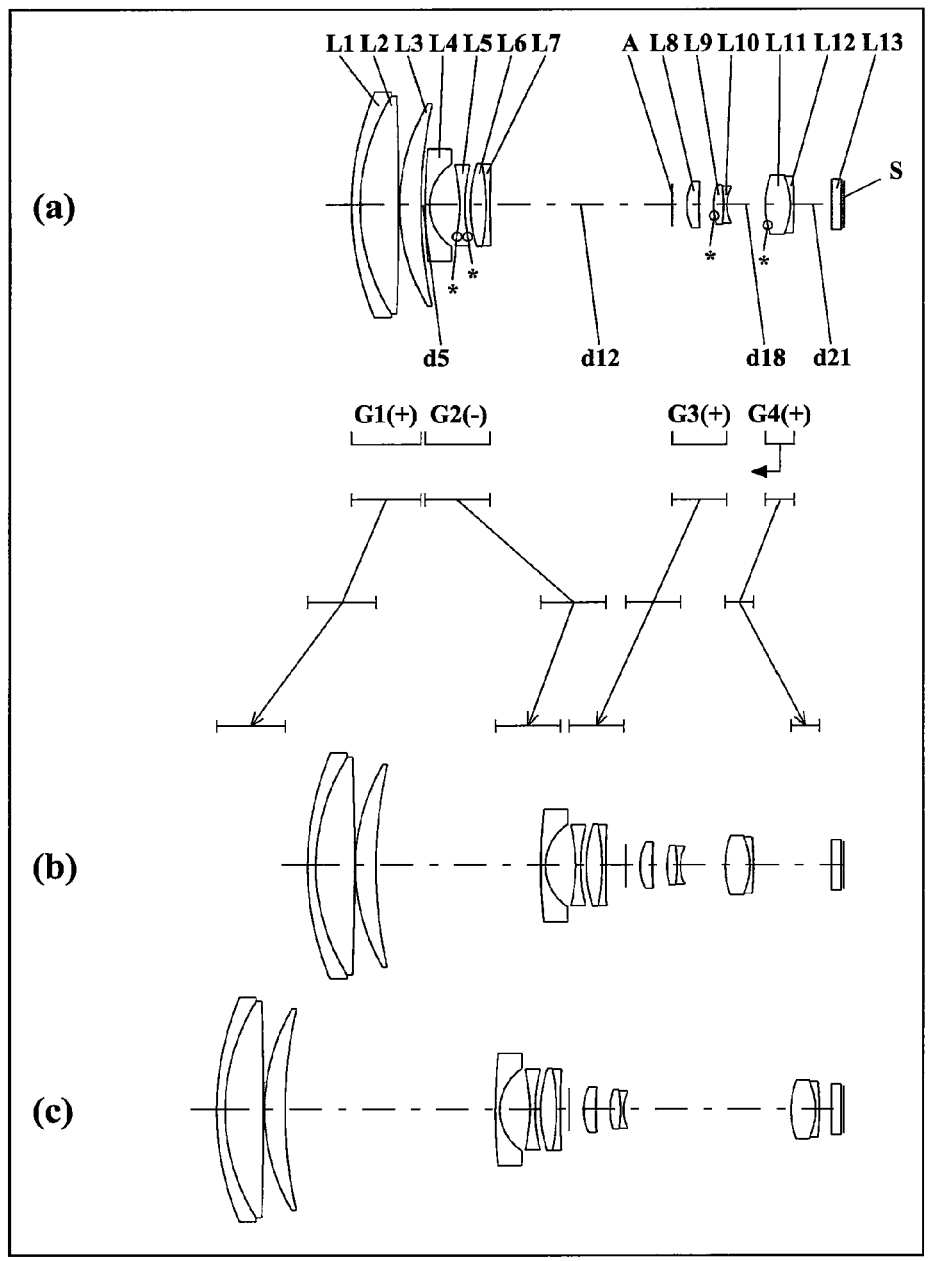
FIGS. 4(a)-(c) are a lens arrangement diagram showing an infinity in-focus condition of a zoom lens system according to Embodiments I-2 and II-2 (Examples I-2 and II-2).
Figure 7:
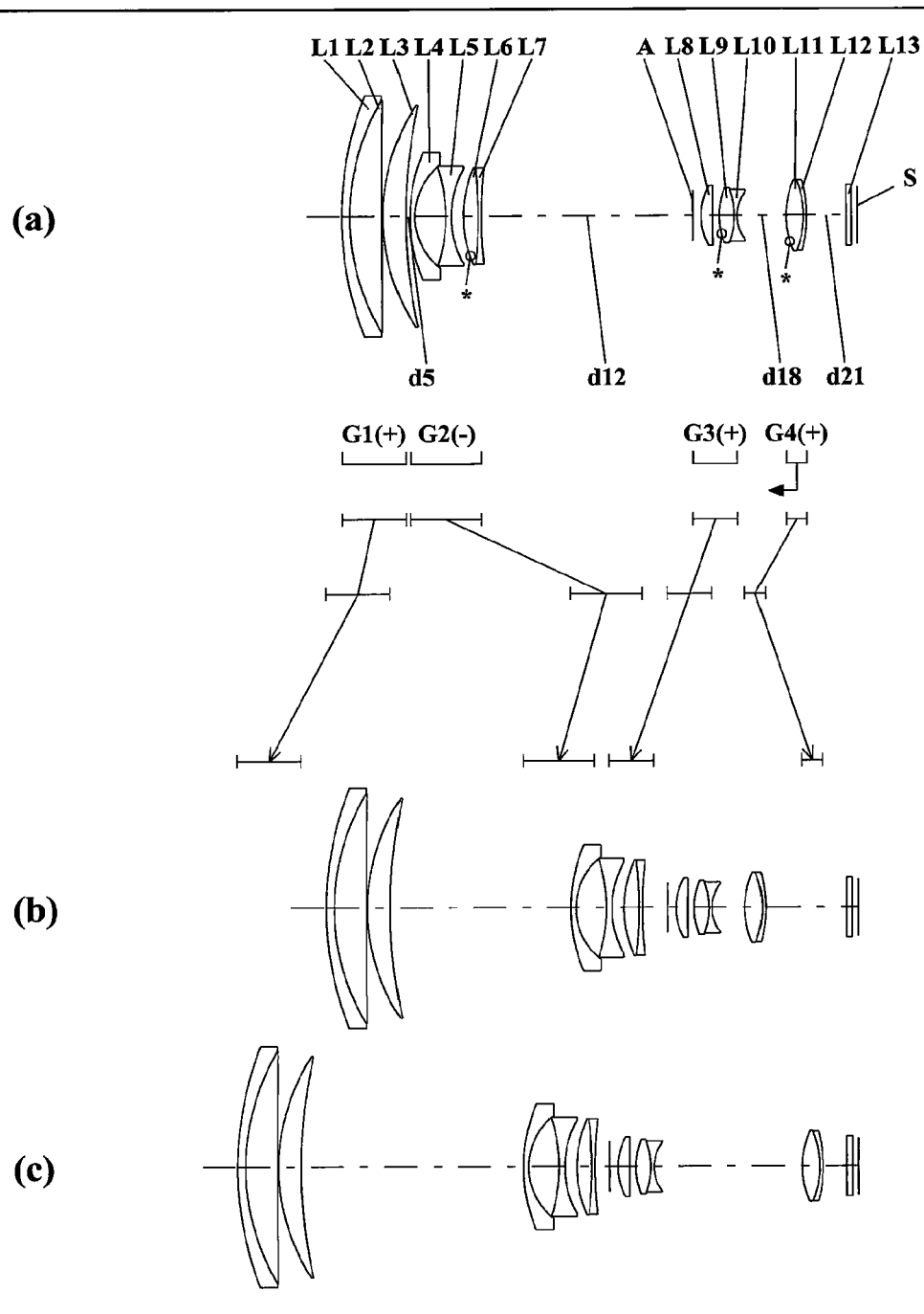
FIGS. 7(a)-(c) are a lens arrangement diagram showing an infinity in-focus condition of a zoom lens system according to Embodiments I-3 and II-3 (Examples I-3 and II-3).
Figure 10:
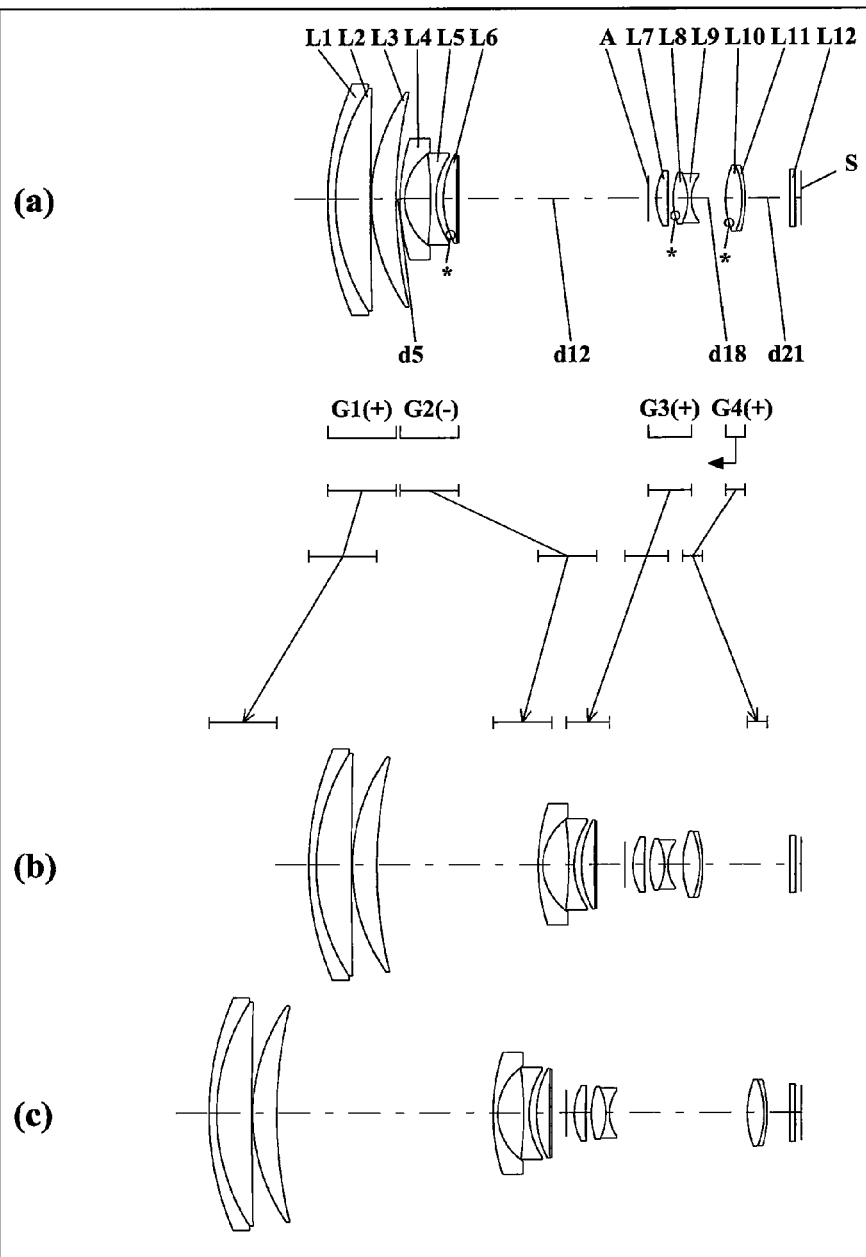
FIGS. 10(a)-(c) are a lens arrangement diagram showing an infinity in-focus condition of a zoom lens system according to Embodiments I-4 and II-4 (Examples I-4 and II-4).
Figure 13:
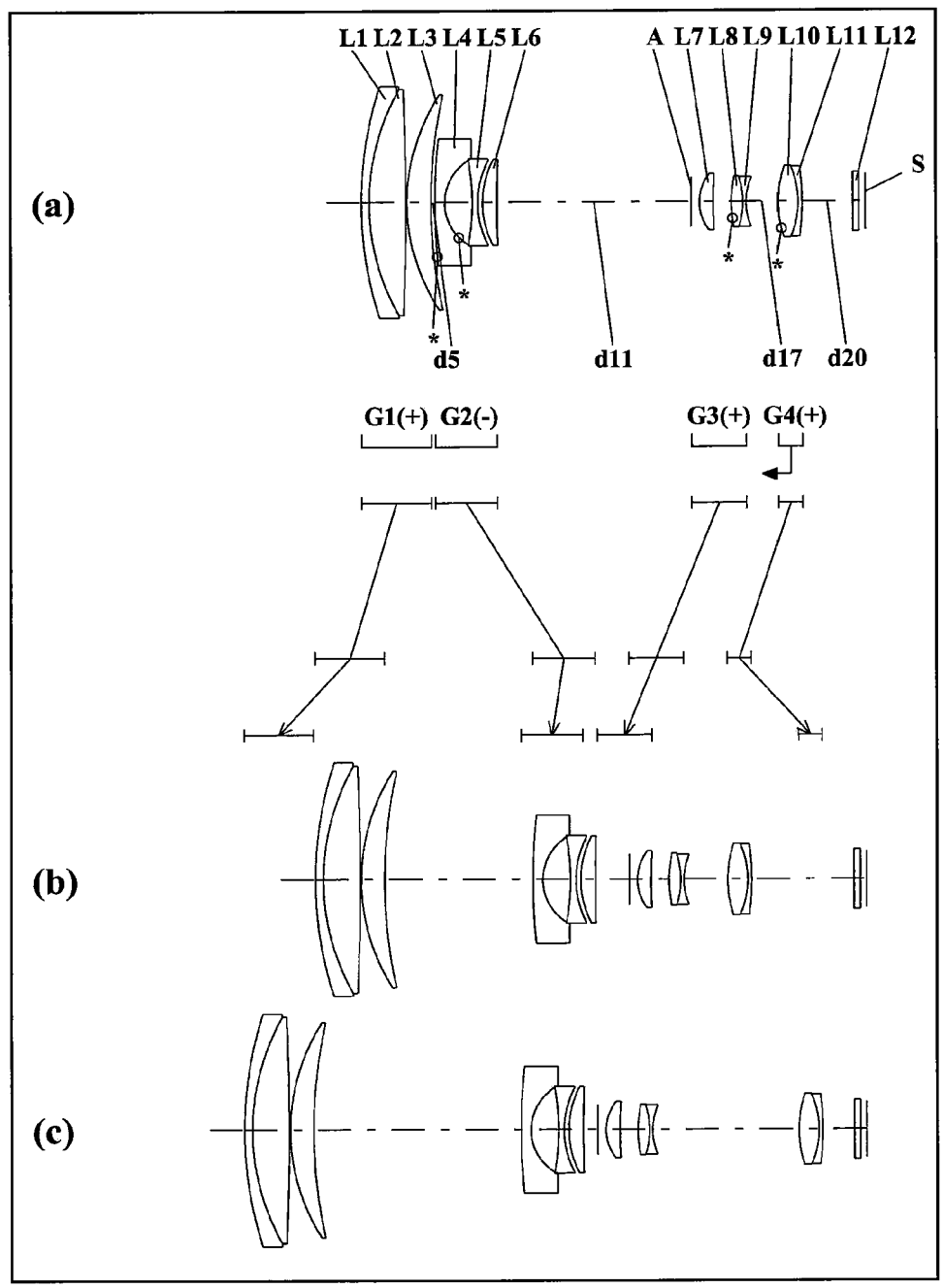
FIGS. 13(a)-(c) are a lens arrangement diagram showing an infinity in-focus condition of a zoom lens system according to Embodiments I-5 and II-5 (Examples I-5 and II-5).

FIG. 1 is a lens arrangement diagram of a zoom lens system according to Embodiments I-1 and II-1. FIG. 4 is a lens arrangement diagram of a zoom lens system according to Embodiments I-2 and II-2. FIG. 7 is a lens arrangement diagram of a zoom lens system according to Embodiments I-3 and II-3. FIG. 10 is a lens arrangement diagram of a zoom lens system according to Embodiments I-4 and II-4. FIG. 13 is a lens arrangement diagram of a zoom lens system according to Embodiments I-5 and II-5.

FIGS. 1, 4, 7, 10 and 13 show respectively a zoom lens system in an infinity in-focus condition. In each figure, part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each figure, bent arrows provided between part (a) and part (b) are lines obtained by connecting the positions of the lens units at a wide-angle limit, at a middle position and at a telephoto limit, in order from the top to the bottom. Thus, straight lines are used simply between a wide-angle limit and a middle position and between a middle position and a telephoto limit. That is, these straight lines do not indicate the actual motion of the individual lens units. Moreover, in each figure, an arrow provided to a lens unit indicates focusing from an infinity in-focus condition to a close-object in-focus condition, that is, the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming from a wide-angle limit to a telephoto limit, the first lens unit G1, the second lens unit G2, the third lens unit G3 and the fourth lens unit G4 all move along the optical axis (this lens configuration is referred to as the basic configuration I of Embodiments I-1 to I-5 or the basic configuration II of Embodiments II-1 to II-5, hereinafter). In the zoom lens system according to each embodiment, these lens units are arranged into a desired optical power arrangement, so that a remarkably high zooming ratio exceeding 16 and high optical performance are achieved and still size reduction is realized in the entire lens system.

In FIGS. 1, 4, 7, 10 and 13, an asterisk "*" provided to a particular surface indicates that the surface is aspheric. Further, in each figure, a symbol (+) or (−) provided to the sign of each lens unit corresponds to the sign of optical power of the lens unit. Moreover, in each figure, the straight line located on the most right-hand side indicates the position of an image surface S. On the object side relative to the image surface S (between the image surface S and the most image side lens surface of the fourth lens unit G4), a plane parallel plate such as an optical low-pass filter and a face plate of an image sensor is provided. Moreover, in each figure, a diaphragm A is provided between the most image side lens surface of the second lens unit G2 and the most object side lens surface of the third lens unit G3.

As shown in FIG. 1, in the zoom lens system according to Embodiments I-1 and II-1, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiments I-1 and II-1, the second lens unit G2, in order from the object side to the image side, comprises: a negative meniscus fourth lens element L4 with the convex surface facing the object side; a bi-concave fifth lens element L5; a bi-convex sixth lens element L6; and a bi-concave seventh lens element L7. Among these, the sixth lens element L6 and the seventh lens element L7 are cemented with each other.

Further, in the zoom lens system according to Embodiments I-1 and II-1, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiments I-1 and II-1, the fourth lens unit G4, in order from the object side to the image side, comprises: a bi-convex eleventh lens element L11; and a negative meniscus twelfth lens element L12 with the convex surface facing the image side. The eleventh lens element L11 and the twelfth lens element L12 are cemented with each other.

Here, in the zoom lens system according to Embodiments I-1 and II-1, a plane parallel plate L13 is provided on the object side relative to the image surface S (between the image surface S and the twelfth lens element L12).

In the zoom lens system according to Embodiments I-1 and II-1, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 4, in the zoom lens system according to Embodiments I-2 and II-2, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiments I-2 and II-2, the second lens unit G2, in order from the object side to the image side, comprises: a negative meniscus fourth lens element L4 with the convex surface facing the object side; a bi-concave fifth lens element L5; a bi-convex sixth lens element L6; and a bi-concave seventh lens element L7. Among these, the sixth lens element L6 and the seventh lens element L7 are cemented with each other.

Further, in the zoom lens system according to Embodiments I-2 and II-2, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiments I-2 and II-2, the fourth lens unit G4, in order from the object side to the image side, comprises: a bi-convex eleventh lens element L11; and a negative meniscus twelfth lens element L12 with the convex surface facing the image side. The eleventh lens element L11 and the twelfth lens element L12 are cemented with each other.

Here, in the zoom lens system according to Embodiments I-2 and II-2, a plane parallel plate L13 is provided on the object side relative to the image surface S (between the image surface S and the twelfth lens element L12).

In the zoom lens system according to Embodiments I-2 and II-2, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 7, in the zoom lens system according to Embodiments I-3 and II-3, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiments I-3 and II-3, the second lens unit G2, in order from the object side to the image side, comprises: a negative meniscus fourth lens element L4 with the convex surface facing the object side; a bi-concave fifth lens element L5; a bi-convex sixth lens element L6; and a bi-concave seventh lens element L7. Among these, the sixth lens element L6 and the seventh lens element L7 are cemented with each other.

Further, in the zoom lens system according to Embodiments I-3 and II-3, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiments I-3 and II-3, the fourth lens unit G4, in order from the object side to the image side, comprises: a bi-convex eleventh lens element L11; and a negative meniscus twelfth lens element L12 with the convex surface facing the image side. The eleventh lens element L11 and the twelfth lens element L12 are cemented with each other.

Here, in the zoom lens system according to Embodiments I-3 and II-3, a plane parallel plate L13 is provided on the object side relative to the image surface S (between the image surface S and the twelfth lens element L12).

In the zoom lens system according to Embodiments I-3 and II-3, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 10, in the zoom lens system according to Embodiments I-4 and II-4, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiments I-4 and II-4, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiments I-4 and II-4, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiments I-4 and II-4, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiments I-4 and II-4, a plane parallel plate L12 is provided on the object side relative to the image surface S (between the image surface S and the eleventh lens element L11).

In the zoom lens system according to Embodiments I-4 and II-4, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 13, in the zoom lens system according to Embodiments I-5 and II-5, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

In the zoom lens system according to Embodiments I-5 and II-5, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system according to Embodiments I-5 and II-5, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiments I-5 and II-5, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiments I-5 and II-5, a plane parallel plate L12 is provided on the object side relative to the image surface S (between the image surface S and the eleventh lens element L11).

In the zoom lens system according to Embodiments I-5 and II-5, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

In the zoom lens system according to each embodiment, in zooming from a wide-angle limit to a telephoto limit, the first lens unit G1, the second lens unit G2, the third lens unit G3 and the fourth lens unit G4 all move along the optical axis. Among these lens units, for example, the third lens unit is moved in a direction perpendicular to the optical axis, so that image blur caused by hand blurring, vibration and the like can be compensated optically.

In the present invention, when the image blur is to be compensated optically, the third lens unit moves in a direction perpendicular to the optical axis as described above, so that image blur is compensated in a state that size increase in the entire zoom lens system is suppressed and a compact construction is realized and that excellent imaging characteristics such as small decentering coma aberration and decentering astigmatism are satisfied.

The following description is given for conditions desired to be satisfied by a zoom lens system having the above-mentioned basic configuration I like the zoom lens system according to Embodiments I-1 to I-5 or a zoom lens system having the above-mentioned basic configuration II like the zoom lens system according to Embodiments II-1 to II-5. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

Further, all conditions described below hold only under the following two premise conditions, unless noticed otherwise.

$$16 < f_T/f_W$$

$$\omega > 35$$

where,
$f_T$ is a focal length of the entire system at a telephoto limit,
$f_W$ is a focal length of the entire system at a wide-angle limit, and
$\omega$ is a half view angle (°) at a wide-angle limit.

The zoom lens system having the basic configuration I satisfies the following condition (8).

$$0.15 < dG3/dG < 0.27 \qquad (8)$$

where,
dG 3 is an optical axial center thickness of the third lens unit, and
dG is a sum of the optical axial thicknesses of the first lens unit, the second lens unit, the third lens unit and the fourth lens unit.

The condition (8) sets forth the optical axial thickness of the third lens unit. When the value exceeds the upper limit of the condition (8), the thickness of the third lens unit is excessively great and hence a compact lens system is not realized. Further, when the value exceeds the upper limit of the condition (8), the thickness of the third lens unit is excessively great, and hence it becomes difficult that the third lens unit is moved in a direction perpendicular to the optical axis for blur compensation. In contrast, when the value goes below the lower limit of the condition (8), various kinds of aberration to be compensated by the third lens unit, especially, spherical aberration and coma aberration at a wide-angle limit cannot be compensated.

Here, when at least one of the following conditions (8)' and (8)" is satisfied, the above-mentioned effect is achieved more successfully.

$$0.19 < dG3/dG \qquad (8)'$$

$$dG3/dG < 0.22 \qquad (8)'$$

The zoom lens system having the basic configuration II satisfies the following condition (9).

$$2.7 < \sqrt{(f_3^2 + f_4^2)}/|f_2| < 3.6 \qquad (9)$$

where,
$f_2$ is a focal length of the second lens unit,
$f_3$ is a focal length of the third lens unit, and
$f_4$ is a focal length of the fourth lens unit.

The condition (9) sets forth the focal lengths of the lens units. When the value exceeds the upper limit of the condition (9), the absolute value of the optical power of the second lens unit is relatively strong excessively. Thus, various kinds of aberration, especially, distortion at a wide-angle limit cannot be compensated. In contrast, when the value goes below the lower limit of the condition (9), the absolute value of the optical power of the second lens unit is relatively weak excessively. Thus, in a case that a zoom lens system having a high magnification is to be achieved, the necessary amount of movement of the second lens unit is excessively great.

Here, when at least one of the following conditions (9)' and (9)" is satisfied, the above-mentioned effect is achieved more successfully.

$$2.8 < \sqrt{(f_3^2 + f_4^2)}/|f_2| \quad (9)'$$

$$\sqrt{(f_3^2 + f_4^2)}/|f_2| < 3.5 \quad (9)'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (1) is satisfied.

$$0 < \sqrt{(f_4 \cdot f_W \cdot \tan \omega)}/L_W < 0.13 \quad (1)$$

where,

ω is a half view angle (°) at a wide-angle limit, $L_W$ is an overall optical axial length of the entire system at a wide-angle limit (a distance from the most object side surface to the most image side surface), $f_4$ is a focal length of the fourth lens unit, and $f_W$ is a focal length of the entire system at a wide-angle limit.

The condition (1) substantially sets forth the focal length of the fourth lens unit. When the value exceeds the upper limit of the condition (1), the optical power of the fourth lens unit is excessively weak, and hence the necessary amount of movement in zooming increases. Thus, it is difficult in some cases to achieve a thin lens barrel configuration. Further, when the value exceeds the upper limit of the condition (1), it becomes difficult to achieve a satisfactory peripheral illuminance on the image surface especially at a wide-angle limit. Thus, this situation is not preferable.

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (2) is satisfied.

$$0.05 \leq f_3/f_4 \leq 0.97 \quad (2)$$

where, $f_3$ is a focal length of the third lens unit, and $f_4$ is a focal length of the fourth lens unit.

The condition (2) sets forth the ratio between the focal length of the third lens unit and the focal length of the fourth lens unit. When the value exceeds the upper limit of the condition (2), the focal length of the third lens unit is excessively long. Thus, a possibility arises that the amount of movement of the third lens unit necessary for achieving a high magnification exceeding 16 increases excessively. Further, when the value exceeds the upper limit of the condition (2), in some cases, it becomes difficult that, for example, the third lens unit is moved in a direction perpendicular to the optical axis for blur compensation. In contrast, when the value goes below the lower limit of the condition (2), the focal length of the third lens unit is excessively short. Thus, a large aberration fluctuation arises in zooming so as to cause difficulty in compensation. Further, the absolute values of various kinds of aberration generated in the third lens unit increase excessively, and hence compensation becomes difficult. Thus, this situation is not preferable. Moreover, when the value goes below the lower limit of the condition (2), an excessively high error sensitivity to the inclination between the surfaces in the third lens unit is caused. This causes in some cases difficulty in assembling the optical system.

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, especially in a case that the second lens unit includes a lens element having negative optical power and being arranged on the most object side and a lens element having positive optical power, it is preferable that the following condition (3) is satisfied.

$$(nd_4 - 1) + (nd_6 - 1) \geq 1.8 \quad (3)$$

where, $nd_4$ is a refractive index to the d-line of a lens element having negative optical power and being arranged on the most object side in the second lens unit, and $nd_6$ is a refractive index to the d-line of a lens element having positive optical power in the second lens unit.

The condition (3) sets forth a condition desired to be satisfied by lens elements contained in the second lens unit. When the value falls outside the range of the condition (3), compensation of distortion and curvature of field is difficult especially at a wide-angle limit. Thus, this situation is not preferable.

Here, when the following condition (3)' is satisfied, the above-mentioned effect is achieved more successfully.

$$(nd_4 - 1) + (nd_6 - 1) \geq 1.9 \quad (3)'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, especially in a case that the first lens unit includes a lens element having negative optical power and being arranged on the most object side and a lens element having positive optical power, it is preferable that the following condition (4) is satisfied.

$$nd_1 - nd_2 0.5 \quad (4)$$

where, $nd_1$ is a refractive index to the d-line of a lens element having negative optical power and being arranged on the most object side in the first lens unit, and $nd_2$ is a refractive index to the d-line of a lens element located on the most object side among the lens elements having positive optical power in the first lens unit.

The condition (4) sets forth a condition desired to be satisfied by lens elements contained in the first lens unit. When the value falls outside the range of the condition (4), compensation of chromatic aberration, especially, axial chromatic aberration, at a telephoto limit is difficult. Thus, this situation is not preferable.

Here, when the following condition (4)' is satisfied, the above-mentioned effect is achieved more successfully.

$$nd_1 - nd_2 \geq 0.6 \quad (4)'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, especially in a case that the first lens unit includes a lens element having negative optical power and being arranged on the most object side and a lens element having positive optical power and being arranged on the most image side, it is preferable that the following condition (5) is satisfied.

$$(nd_1-1)+(nd_3-1) \geqq 1.8 \qquad (5)$$

where, $nd_1$ is a refractive index to the d-line of a lens element having negative optical power and being arranged on the most object side in the first lens unit, and $nd_3$ is a refractive index to the d-line of a lens element having positive optical power and being arranged on the most image side in the first lens unit.

The condition (5) sets forth a condition desired to be satisfied by lens elements contained in the first lens unit. When the value falls outside the range of the condition (5), compensation of chromatic aberration, especially, axial chromatic aberration, at a telephoto limit is difficult. Thus, this situation is not preferable.

Here, when the following condition (5)' is satisfied, the above-mentioned effect is achieved more successfully.

$$(nd_1-1)+(nd_3-1) \geqq 1.9 \qquad (5)'$$

In a zoom lens system having the above-mentioned basic configuration II like each zoom lens system according to Embodiments II-1 to II-5, it is preferable that the following condition (8) is satisfied.

$$0.15 < dG3/dG < 0.27 \qquad (8)$$

where, dG 3 is an optical axial center thickness of the third lens unit, and dG is a sum of the optical axial thicknesses of the first lens unit, the second lens unit, the third lens unit and the fourth lens unit.

The condition (8) sets forth the optical axial thickness of the third lens unit. When the value exceeds the upper limit of the condition (8), the thickness of the third lens unit is excessively great, and hence it is difficult in some cases to achieve a compact lens system. Further, when the value exceeds the upper limit of the condition (8), the thickness of the third lens unit is excessively great, and hence it becomes difficult that, for example, the third lens unit is moved in a direction perpendicular to the optical axis for blur compensation. In contrast, when the value goes below the lower limit of the condition (8), difficulty arises in compensating various kinds of aberration to be compensated by the third lens unit, especially in compensating spherical aberration and coma aberration at a wide-angle limit. Thus, this situation is not preferable.

Here, when at least one of the following conditions (8)' and (8)" is satisfied, the above-mentioned effect is achieved more successfully.

$$0.19 < dG3/dG \qquad (8)'$$

$$dG3/dG < 0.22 \qquad (8)'$$

In a zoom lens system having the above-mentioned basic configuration I like each zoom lens system according to Embodiments I-1 to I-5, it is preferable that the following condition (9) is satisfied.

$$2.7 < \sqrt{(f_3^2+f_4^2)}/|f_2| < 3.6 \qquad (9)$$

where, $f_2$ is a focal length of the second lens unit, $f_3$ is a focal length of the third lens unit, and $f_4$ is a focal length of the fourth lens unit.

The condition (9) sets forth the focal lengths of the lens units. When the value exceeds the upper limit of the condition (9), the absolute value of the optical power of the second lens unit is relatively strong excessively. Thus, compensation of various kinds of aberration, especially, compensation of distortion at a wide-angle limit, becomes difficult. Thus, this situation is not preferable. In contrast, when the value goes below the lower limit of the condition (9), the absolute value of the optical power of the second lens unit is relatively weak excessively. Thus, in a case that a zoom lens system having a high magnification is to be achieved, the necessary amount of movement of the second lens unit is excessively great. Thus, this situation is not preferable.

Here, when at least one of the following conditions (9)' and (9)" is satisfied, the above-mentioned effect is achieved more successfully.

$$2.8 < \sqrt{(f_3^2+f_4^2)}/|f_2| \qquad (9)'$$

$$\sqrt{(f_3^2+f_4^2)}/|f_2| < 3.5 \qquad (9)'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (10) is satisfied.

$$1.95 < m_{2T}/m_{34T} < 3.47 \qquad (10)$$

where, $m_{2T}$ is a lateral magnification of the second lens unit at a telephoto limit, and $m_{34T}$ is a lateral magnification at a telephoto limit of a composite lens unit consisting of all lens units located on the image side relative to the second lens unit.

The condition (10) sets forth the magnification of the lens units at a telephoto limit. When the value exceeds the upper limit of the condition (10), the overall length at a telephoto limit is excessively great, and hence difficulty arises in realizing a compact zoom lens system. Further, for example, in a case that the lens units on the image side relative to the second lens unit are moved in a direction perpendicular to the optical axis so that blur compensation is achieved, an excessively large aberration fluctuation is caused. Thus, this situation is not preferable. In contrast, when the value goes below the lower limit of the condition (10), similarly, for example, in a case that the lens units on the image side relative to the second lens unit are moved in a direction perpendicular to the optical axis so that blur compensation is achieved, an excessively large aberration fluctuation is caused. Thus, this situation is not preferable.

Here, when at least one of the following conditions (10)' and (10)" is satisfied, the above-mentioned effect is achieved more successfully.

$$2.2 < m_{2T}/m_{34T} \qquad (10)'$$

$$m_{2T}/m_{34T} < 3.2 \qquad (10)'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (III-11) is satisfied.

$$0.037 < d1NG/d1G < 0.135 \qquad (I\cdot II\text{-}11)$$

where, d 1 NG is an optical axial center thickness of the lens element having negative optical power contained in the first lens unit, and d1G is an optical axial center thickness of the first lens unit.

The condition (I•II-11) sets forth the thickness of the lens element having negative optical power contained in the first lens unit. When the value exceeds the upper limit of the condition (I•II-11), the thickness of the entirety of the first lens unit is excessively great, and hence it is difficult to achieve a compact zoom lens system. Thus, this situation is not preferable. In contrast, when the value goes below the lower limit of the condition (I•II-11), remarkable difficulty arises in fabricating the lens element having negative optical power contained in the first lens unit. Thus, this situation is not preferable.

Here, when at least one of either condition (I•II-11)' or condition (I•II-11)'' and condition (I•II-11)''' is satisfied, the above-mentioned effect is achieved more successfully.

$$0.075 < d1NG/d1G \quad (\text{I·II-11})'$$

$$0.100 < d1NG/d1G \quad (\text{I·II-11})'$$

$$d1NG/d1G < 0.110 \quad (\text{I·II-11})'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (12) is satisfied.

$$0.11 < f_W \cdot \tan(\omega - \omega_0) < 0.15 \quad (12)$$

where, $f_W$ is a focal length of the entire system at a wide-angle limit, $\omega$ is a half view angle (real half view angle (°)) at a wide-angle limit, and $\omega_0$ is a paraxial half view angle (°) at a wide-angle limit.

The condition (12) sets forth the difference between the real half view angle and the paraxial half view angle at a wide-angle limit. This condition substantially controls distortion. When the value falls outside the range of the condition (12), distortion is excessively great. Thus, this situation is not preferable.

Here, when at least one of the following conditions (12)' and (12)'' is satisfied, the above-mentioned effect is achieved more successfully.

$$0.12 < f_W \cdot \tan(\omega - \omega_0) \quad (12)'$$

$$f_W \cdot \tan(\omega - \omega_0) < 0.14 \quad (12)'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (13) is satisfied.

$$0.17 < f_4/f_T < 0.30 \quad (13)$$

where, $f_4$ is a focal length of the fourth lens unit, and $f_T$ is a focal length of the entire system at a telephoto limit.

The condition (13) sets forth the optical power of the fourth lens unit. When the value exceeds the upper limit of the condition (13), the focal length of the fourth lens unit is excessively long, that is, the optical power is excessively weak. Thus, difficulty arises in appropriately controlling the exit pupil position especially at a wide-angle limit. Accordingly, it is difficult in some cases to achieve a satisfactory image surface illuminance. In contrast, when the value goes below the lower limit of the condition (13), the focal length of the fourth lens unit is excessively short, that is, the optical power is excessively strong. Thus, it becomes difficult that large aberration generated in the fourth lens unit is compensated by other lens units. Thus, this situation is not preferable.

Here, when at least one of the following conditions (13)' and (13)'' is satisfied, the above-mentioned effect is achieved more successfully.

$$0.19 < f_4/f_T \quad (13)'$$

$$f_4/f_T < 0.26 \quad (13)'$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (14) is satisfied.

$$0.60 < |M_1/M_2| < 1.30 \quad (14)$$

where, $M_1$ is an amount of movement of the first lens unit in the optical axis direction during zooming from a wide-angle limit to a telephoto limit (movement from the image side to the object side is defined to be positive), and $M_2$ is an amount of movement of the second lens unit in the optical axis direction during zooming from a wide-angle limit to a telephoto limit (movement from the image side to the object side is defined to be positive).

The condition (14) sets forth the amount of movement of the first lens unit in the optical axis direction. When the value exceeds the upper limit of the condition (14), the amount of movement of the first lens unit is excessively large. Thus, the effective diameter of the first lens unit necessary for achieving a satisfactory F-number at a wide-angle limit increases. This causes difficulty in some cases in achieving a compact zoom lens system. In contrast, when the value goes below the lower limit of the condition (14), the amount of movement of the second lens unit necessary for achieving a satisfactory high magnification is relatively large excessively. Thus, it is difficult in some cases to achieve a compact zoom lens system.

Here, when at least one of the following conditions (14)' and (14)'' is satisfied, the above-mentioned effect is achieved more successfully.

$$0.75 < |M_1/M_2| \quad (14)$$

$$|M_1/M_2| < 1.15 \quad (14)$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (15) is satisfied.

$$0.4 < |M_3/M_2| < 1.2 \quad (15)$$

where, $M_2$ is an amount of movement of the second lens unit in the optical axis direction during zooming from a wide-angle limit to a telephoto limit (movement from the image side to the object side is defined to be positive), and $M_3$ is an amount of movement of the third lens unit in the optical axis direction during zooming from a wide-angle limit to a telephoto limit (movement from the image side to the object side is defined to be positive).

The condition (15) sets forth the amount of movement of the third lens unit in the optical axis direction. When the value exceeds the upper limit of the condition (15), the amount of movement of the third lens unit is excessively large. Thus, an excessively large aberration fluctuation is generated in the third lens unit during zooming. Accordingly, it is difficult in some cases to compensate this aberration by other lens units. In contrast, when the value goes below the lower limit of the condition (15), the amount of movement of the third lens unit is excessively small. Thus, a relatively excessively large amount of movement of the second lens unit is necessary for achieving a high magnification. Accordingly, it is difficult in some cases to achieve a compact zoom lens system.

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (16) is satisfied.

$$0.35<(m_{2T}/m_{2W})/(f_T/f_W)<0.65 \tag{16}$$

where, $m_{2T}$ is a lateral magnification of the second lens unit at a telephoto limit, $m_{2W}$ is a lateral magnification of the second lens unit at a wide-angle limit, $f_T$ is a focal length of the entire system at a telephoto limit, and $f_W$ is a focal length of the entire system at a wide-angle limit.

The condition (16) sets forth a lateral magnification change in the second lens unit and substantially sets forth the degree of variable magnification load to the second lens unit. When the value exceeds the upper limit of the condition (16), the variable magnification load to the second lens unit is excessive. Thus, it is difficult in some cases to compensate various kinds of off-axial aberration, especially, distortion at a wide-angle limit. In contrast, when the value goes below the lower limit of the condition (16), the variable magnification load to the second lens unit is excessively small. Thus, the amount of movement of the third lens unit during zooming necessary for achieving a satisfactory high magnification becomes relatively large. Accordingly, it is difficult in some cases to achieve size reduction of the entire zoom lens system.

Here, when at least one of the following conditions (16)' and (16)" is satisfied, the above-mentioned effect is achieved more successfully.

$$0.40<(m_{2T}/m_{2W})/(f_T/f_W) \tag{16}'$$

$$(m_{2T}/m_{2W})/(f_T/f_W)<0.50 \tag{16}''$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (17) is satisfied.

$$1.3<m_{3T}/m_{3W}<2.2 \tag{17}$$

where, $m_{3T}$ is a lateral magnification of the third lens unit at a telephoto limit, and $m_{3W}$ is a lateral magnification of the third lens unit at a wide-angle limit.

The condition (17) sets forth a lateral magnification change in the third lens unit and substantially sets forth the degree of variable magnification load to the third lens unit. When the value exceeds the upper limit of the condition (17), the variable magnification load to the third lens unit is excessive. Thus, difficulty arises in compensating various kinds of aberration that vary during magnification change, especially, in compensating off-axial aberration. Thus, this situation is not preferable. In contrast, when the value goes below the lower limit of the condition (17), the variable magnification load to the third lens unit is excessively small. Thus, a relatively excessively large amount of movement of the second lens unit is necessary for achieving a high magnification. Accordingly, it is difficult in some cases to achieve a compact zoom lens system.

Here, when at least one of the following conditions (17)' and (17)" is satisfied, the above-mentioned effect is achieved more successfully.

$$1.5<m_{3T}/m_{3W} \tag{17}'$$

$$m_{3T}/m_{3W}<2.0 \tag{17}''$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (18) is satisfied.

$$5.5<\sqrt{(f_3^2+f_4^2)}/(f_W\cdot\tan\omega)<9.0 \tag{18}$$

where, $\omega$ is a half view angle (°) at a wide-angle limit, $f_3$ is a focal length of the third lens unit, $f_4$ is a focal length of the fourth lens unit, and $f_W$ is a focal length of the entire system at a wide-angle limit.

The condition (18) sets forth the focal lengths of the third lens unit and the fourth lens unit. When the value exceeds the upper limit of the condition (18), the focal lengths of the third lens unit and the fourth lens unit are excessively long. This causes difficulty in some cases in achieving a compact zoom lens system. In contrast, when the value goes below the lower limit of the condition (18), the focal lengths of the third lens unit and the fourth lens unit are excessively short. Thus, aberration compensation capability especially of the third lens unit is excessive. Accordingly, it is difficult in some cases to achieve satisfactory balance of aberration compensation in the entire zoom lens system.

Here, when at least one of the following conditions (18)' and (18)" is satisfied, the above-mentioned effect is achieved more successfully.

$$6.8<\sqrt{(f_3^2+f_4^2)}/(f_W\cdot\tan\omega) \tag{18}'$$

$$\sqrt{(f_3^2+f_4^2)}/(f_W\cdot\tan\omega)<7.5 \tag{18}''$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (19) is satisfied.

$$3.0<(L_T-L_W)/(f_W\cdot\tan\omega)<6.0 \tag{19}$$

where, $\omega$ is a half view angle (°) at a wide-angle limit, $L_T$ is an overall optical axial length of the entire system at a telephoto limit (a distance from the most object side surface to the most image side surface), $L_W$ is an overall optical axial length of the entire system at a wide-angle limit (a distance from the most object side surface to the most image side surface), and $f_W$ is a focal length of the entire system at a wide-angle limit.

The condition (19) sets forth an overall length change during zooming. When the value falls outside the range of the condition (19), it is difficult to construct a compact lens barrel mechanism. Thus, this situation is not preferable.

Here, when at least one of the following conditions (19)' and (19)" is satisfied, the above-mentioned effect is achieved more successfully.

$$3.5<(L_T-L_W)/(f_W\tan\omega) \qquad (19)'$$

$$(L_T-L_W)/(f_W\tan\omega)<4.5 \qquad (19)''$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (20) is satisfied.

$$50<(L_T\cdot f_T)/f_4(f_W\tan\omega)<150 \qquad (20)$$

where, $\omega$ is a half view angle (°) at a wide-angle limit, $L_T$ is an overall optical axial length of the entire system at a telephoto limit (a distance from the most object side surface to the most image side surface), $f_4$ is a focal length of the fourth lens unit, $f_T$ is a focal length of the entire system at a telephoto limit, and $f_W$ is a focal length of the entire system at a wide-angle limit.

The condition (20) sets forth a suitable overall length at a telephoto limit. When the value exceeds the upper limit of the condition (20), the overall length at a telephoto limit is excessively long, and hence it is difficult in some cases to achieve a compact zoom lens system having a short overall length. Further, when the value exceeds the upper limit of the condition (20), the overall length at a telephoto limit is excessively long. Thus, it becomes difficult to construct a compact lens barrel mechanism. Accordingly, this situation is not preferable. In contrast, when the value goes below the lower limit of the condition (20), the focal length of the fourth lens unit is, relatively, excessively long. Thus, it becomes difficult to control the exit pupil position at a wide-angle limit. Accordingly, it becomes difficult to maintain an appropriate image surface illuminance. Thus, this situation is not preferable.

Here, when at least one of the following conditions (20)' and (20)" is satisfied, the above-mentioned effect is achieved more successfully.

$$80<(L_T\cdot f_T)/f_4(f_W\tan\omega) \qquad (20)'$$

$$(L_T\cdot f_T)/f_4(f_W\tan\omega)<125 \qquad (20)''$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (21) is satisfied.

$$50<(L_W\cdot f_T)/f_4(f_W\tan\omega)<125 \qquad (21)$$

where, $\omega$ is a half view angle (°) at a wide-angle limit, $L_W$ is an overall optical axial length of the entire system at a wide-angle limit (a distance from the most object side surface to the most image side surface), $f_4$ is a focal length of the fourth lens unit, $f_T$ is a focal length of the entire system at a telephoto limit, and $f_W$ is a focal length of the entire system at a wide-angle limit.

The condition (21) sets forth a suitable overall length at a wide-angle limit. When the value exceeds the upper limit of the condition (21), the overall length at a wide-angle limit is excessively long, and hence it is difficult in some cases to achieve a zoom lens system having a compact accommodation size. In contrast, when the value goes below the lower limit of the condition (21), the focal length of the fourth lens unit is, relatively, excessively long. Thus, it becomes difficult to control the exit pupil position at a wide-angle limit. Accordingly, it becomes difficult to maintain an appropriate image surface illuminance. Thus, this situation is not preferable.

Here, when at least one of the following conditions (21)' and (21)" is satisfied, the above-mentioned effect is achieved more successfully.

$$65<(L_W\cdot f_T)/f_4(f_W\tan\omega) \qquad (21)'$$

$$(L_W\cdot f_T)/f_4(f_W\tan\omega)<100 \qquad (21)''$$

In a zoom lens system having the above-mentioned basic configuration I like each zoom lens system according to Embodiments I-1 to I-5 or a zoom lens system having the above-mentioned basic configuration II like each zoom lens system according to Embodiments II-1 to II-5, it is preferable that the following condition (22) is satisfied.

$$4.0<f_3/f_W\tan\omega<5.2 \qquad (22)$$

where, $\omega$ is a half view angle (°) at a wide-angle limit, $f_3$ is a focal length of the third lens unit, and $f_W$ is a focal length of the entire system at a wide-angle limit.

The condition (22) sets forth the focal length of the third lens unit. When the value exceeds the upper limit of the condition (22), the focal length of the third lens unit is excessively long. This causes difficulty in some cases in achieving a compact zoom lens system. Further, when the value exceeds the upper limit of the condition (22), the necessary amount of movement in a case that, for example, the third lens unit is moved in a direction perpendicular to the optical axis for blur compensation becomes excessively large. Thus, this situation is not preferable. In contrast, when the value goes below the lower limit of the condition (22), the focal length of the third lens unit is excessively short. Thus, the aberration compensation capability of the third lens unit is excessive, and hence the compensation balance of various kinds of aberration is degraded. This causes difficulty in some cases in achieving a compact zoom lens system.

Here, when at least one of the following conditions (22)' and (22)" is satisfied, the above-mentioned effect is achieved more successfully.

$$4.4<f_3/f_W\tan\omega \qquad (22)'$$

$$f_3/f_W\tan\omega<4.8 \qquad (22)''$$

Here, the lens units constituting the zoom lens system of each embodiment are composed exclusively of refractive type lenses that deflect the incident light by refraction (that is, lenses of a type in which deflection is achieved at the interface between media each having a distinct refractive index). However, the lens type is not limited to this. For example, the lens units may employ diffractive type lenses that deflect the incident light by diffraction; refractive-diffractive hybrid type lenses that deflect the incident light by a combination of diffraction and refraction; or gradient index type lenses that deflect the incident light by distribution of refractive index in the medium.

Further, in each embodiment, a reflecting surface may be arranged in the optical path so that the optical path may be bent before, after or in the middle of the zoom lens system. The bending position may be set up in accordance with the necessity. When the optical path is bent appropriately, the apparent thickness of a camera can be reduced.

Moreover, each embodiment has been described for the case that a plane parallel plate such as an optical low-pass filter is arranged between the last surface of the fourth lens unit (the most image side surface of the fourth lens unit) and the image surface S. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiments I-6 and II-6

Figure 16:
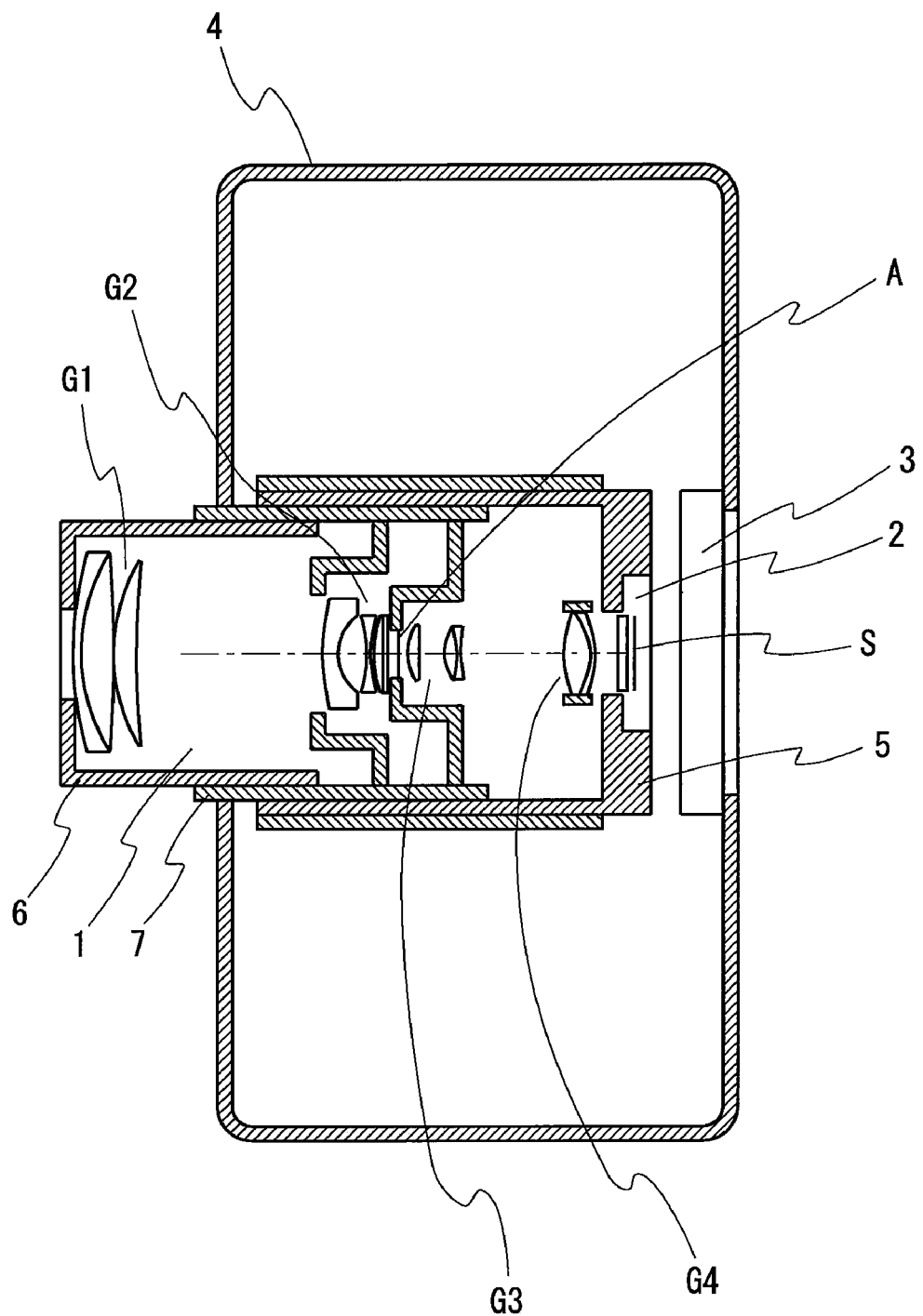
FIG. 16 is a schematic construction diagram of a digital still camera according to Embodiments I-6 and II-6.

FIG. 16 is a schematic construction diagram of a digital still camera according to Embodiments I-6 and II-6. In FIG. 16, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiments I-1 and II-1. In FIG. 16, the zoom lens system 1 comprises a first lens unit G1, a second lens unit G2, a diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 and the fourth lens unit G4 move to predetermined positions relative to the image sensor 2, so that magnification change can be achieved ranging from a wide-angle limit to a telephoto limit. The fourth lens unit G4 is movable in an optical axis direction by a motor for focus adjustment.

As such, when the zoom lens system according to Embodiments I-1 and II-1 is employed in a digital still camera, a small digital still camera is obtained that has a high resolution and high capability of compensating the curvature of field and that has a short overall optical length of lens system at the time of non-use. Here, in the digital still camera shown in FIG. 16, any one of the zoom lens systems according to Embodiments I-2 to I-5 and II-2 to II-5 may be employed in place of the zoom lens system according to Embodiments I-1 and II-1. Further, the optical system of the digital still camera shown in FIG. 16 is applicable also to a digital video camera for moving images. In this case, moving images with high resolution can be acquired in addition to still images.

Further, an imaging device comprising a zoom lens system according to Embodiments I-1 to I-5 and II-1 to II-5 described above and an image sensor such as a CCD or a CMOS may be applied to a mobile telephone, a PDA (Personal Digital Assistance), a surveillance camera in a surveillance system, a Web camera, a vehicle-mounted camera or the like.

Embodiments III-1 to III-4

Figure 17:
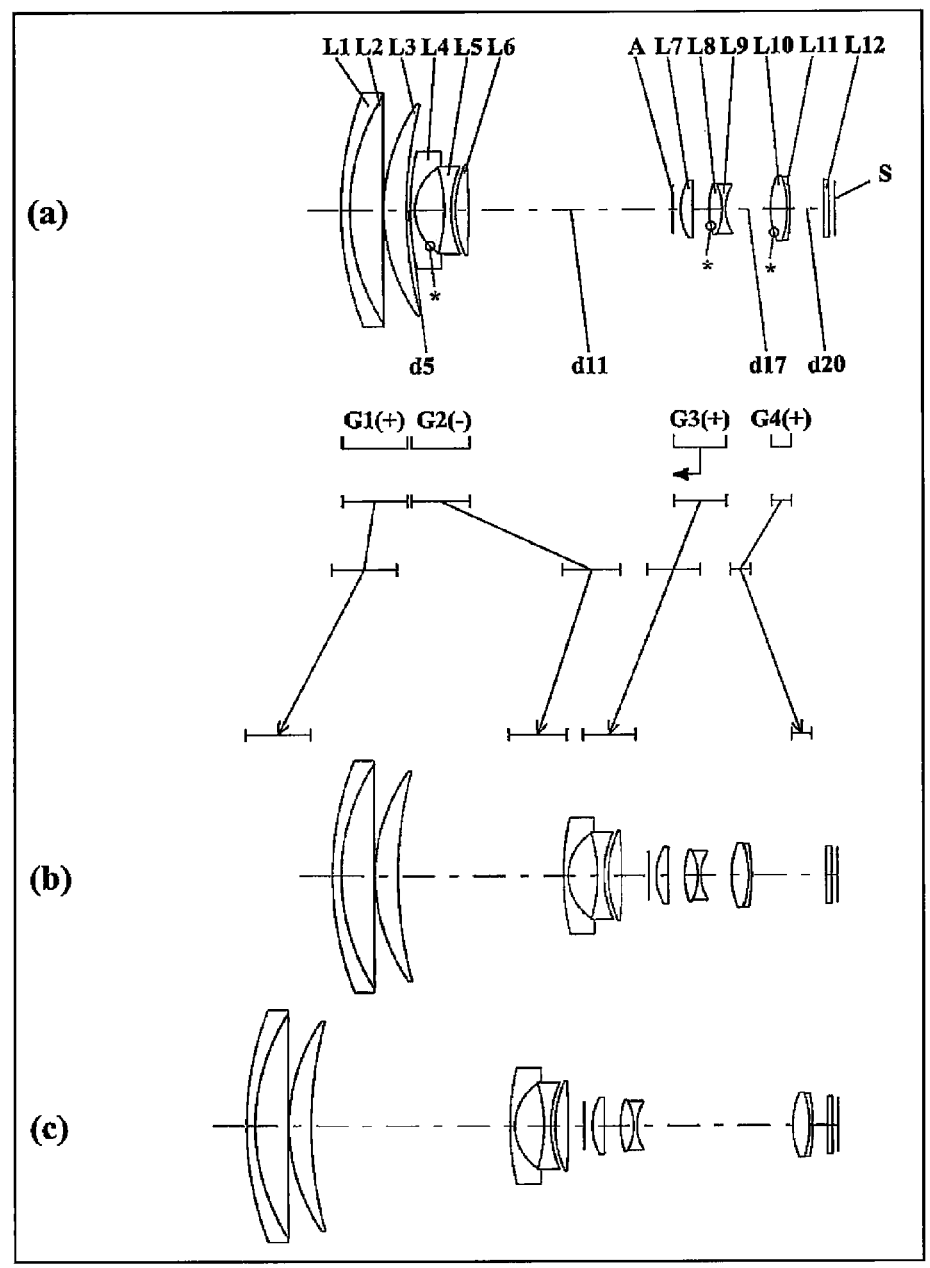
FIGS. 17(a)-(c) are a lens arrangement diagram showing an infinity in-focus condition of a zoom lens system according to Embodiment III-1 (Example III-1).
Figure 20:
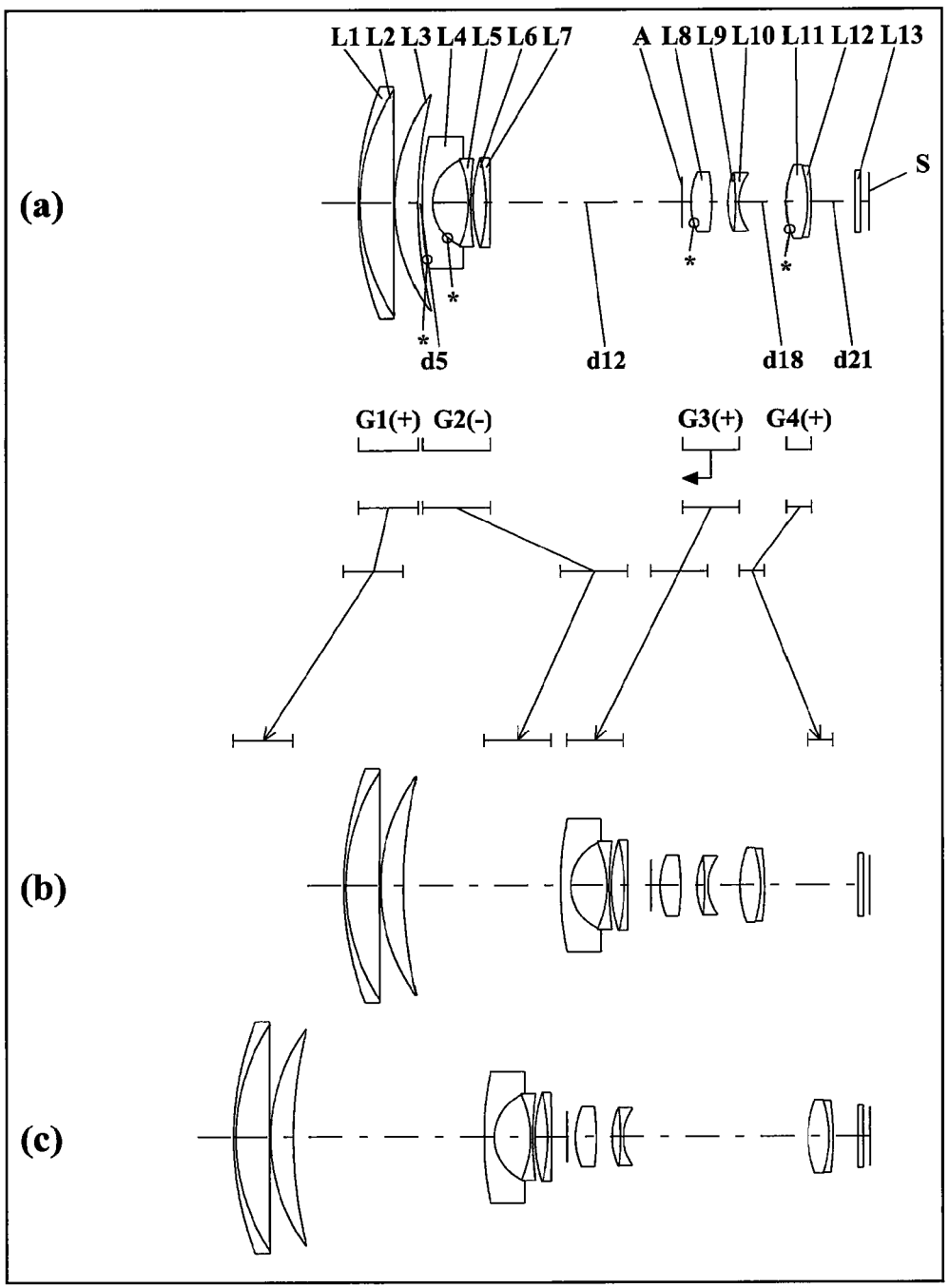
FIGS. 20(a)-(c) are a lens arrangement diagram showing an infinity in-focus condition of a zoom lens system according to Embodiment III-2 (Example III-2).
Figure 23:
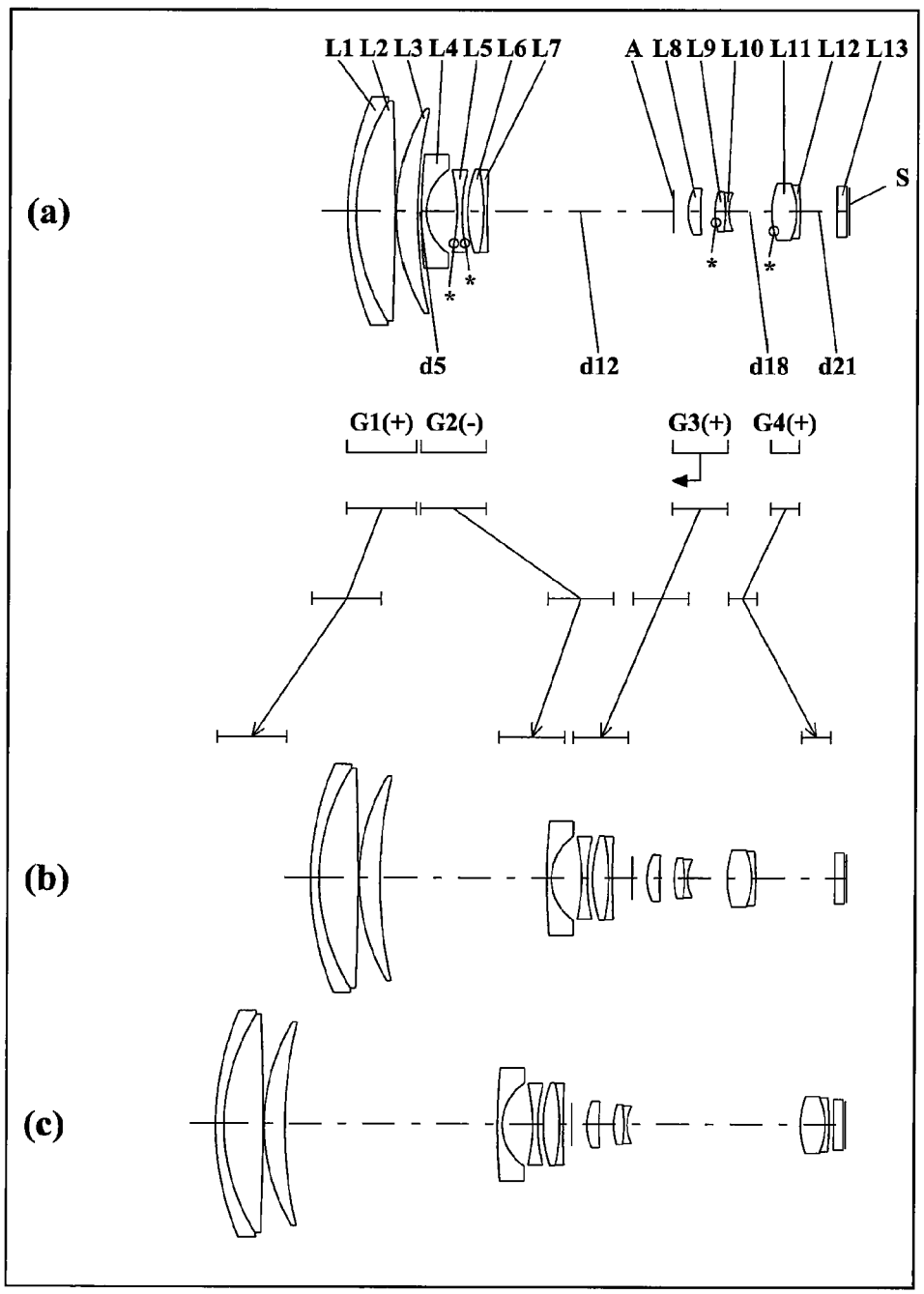
FIGS. 23(a)-(c) are a lens arrangement diagram showing an infinity in-focus condition of a zoom lens system according to Embodiment III-3 (Example III-3).
Figure 26:
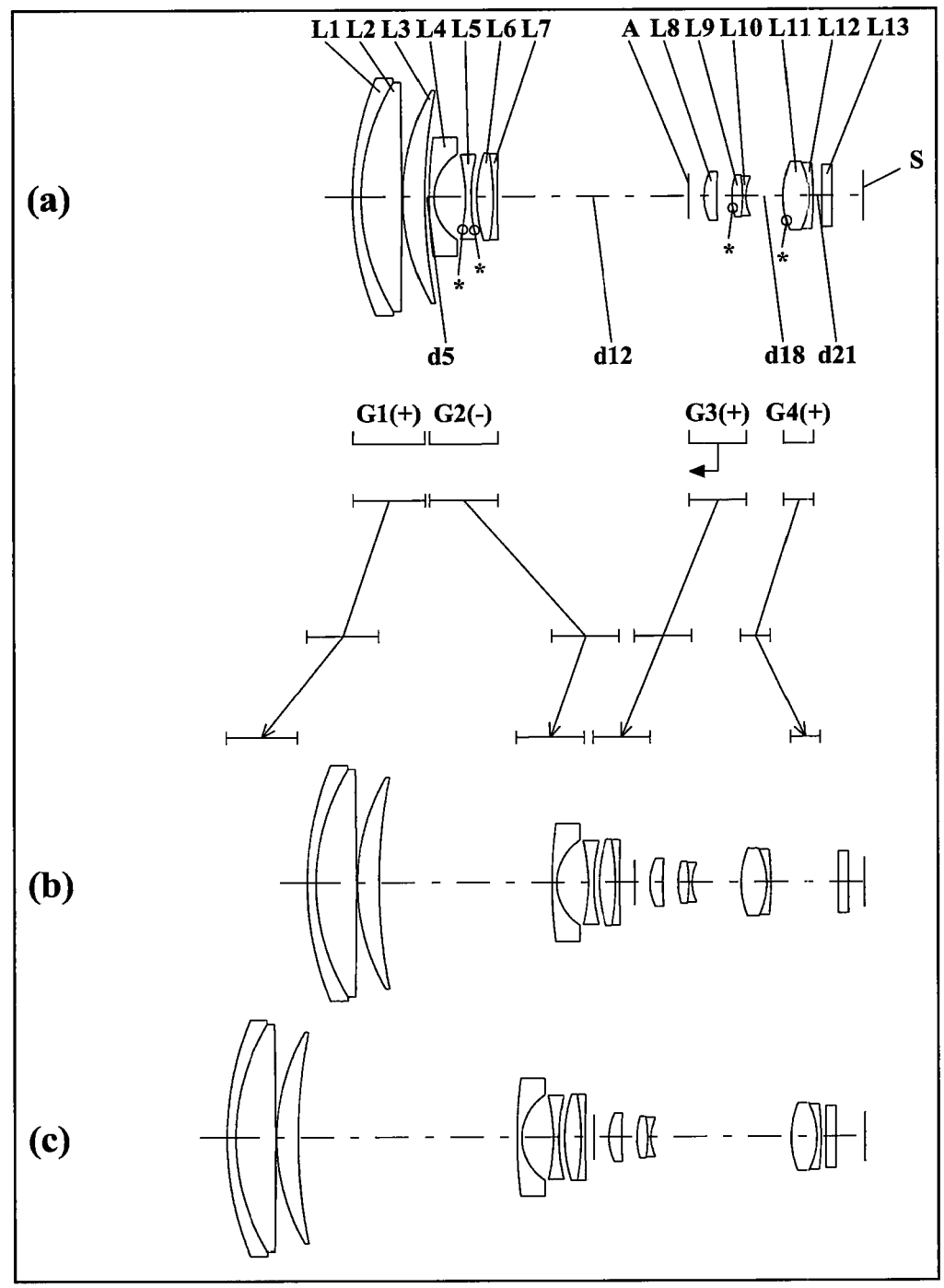
FIGS. 26(a)-(c) are a lens arrangement diagram showing an infinity in-focus condition of a zoom lens system according to Embodiment III-4 (Example III-4).

FIG. 17 is a lens arrangement diagram of a zoom lens system according to Embodiment III-1. FIG. 20 is a lens arrangement diagram of a zoom lens system according to Embodiment III-2. FIG. 23 is a lens arrangement diagram of a zoom lens system according to Embodiment III-3. FIG. 26 is a lens arrangement diagram of a zoom lens system according to Embodiment III-4.

FIGS. 17, 20, 23 and 26 show respectively a zoom lens system in an infinity in-focus condition. In each figure, part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W \cdot f_T)}$), and part (c) shows a lens configuration at a telephoto limit (in the maximum focal length condition: focal length $f_T$). Further, in each figure, bent arrows provided between part (a) and part (b) are lines obtained by connecting the positions of the lens units at a wide-angle limit, at a middle position and at a telephoto limit, in order from the top to the bottom. Thus, straight lines are used simply between a wide-angle limit and a middle position and between a middle position and a telephoto limit. That is, these straight lines do not indicate the actual motion of the individual lens units. Moreover, in each figure, an arrow provided to a lens unit indicates focusing from an infinity in-focus condition to a close-object in-focus condition, that is, the moving direction at the time of focusing from an infinity in-focus condition to a close-object in-focus condition.

The zoom lens system according to each embodiment, in order from the object side to the image side, comprises a first lens unit G1 having positive optical power, a second lens unit G2 having negative optical power, a third lens unit G3 having positive optical power, and a fourth lens unit G4 having positive optical power. Then, in zooming from a wide-angle limit to a telephoto limit, the first lens unit G1, the second lens unit G2, the third lens unit G3 and the fourth lens unit G4 all move along the optical axis (this lens configuration is referred to as the basic configuration III of Embodiments III-1 to III-4, hereinafter). In the zoom lens system according to each embodiment, these lens units are arranged into a desired optical power arrangement, so that a remarkably high zooming ratio exceeding 16 and high optical performance are achieved and still size reduction is realized in the entire lens system.

In FIGS. 17, 20, 23 and 26, an asterisk "*" provided to a particular surface indicates that the surface is aspheric. Further, in each figure, a symbol (+) or (−) provided to the sign of each lens unit corresponds to the sign of optical power of the lens unit. Moreover, in each figure, the straight line located on the most right-hand side indicates the position of an image surface S. On the object side relative to the image surface S (between the image surface S and the most image side lens surface of the fourth lens unit G4), a plane parallel plate such as an optical low-pass filter and a face plate of an image sensor is provided. Moreover, in each figure, a diaphragm A is provided between the most image side lens surface of the second lens unit G2 and the most object side lens surface of the third lens unit G3.

As shown in FIG. 17, in the zoom lens system according to Embodiment III-1, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment III-1, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment III-1, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Further, in the zoom lens system according to Embodiment III-1, the fourth lens unit G4, in order from the object side to the image side, comprises: a bi-convex tenth lens element L10; and a negative meniscus eleventh lens element L11 with the convex surface facing the image side. The tenth lens element L10 and the eleventh lens element L11 are cemented with each other.

Here, in the zoom lens system according to Embodiment III-1, a plane parallel plate L12 is provided on the object side relative to the image surface S (between the image surface S and the eleventh lens element L11).

In the zoom lens system according to Embodiment III-1, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 20, in the zoom lens system according to Embodiment III-2, the first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. Among these, the first lens element L1 and the second lens element L2 are cemented with each other.

In the zoom lens system according to Embodiment III-2, the second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. Among these, the sixth lens element L6 and the seventh lens element L7 are cemented with each other.

Further, in the zoom lens system according to Embodiment III-2, the third lens unit G3, in order from the object side to the image side, comprises: a bi-convex eighth lens element L8; a bi-convex ninth lens element L9; and a bi-concave tenth lens element L10. Among these, the ninth lens element L9 and the tenth lens element L10 are cemented with each other.

Further, in the zoom lens system according to Embodiment III-2, the fourth lens unit G4, in order from the object side to the image side, comprises: a bi-convex eleventh lens element L11; and a negative meniscus twelfth lens element L12 with the convex surface facing the image side. The eleventh lens element L11 and the twelfth lens element L12 are cemented with each other.

Here, in the zoom lens system according to Embodiment III-2, a plane parallel plate L13 is provided on the object side relative to the image surface S (between the image surface S and the twelfth lens element L12).

In the zoom lens system according to Embodiment III-2, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 23, in the zoom lens system according to Embodiment III-3, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

Further, in the zoom lens system according to Embodiment III-3, the second lens unit G2, in order from the object side to the image side, comprises: a negative meniscus fourth lens element L4 with the convex surface facing the object side; a bi-concave fifth lens element L5; a bi-convex sixth lens element L6; and a bi-concave seventh lens element L7. Among these, the sixth lens element L6 and the seventh lens element L7 are cemented with each other.

Further, in the zoom lens system according to Embodiment III-3, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiment III-3, the fourth lens unit G4, in order from the object side to the image side, comprises: a bi-convex eleventh lens element L11; and a negative meniscus twelfth lens element L12 with the convex surface facing the image side. The eleventh lens element L11 and the twelfth lens element L12 are cemented with each other.

Here, in the zoom lens system according to Embodiment III-3, a plane parallel plate L13 is provided on the object side relative to the image surface S (between the image surface S and the twelfth lens element L12).

In the zoom lens system according to Embodiment III-3, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

As shown in FIG. 26, in the zoom lens system according to Embodiment III-4, the first lens unit G1, in order from the object side to the image side, comprises: a negative meniscus first lens element L1 with the convex surface facing the object side; a bi-convex second lens element L2; and a positive meniscus third lens element L3 with the convex surface facing the object side. Among these, the first lens element L1 and the second lens element L2 are cemented with each other.

Further, in the zoom lens system according to Embodiment III-4, the second lens unit G2, in order from the object side to the image side, comprises: a negative meniscus fourth lens element L4 with the convex surface facing the object side; a bi-concave fifth lens element L5; a bi-convex sixth lens element L6; and a bi-concave seventh lens element L7. Among these, the sixth lens element L6 and the seventh lens element L7 are cemented with each other.

Further, in the zoom lens system according to Embodiment III-4, the third lens unit G3, in order from the object side to the image side, comprises: a positive meniscus eighth lens element L8 with the convex surface facing the object side; a bi-convex ninth lens element L9; and a bi-concave tenth lens element L10. Among these, the ninth lens element L9 and the tenth lens element L10 are cemented with each other.

Further, in the zoom lens system according to Embodiment III-4, the fourth lens unit G4, in order from the object side to the image side, comprises: a bi-convex eleventh lens element L11; and a negative meniscus twelfth lens element L12 with the convex surface facing the image side. The eleventh lens element L11 and the twelfth lens element L12 are cemented with each other.

Here, in the zoom lens system according to Embodiment III-4, a plane parallel plate L13 is provided on the object side relative to the image surface S (between the image surface S and the twelfth lens element L12).

In the zoom lens system according to Embodiment III-4, in zooming from a wide-angle limit to a telephoto limit, the first lens unit G1 and the third lens unit G3 move to the object side, while the second lens unit G2 moves to the image side, that is, such that the position at a wide-angle limit should be located on the object side relative to the position at a telephoto limit. Further, the fourth lens unit G4 moves with locus of a convex to the object side with changing the interval with the third lens unit G3.

In the zoom lens system according to each embodiment, in zooming from a wide-angle limit to a telephoto limit, the first lens unit G1, the second lens unit G2, the third lens unit G3 and the fourth lens unit G4 all move along the optical axis. Among these lens units, for example, the third lens unit is moved in a direction perpendicular to the optical axis, so that image blur caused by hand blurring, vibration and the like can be compensated optically.

In the present invention, when the image blur is to be compensated optically, the third lens unit moves in a direction perpendicular to the optical axis as described above, so that image blur is compensated in a state that size increase in the entire zoom lens system is suppressed and a compact construction is realized and that excellent imaging characteristics such as small decentering coma aberration and decentering astigmatism are satisfied.

The following description is given for conditions desired to be satisfied by a zoom lens system having the above-mentioned basic configuration III like the zoom lens system according to Embodiments III-1 to III-4. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

Further, all conditions described below hold only under the following two premise conditions, unless noticed otherwise.

$$16 < f_T/f_W$$

$$\omega > 35$$

where,
$f_T$ is a focal length of the entire system at a telephoto limit,
$f_W$ is a focal length of the entire system at a wide-angle limit, and
$\omega$ is a half view angle (°) at a wide-angle limit.

The zoom lens system having the basic configuration III satisfies the following condition (III-11).

$$0.036 < d1NG/d1G < 0.140 \tag{III-11}$$

where,
d 1 NG is an optical axial center thickness of the lens element having negative optical power contained in the first lens unit, and
d 1 G is an optical axial center thickness of the first lens unit.

The condition (III-11) sets forth the thickness of the lens element having negative optical power contained in the first lens unit. When the value exceeds the upper limit of the condition (III-11), the thickness of the entirety of the first lens unit is excessively great, and hence a compact zoom lens system is not achieved. In contrast, when the value goes below the lower limit of the condition (III-11), the lens element having negative optical power contained in the first lens unit cannot be fabricated.

Here, when at least any one of the following condition (III-11)' or (III-11)" and the following condition (III-11)''' or (III-11)'''' is satisfied, the above-mentioned effect is achieved more successfully.

$$0.075 < d1NG/d1G \tag{III-11}'$$

$$0.100 < d1NG/d1G \tag{III-11}'$$

$$d1NG/d1G < 0.135 \tag{III-11}$$

$$d1NG/d1G < 0.110 \tag{III-11}$$

In a zoom lens system having the above-mentioned basic configuration III like each zoom lens system according to Embodiments III-1 to III-4, it is preferable that the following condition (1) is satisfied.

$$0 < \sqrt{(f_4 \cdot f_W \cdot \tan \omega)}/L_W < 0.13 \tag{1}$$

where,
$\omega$ is a half view angle (°) at a wide-angle limit,
$L_W$ is an overall optical axial length of the entire system at a wide-angle limit (a distance from the most object side surface to the most image side surface),
$f_4$ is a focal length of the fourth lens unit, and
$f_W$ is a focal length of the entire system at a wide-angle limit.

The condition (1) substantially sets forth the focal length of the fourth lens unit. When the value exceeds the upper limit of the condition (1), the optical power of the fourth lens unit is excessively weak, and hence the necessary amount of movement in zooming increases. Thus, it is difficult in some cases to achieve a thin lens barrel configuration. This situation is not preferable. Further, when the value exceeds the upper limit of the condition (1), it becomes difficult in some cases to achieve a satisfactory peripheral illuminance on the image surface especially at a wide-angle limit.

In a zoom lens system having the above-mentioned basic configuration III like each zoom lens system according to Embodiments III-1 to III-4, it is preferable that the following condition (2) is satisfied.

$$0.05 \leq f_3/f_4 \leq 0.97 \tag{2}$$

where,
$f_3$ is a focal length of the third lens unit, and
$f_4$ is a focal length of the fourth lens unit.

The condition (2) sets forth the ratio between the focal length of the third lens unit and the focal length of the fourth lens unit. When the value exceeds the upper limit of the condition (2), the focal length of the third lens unit is excessively long. Thus, a possibility arises that the amount of movement of the third lens unit necessary for achieving a high magnification exceeding 16 increases excessively. Further, when the value exceeds the upper limit of the condition (2), in some cases, it becomes difficult that, for example, the third lens unit is moved in a direction perpendicular to the optical axis for blur compensation. In contrast, when the value goes below the lower limit of the condition (2), the focal length of the third lens unit is excessively short. Thus, a large aberration fluctuation arises in zooming so as to cause difficulty in compensation. Further, the absolute values of various kinds of aberration generated in the third lens unit increase excessively, and hence compensation becomes difficult. Thus, this situation is not preferable. Moreover, when the value goes below the lower limit of the condition (2), an excessively high error sensitivity to the inclination between the surfaces in the third lens unit is caused. This causes in some cases difficulty in assembling the optical system.

In a zoom lens system having the above-mentioned basic configuration III like each zoom lens system according to Embodiments III-1 to III-4, especially in a case that the second lens unit includes a lens element having negative optical power and being arranged on the most object side and a lens element having positive optical power, it is preferable that the following condition (3) is satisfied.

$$(nd_4-1)+(nd_6-1) \geq 1.8 \tag{3}$$

where, $nd_4$ is a refractive index to the d-line of a lens element having negative optical power and being arranged on the most object side in the second lens unit, and $nd_6$ is a refractive index to the d-line of a lens element having positive optical power in the second lens unit.

The condition (3) sets forth a condition desired to be satisfied by lens elements contained in the second lens unit. When the value falls outside the range of the condition (3), compensation of distortion and curvature of field is difficult especially at a wide-angle limit. Thus, this situation is not preferable.

Here, when the following condition (3)' is satisfied, the above-mentioned effect is achieved more successfully.

$$(nd_4-1)+(nd_6-1) \geq 1.9 \tag{3}'$$

In a zoom lens system having the above-mentioned basic configuration III like each zoom lens system according to Embodiments III-1 to III-4, it is preferable that the following condition (8) is satisfied.

$$0.15 < dG3/dG < 0.27 \tag{8}$$

where, dG 3 is an optical axial center thickness of the third lens unit, and dG is a sum of the optical axial thicknesses of the first lens unit, the second lens unit, the third lens unit and the fourth lens unit.

The condition (8) sets forth the optical axial thickness of the third lens unit. When the value exceeds the upper limit of the condition (8), the thickness of the third lens unit is excessively great, and hence it is difficult in some cases to achieve a compact lens system. Further, when the value exceeds the upper limit of the condition (8), the thickness of the third lens unit is excessively great, and hence it becomes difficult that, for example, the third lens unit is moved in a direction perpendicular to the optical axis for blur compensation. In contrast, when the value goes below the lower limit of the condition (8), difficulty arises in compensating various kinds of aberration to be compensated by the third lens unit, especially in compensating spherical aberration and coma aberration at a wide-angle limit. Thus, this situation is not preferable.

Here, when at least one of the following conditions (8)' and (8)" is satisfied, the above-mentioned effect is achieved more successfully.

$$0.19 < dG3/dG \tag{8}'$$

$$dG3/dG < 0.22 \tag{8}'$$

In a zoom lens system having the above-mentioned basic configuration III like each zoom lens system according to Embodiments III-1 to III-4, it is preferable that the following condition (9) is satisfied.

$$2.7 < \sqrt{(f_3^2+f_4^2)}/|f_2| < 3.6 \tag{9}$$

where, $f_2$ is a focal length of the second lens unit, $f_3$ is a focal length of the third lens unit, and $f_4$ is a focal length of the fourth lens unit.

The condition (9) sets forth the focal lengths of the lens units. When the value exceeds the upper limit of the condition (9), the absolute value of the optical power of the second lens unit is relatively strong excessively. Thus, compensation of various kinds of aberration, especially, compensation of distortion at a wide-angle limit, becomes difficult. Thus, this situation is not preferable. In contrast, when the value goes below the lower limit of the condition (9), the absolute value of the optical power of the second lens unit is relatively weak excessively. Thus, in a case that a zoom lens system having a high magnification is to be achieved, the necessary amount of movement of the second lens unit is excessively great. Thus, this situation is not preferable.

Here, when at least one of the following conditions (9)' and (9)" is satisfied, the above-mentioned effect is achieved more successfully.

$$2.8 < \sqrt{(f_3^2+f_4^2)}/|f_2| \tag{9}'$$

$$\sqrt{(f_3^2+f_4^2)}/|f_2| < 3.5 \tag{9}'$$

In a zoom lens system having the above-mentioned basic configuration III like each zoom lens system according to Embodiments III-1 to III-4, it is preferable that the following condition (10) is satisfied.

$$1.95 < m_{2T}/m_{34T} < 3.47 \tag{10}$$

where, $m_{2T}$ is a lateral magnification of the second lens unit at a telephoto limit, and $m_{34T}$ is a lateral magnification at a telephoto limit of a composite lens unit consisting of all lens units located on the image side relative to the second lens unit.

The condition (10) sets forth the magnification of the lens units at a telephoto limit. When the value exceeds the upper limit of the condition (10), the overall length at a telephoto limit is excessively great, and hence difficulty arises in realizing a compact zoom lens system. Further, for example, in a case that the lens units on the image side relative to the second lens unit are moved in a direction perpendicular to the optical axis so that blur compensation is achieved, an excessively large aberration fluctuation is caused. Thus, this situation is not preferable. In contrast, when the value goes below the lower limit of the condition (10), similarly, for example, in a case that the lens units on the image side relative to the second lens unit are moved in a direction perpendicular to the optical axis so that blur compensation is achieved, an excessively large aberration fluctuation is caused. Thus, this situation is not preferable.

Here, when at least one of the following conditions (10)' and (10)" is satisfied, the above-mentioned effect is achieved more successfully.

$$2.2 < m_{2T}/m_{34T} \quad (10)'$$

$$m_{2T}/m_{34T} < 3.2 \quad (10)'$$

In a zoom lens system having the above-mentioned basic configuration III like each zoom lens system according to Embodiments III-1 to III-4, it is preferable that the following condition (12) is satisfied.

$$0.11 < f_W \cdot \tan(\omega - \omega_0) < 0.15 \quad (12)$$

where, $f_W$ is a focal length of the entire system at a wide-angle limit, $\omega$ is a half view angle (real half view angle (°)) at a wide-angle limit, and $\omega_0$ is a paraxial half view angle (°) at a wide-angle limit.

The condition (12) sets forth the difference between the real half view angle and the paraxial half view angle at a wide-angle limit. This condition substantially controls distortion. When the value falls outside the range of the condition (12), distortion is excessively great. Thus, this situation is not preferable.

Here, when at least one of the following conditions (12)' and (12)" is satisfied, the above-mentioned effect is achieved more successfully.

$$0.12 < f_W \cdot \tan(\omega - \omega_0) \quad (12)'$$

$$f_W \cdot \tan(\omega - \omega_0) < 0.14 \quad (12)'$$

In a zoom lens system having the above-mentioned basic configuration III like each zoom lens system according to Embodiments III-1 to III-4, it is preferable that the following condition (13) is satisfied.

$$0.17 < f_4/f_T < 0.30 \quad (13)$$

where, $f_4$ is a focal length of the fourth lens unit, and $f_T$ is a focal length of the entire system at a telephoto limit.

The condition (13) sets forth the optical power of the fourth lens unit. When the value exceeds the upper limit of the condition (13), the focal length of the fourth lens unit is excessively long, that is, the optical power is excessively weak. Thus, difficulty arises in appropriately controlling the exit pupil position especially at a wide-angle limit. Accordingly, it is difficult in some cases to achieve a satisfactory image surface illuminance. In contrast, when the value goes below the lower limit of the condition (13), the focal length of the fourth lens unit is excessively short, that is, the optical power is excessively strong. Thus, it becomes difficult that large aberration generated in the fourth lens unit is compensated by other lens units. Thus, this situation is not preferable.

Here, when at least one of the following conditions (13)' and (13)" is satisfied, the above-mentioned effect is achieved more successfully.

$$0.19 < f_4/f_T \quad (13)'$$

$$f_4/f_T < 0.26 \quad (13)'$$

In a zoom lens system having the above-mentioned basic configuration III like each zoom lens system according to Embodiments III-1 to III-4, it is preferable that the following condition (14) is satisfied.

$$0.60 < |M_1/M_2| < 1.30 \quad (14)$$

where, $M_1$ is an amount of movement of the first lens unit in the optical axis direction during zooming from a wide-angle limit to a telephoto limit (movement from the image side to the object side is defined to be positive), and $M_2$ is an amount of movement of the second lens unit in the optical axis direction during zooming from a wide-angle limit to a telephoto limit (movement from the image side to the object side is defined to be positive).

The condition (14) sets forth the amount of movement of the first lens unit in the optical axis direction. When the value exceeds the upper limit of the condition (14), the amount of movement of the first lens unit is excessively large. Thus, the effective diameter of the first lens unit necessary for achieving a satisfactory F-number at a wide-angle limit increases. This causes difficulty in some cases in achieving a compact zoom lens system. In contrast, when the value goes below the lower limit of the condition (14), the amount of movement of the second lens unit necessary for achieving a satisfactory high magnification is relatively large excessively. Thus, it is difficult in some cases to achieve a compact zoom lens system.

Here, when at least one of the following conditions (14)' and (14)" is satisfied, the above-mentioned effect is achieved more successfully.

$$0.75 < |M_1/M_2| \quad (14)'$$

$$|M_1/M_2| < 1.15 \quad (14)'$$

In a zoom lens system having the above-mentioned basic configuration III like each zoom lens system according to Embodiments III-1 to III-4, it is preferable that the following condition (15) is satisfied.

$$0.4 < |M_3/M_2| < 1.2 \quad (15)$$

where, $M_2$ is an amount of movement of the second lens unit in the optical axis direction during zooming from a wide-angle limit to a telephoto limit (movement from the image side to the object side is defined to be positive), and $M_3$ is an amount of movement of the third lens unit in the optical axis direction during zooming from a wide-angle limit to a telephoto limit (movement from the image side to the object side is defined to be positive).

The condition (15) sets forth the amount of movement of the third lens unit in the optical axis direction. When the value exceeds the upper limit of the condition (15), the amount of movement of the third lens unit is excessively large. Thus, an excessively large aberration fluctuation is generated in the third lens unit during zooming. Accordingly, it is difficult in some cases to compensate this aberration by other lens units. In contrast, when the value goes below the lower limit of the condition (15), the amount of movement of the third lens unit is excessively small. Thus, a relatively excessively large amount of movement of the second lens unit is necessary for achieving a high magnification. Accordingly, it is difficult in some cases to achieve a compact zoom lens system.

In a zoom lens system having the above-mentioned basic configuration III like each zoom lens system according to Embodiments III-1 to III-4, it is preferable that the following condition (16) is satisfied.

$$0.35 < (m_{2T}/m_{2W})/(f_T/f_W) < 0.65 \quad (16)$$

where, $m_{2T}$ is a lateral magnification of the second lens unit at a telephoto limit, $m_{2W}$ is a lateral magnification of the second lens unit at a wide-angle limit, $f_T$ is a focal length of the entire system at a telephoto limit, and $f_W$ is a focal length of the entire system at a wide-angle limit.

The condition (16) sets forth a lateral magnification change in the second lens unit and substantially sets forth the degree of variable magnification load to the second lens unit. When the value exceeds the upper limit of the condition (16), the variable magnification load to the second lens unit is excessive. Thus, it is difficult in some cases to compensate various kinds of off-axial aberration, especially, distortion at a wide-angle limit. In contrast, when the value goes below the lower limit of the condition (16), the variable magnification load to the second lens unit is excessively small. Thus, the amount of movement of the third lens unit during zooming necessary for achieving a satisfactory high magnification becomes relatively large. Accordingly, it is difficult in some cases to achieve size reduction of the entire zoom lens system.

Here, when at least one of the following conditions (16)' and (16)" is satisfied, the above-mentioned effect is achieved more successfully.

$$0.40 < (m_{2T}/m_{2W})/(f_T/f_W) \quad (16)'$$

$$(m_{2T}/m_{2W})/(f_T/f_W) < 0.50 \quad (16)'$$

In a zoom lens system having the above-mentioned basic configuration III like each zoom lens system according to Embodiments III-1 to III-4, it is preferable that the following condition (17) is satisfied.

$$1.3 < m_{3T}/m_{3W} < 2.2 \quad (17)$$

where, $m_{3T}$ is a lateral magnification of the third lens unit at a telephoto limit, and $m_{3W}$ is a lateral magnification of the third lens unit at a wide-angle limit.

The condition (17) sets forth a lateral magnification change in the third lens unit and substantially sets forth the degree of variable magnification load to the third lens unit. When the value exceeds the upper limit of the condition (17), the variable magnification load to the third lens unit is excessive. Thus, difficulty arises in compensating various kinds of aberration that vary during magnification change, especially, in compensating off-axial aberration. Thus, this situation is not preferable. In contrast, when the value goes below the lower limit of the condition (17), the variable magnification load to the third lens unit is excessively small. Thus, a relatively excessively large amount of movement of the second lens unit is necessary for achieving a high magnification. Accordingly, it is difficult in some cases to achieve a compact zoom lens system.

Here, when at least one of the following conditions (17)' and (17)" is satisfied, the above-mentioned effect is achieved more successfully.

$$1.5 < m_{3T}/m_{3W} \quad (17)'$$

$$m_{3T}/m_{3W} < 2.0 \quad (17)$$

In a zoom lens system having the above-mentioned basic configuration III like each zoom lens system according to Embodiments III-1 to III-4, it is preferable that the following condition (18) is satisfied.

$$5.5 < \sqrt{(f_3^2 + f_4^2)}/(f_W \cdot \tan \omega) < 9.0 \quad (18)$$

where,

ω is a half view angle (°) at a wide-angle limit, $f_3$ is a focal length of the third lens unit, $f_4$ is a focal length of the fourth lens unit, and $f_W$ is a focal length of the entire system at a wide-angle limit.

The condition (18) sets forth the focal lengths of the third lens unit and the fourth lens unit. When the value exceeds the upper limit of the condition (18), the focal lengths of the third lens unit and the fourth lens unit are excessively long. This causes difficulty in some cases in achieving a compact zoom lens system. In contrast, when the value goes below the lower limit of the condition (18), the focal lengths of the third lens unit and the fourth lens unit are excessively short. Thus, aberration compensation capability especially of the third lens unit is excessive. Accordingly, it is difficult in some cases to achieve satisfactory balance of aberration compensation in the entire zoom lens system.

Here, when at least one of the following conditions (18)' and (18)" is satisfied, the above-mentioned effect is achieved more successfully.

$$6.8 < \sqrt{(f_3^2 + f_4^2)}/(f_W \cdot \tan \omega) \quad (18)'$$

$$\sqrt{(f_3^2 + f_4^2)}/(f_W \cdot \tan \omega) < 7.5 \quad (18)'$$

In a zoom lens system having the above-mentioned basic configuration III like each zoom lens system according to Embodiments III-1 to III-4, it is preferable that the following condition (19) is satisfied.

$$3.0 < (L_T - L_W)/(f_W \cdot \tan \omega) < 6.0 \quad (19)$$

where,

ω is a half view angle (°) at a wide-angle limit, $L_T$ is an overall optical axial length of the entire system at a telephoto limit (a distance from the most object side surface to the most image side surface), $L_W$ is an overall optical axial length of the entire system at a wide-angle limit (a distance from the most object side surface to the most image side surface), and $f_W$ is a focal length of the entire system at a wide-angle limit.

The condition (19) sets forth an overall length change during zooming. When the value falls outside the range of the condition (19), it is difficult to construct a compact lens barrel mechanism. Thus, this situation is not preferable.

Here, when at least one of the following conditions (19)' and (19)" is satisfied, the above-mentioned effect is achieved more successfully.

$$3.5 < (L_T - L_W)/(f_W \cdot \tan \omega) \quad (19)'$$

$$(L_T - L_W)/(f_W \cdot \tan \omega) < 4.5 \quad (19)'$$

In a zoom lens system having the above-mentioned basic configuration III like each zoom lens system according to Embodiments III-1 to III-4, it is preferable that the following condition (20) is satisfied.

$$50 < (L_T \cdot f_T)/f_4(f_W \cdot \tan \omega) < 150 \quad (20)$$

where,

ω is a half view angle (°) at a wide-angle limit, $L_T$ is an overall optical axial length of the entire system at a telephoto limit (a distance from the most object side surface to the most image side surface), $f_4$ is a focal length of the fourth lens unit, $f_T$ is a focal length of the entire system at a telephoto limit, and $f_W$ is a focal length of the entire system at a wide-angle limit.

The condition (20) sets forth a suitable overall length at a telephoto limit. When the value exceeds the upper limit of the condition (20), the overall length at a telephoto limit is excessively long, and hence it is difficult in some cases to achieve a compact zoom lens system having a short overall length. Further, when the value exceeds the upper limit of the condition (20), the overall length at a telephoto limit is excessively long. Thus, it becomes difficult to construct a compact lens barrel mechanism. Accordingly, this situation is not preferable. In contrast, when the value goes below the lower limit of the condition (20), the focal length of the fourth lens unit is, relatively, excessively long. Thus, it becomes difficult to control the exit pupil position at a wide-angle limit. Accordingly, it becomes difficult to maintain an appropriate image surface illuminance. Thus, this situation is not preferable.

Here, when at least one of the following conditions (20)' and (20)" is satisfied, the above-mentioned effect is achieved more successfully.

$$80 < (L_T \cdot f_T)/f_4(f_W \cdot \tan \omega) \quad (20)'$$

$$(L_T \cdot f_T)/f_4(f_W \cdot \tan \omega) < 125 \quad (20)'$$

In a zoom lens system having the above-mentioned basic configuration III like each zoom lens system according to Embodiments III-1 to III-4, it is preferable that the following condition (21) is satisfied.

$$50 < (L_W \cdot f_T)/f_4(f_W \cdot \tan \omega) < 125 \quad (21)$$

where,

ω is a half view angle (°) at a wide-angle limit, $L_W$ is an overall optical axial length of the entire system at a wide-angle limit (a distance from the most object side surface to the most image side surface), $f_4$ is a focal length of the fourth lens unit, $f_T$ is a focal length of the entire system at a telephoto limit, and $f_W$ is a focal length of the entire system at a wide-angle limit.

The condition (21) sets forth a suitable overall length at a wide-angle limit. When the value exceeds the upper limit of the condition (21), the overall length at a wide-angle limit is excessively long, and hence it is difficult in some cases to achieve a zoom lens system having a compact accommodation size. In contrast, when the value goes below the lower limit of the condition (21), the focal length of the fourth lens unit is, relatively, excessively long. Thus, it becomes difficult to control the exit pupil position at a wide-angle limit. Accordingly, it becomes difficult to maintain an appropriate image surface illuminance. Thus, this situation is not preferable.

Here, when at least one of the following conditions (21)' and (21)" is satisfied, the above-mentioned effect is achieved more successfully.

$$65 < (L_W \cdot f_T)/f_4(f_W \cdot \tan \omega) \quad (21)'$$

$$(L_W \cdot f_T)/f_4(f_W \cdot \tan \omega) < 100 \quad (21)'$$

In a zoom lens system having the above-mentioned basic configuration III like each zoom lens system according to Embodiments III-1 to III-4, it is preferable that the following condition (22) is satisfied.

$$4.0 < f_3/f_W \cdot \tan \omega < 5.2 \quad (22)$$

where,

ω is a half view angle (°) at a wide-angle limit, $f_3$ is a focal length of the third lens unit, and $f_W$ is a focal length of the entire system at a wide-angle limit.

The condition (22) sets forth the focal length of the third lens unit. When the value exceeds the upper limit of the condition (22), the focal length of the third lens unit is excessively long. This causes difficulty in some cases in achieving a compact zoom lens system. Further, when the value exceeds the upper limit of the condition (22), the necessary amount of movement in a case that, for example, the third lens unit is moved in a direction perpendicular to the optical axis for blur compensation becomes excessively large. Thus, this situation is not preferable. In contrast, when the value goes below the lower limit of the condition (22), the focal length of the third lens unit is excessively short. Thus, the aberration compensation capability of the third lens unit is excessive, and hence the compensation balance of various kinds of aberration is degraded. This causes difficulty in some cases in achieving a compact zoom lens system.

Here, when at least one of the following conditions (22)' and (22)" is satisfied, the above-mentioned effect is achieved more successfully.

$$4.4 < f_3/f_W \cdot \tan \omega \quad (22)'$$

$$f_3/f_W \cdot \tan \omega < 4.8 \quad (22)'$$

Here, the lens units constituting the zoom lens system of each embodiment are composed exclusively of refractive type lenses that deflect the incident light by refraction (that is, lenses of a type in which deflection is achieved at the interface between media each having a distinct refractive index). However, the lens type is not limited to this. For example, the lens units may employ diffractive type lenses that deflect the incident light by diffraction; refractive-diffractive hybrid type lenses that deflect the incident light by a combination of diffraction and refraction; or gradient index type lenses that deflect the incident light by distribution of refractive index in the medium.

Further, in each embodiment, a reflecting surface may be arranged in the optical path so that the optical path may be bent before, after or in the middle of the zoom lens system. The bending position may be set up in accordance with the necessity. When the optical path is bent appropriately, the apparent thickness of a camera can be reduced.

Moreover, each embodiment has been described for the case that a plane parallel plate such as an optical low-pass filter is arranged between the last surface of the zoom lens system (the most image side surface of the fourth lens unit) and the image surface S. This low-pass filter may be: a birefringent type low-pass filter made of, for example, a crystal whose predetermined crystal orientation is adjusted; or a phase type low-pass filter that achieves required characteristics of optical cut-off frequency by diffraction.

Embodiment III-5

Figure 29:
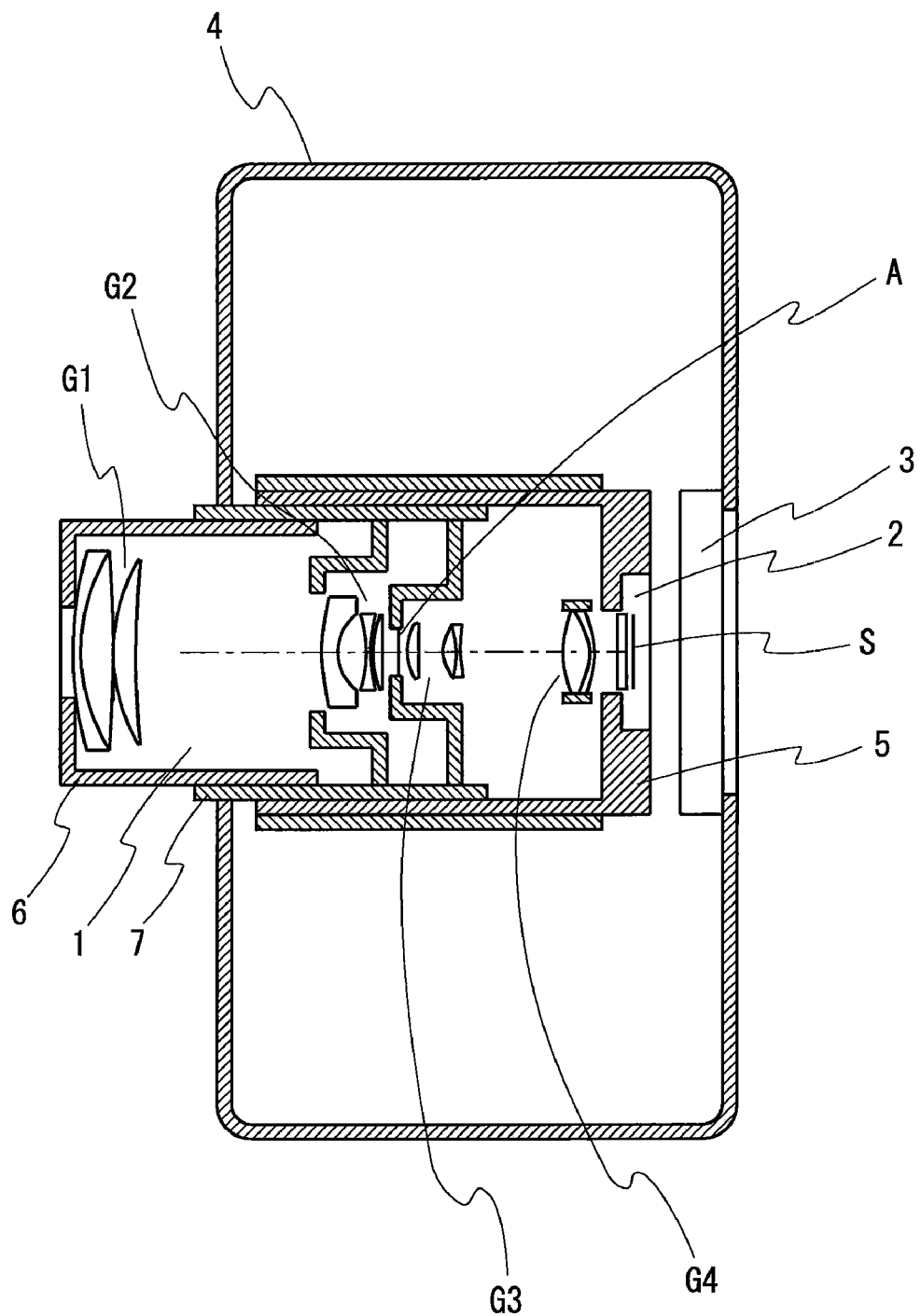
FIG. 29 is a schematic construction diagram of a digital still camera according to Embodiment III-5.

FIG. 29 is a schematic construction diagram of a digital still camera according to Embodiment III-5. In FIG. 29, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment III-1. In FIG. 29, the zoom lens system 1 comprises a first lens unit G1, a second lens unit G2, a diaphragm A, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

The lens barrel comprises a main barrel 5, a moving barrel 6 and a cylindrical cam 7. When the cylindrical cam 7 is rotated, the first lens unit G1, the second lens unit G2, the third lens unit G3 and the fourth lens unit G4 move to predetermined positions relative to the image sensor 2, so that magnification change can be achieved ranging from a wide-angle limit to a telephoto limit. The fourth lens unit G4 is movable in an optical axis direction by a motor for focus adjustment.

As such, when the zoom lens system according to Embodiment III-1 is employed in a digital still camera, a small digital still camera is obtained that has a high resolution and high capability of compensating the curvature of field and that has a short overall optical length of lens system at the time of non-use. Here, in the digital still camera shown in FIG. 29, any one of the zoom lens systems according to Embodiments III-2 to III-4 may be employed in place of the zoom lens system according to Embodiment III-1. Further, the optical system of the digital still camera shown in FIG. 29 is applicable also to a digital video camera for moving images. In this case, moving images with high resolution can be acquired in addition to still images.

Further, an imaging device comprising a zoom lens system according to Embodiments III-1 to III-4 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments I-1 to I-5, II-1 to II-5 and III-1 to III-4 are implemented. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1+\sqrt{1-(1+\kappa)(h/r)^2}} + A4h^4 + A6h^6 + A8h^8 + A10h^{10} + A12h^{12}$$

Here, κ is the conic constant, and A4, A6, A8, A10 and A12 are a fourth-order, sixth-order, eighth-order, tenth-order and twelfth-order aspherical coefficients, respectively.

Figure 2:
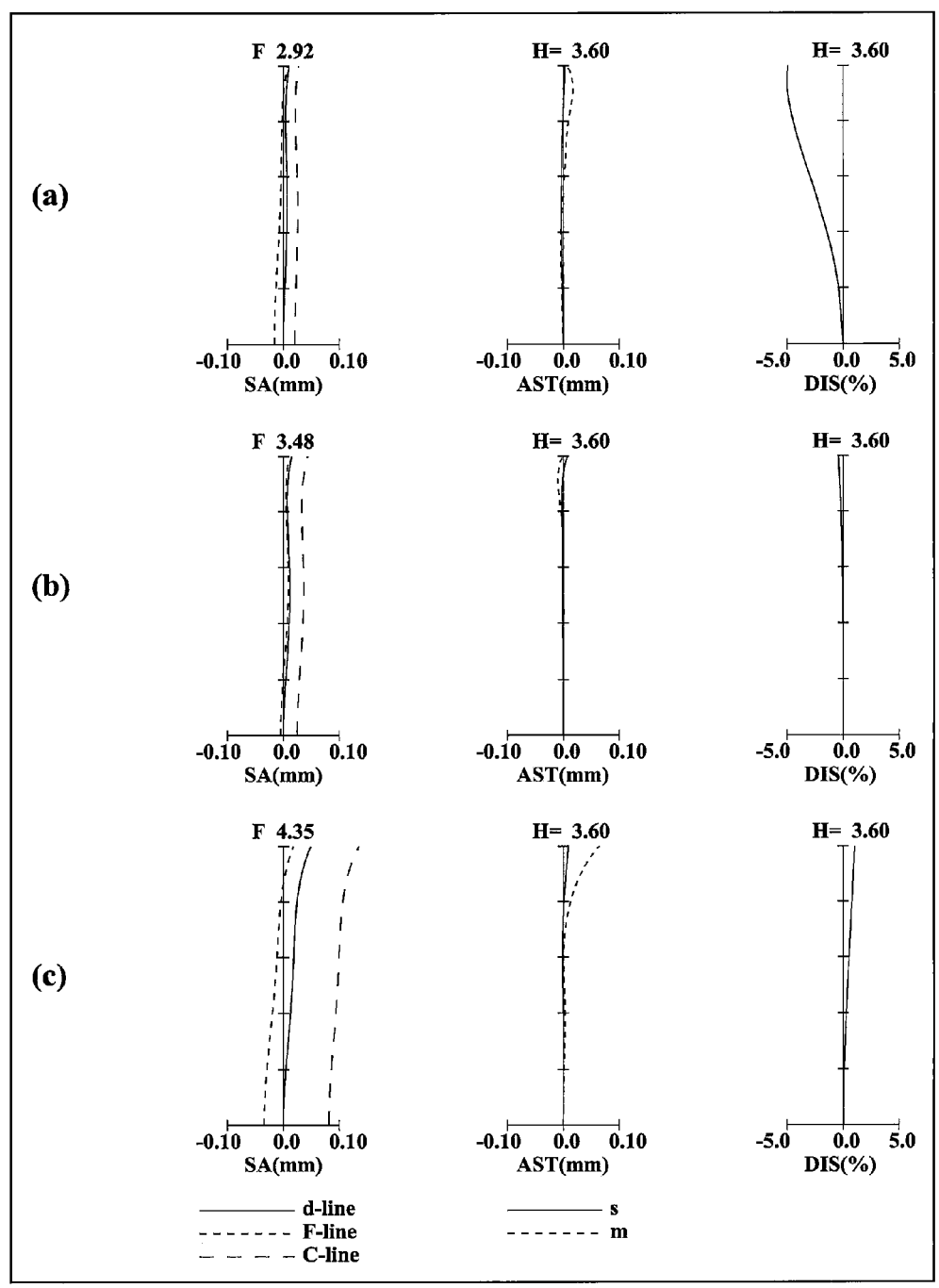
FIGS. 2(a)-(c) are a longitudinal aberration diagram of an infinity in-focus condition of a zoom lens system according to Examples I-1 and II-1.
Figure 5:
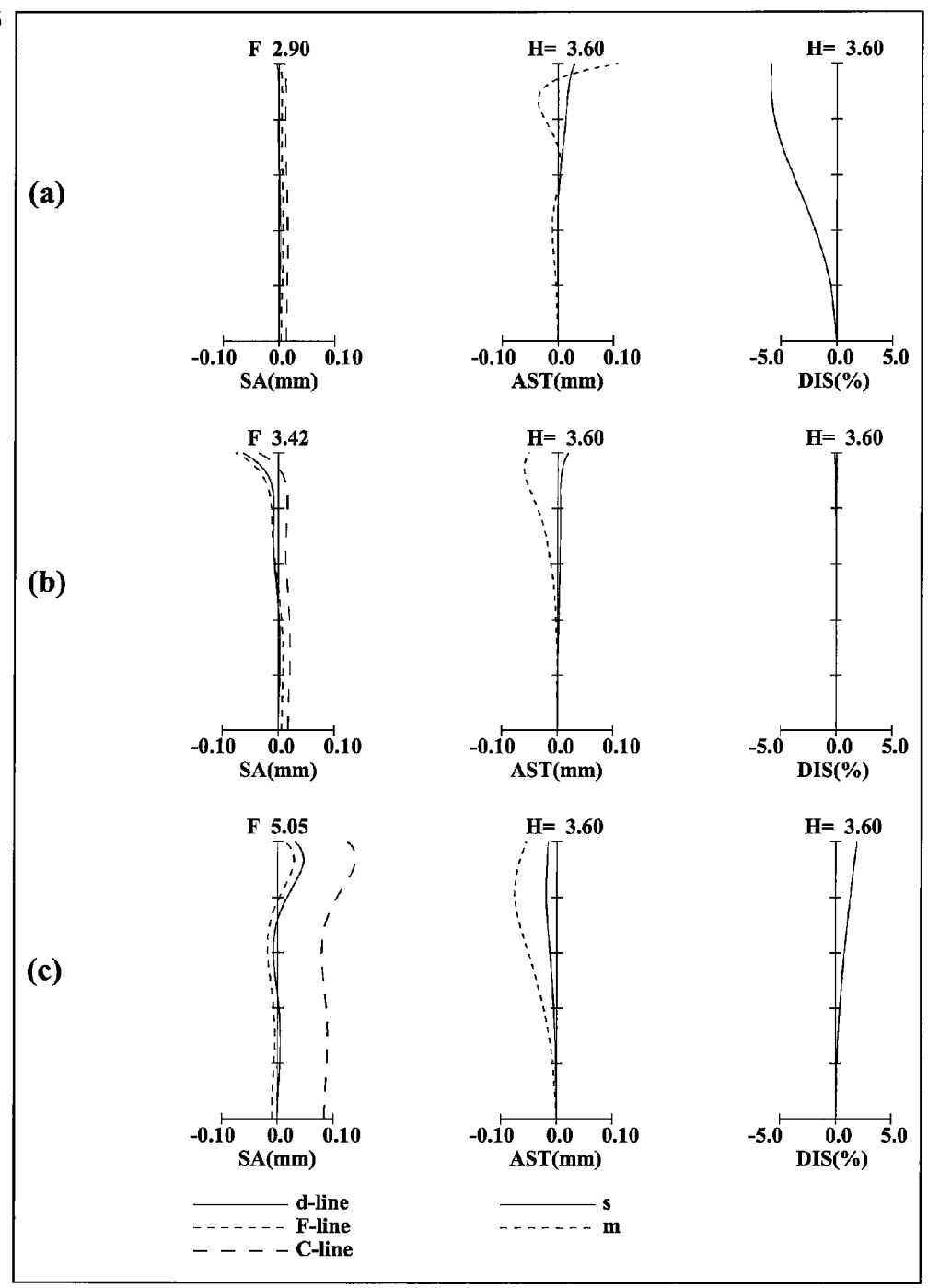
FIGS. 5(a)-(c) are a longitudinal aberration diagram of an infinity in-focus condition of a zoom lens system according to Examples I-2 and II-2.
Figure 8:
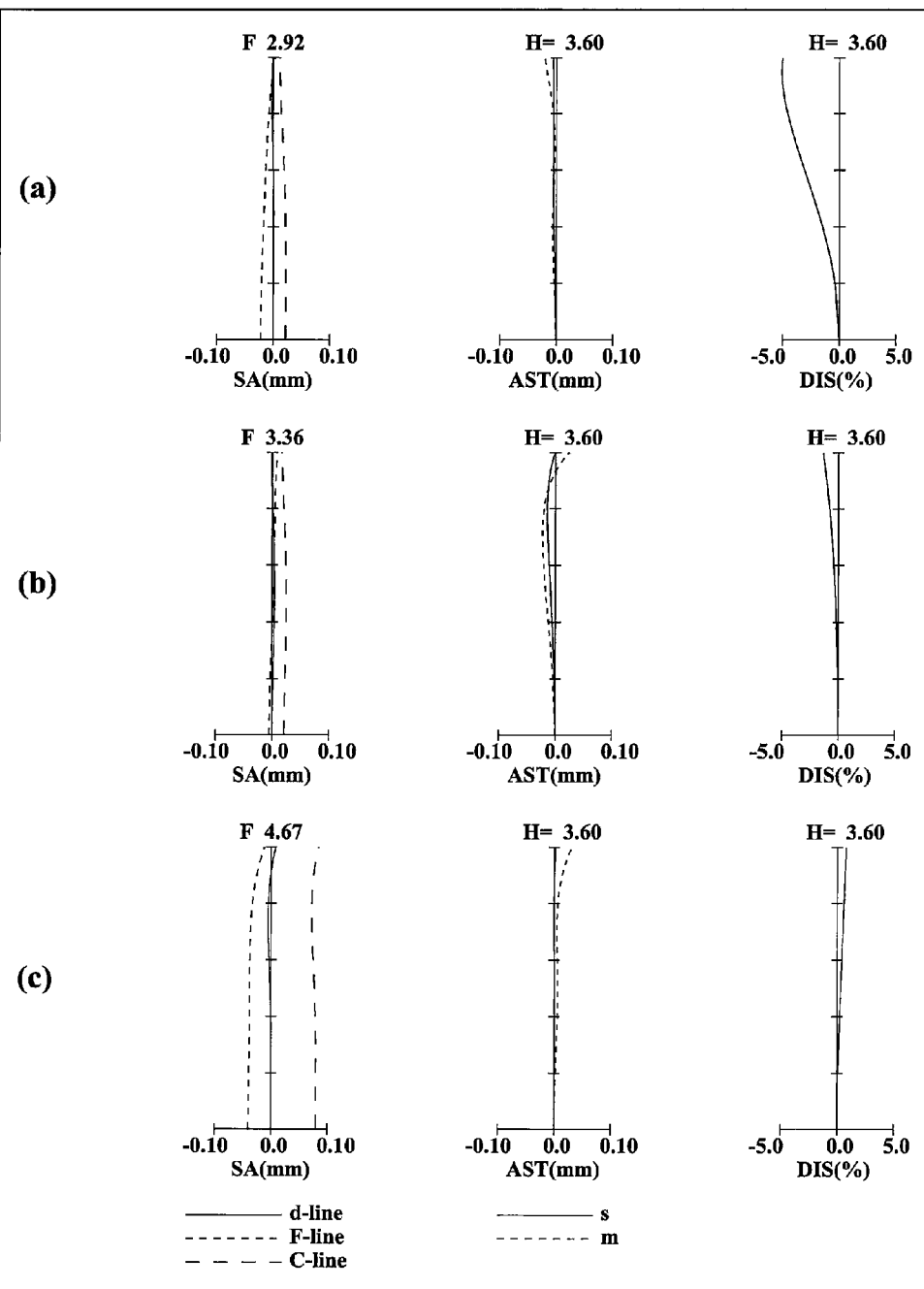
FIGS. 8(a)-(c) are a longitudinal aberration diagram of an infinity in-focus condition of a zoom lens system according to Examples I-3 and II-3.
Figure 11:
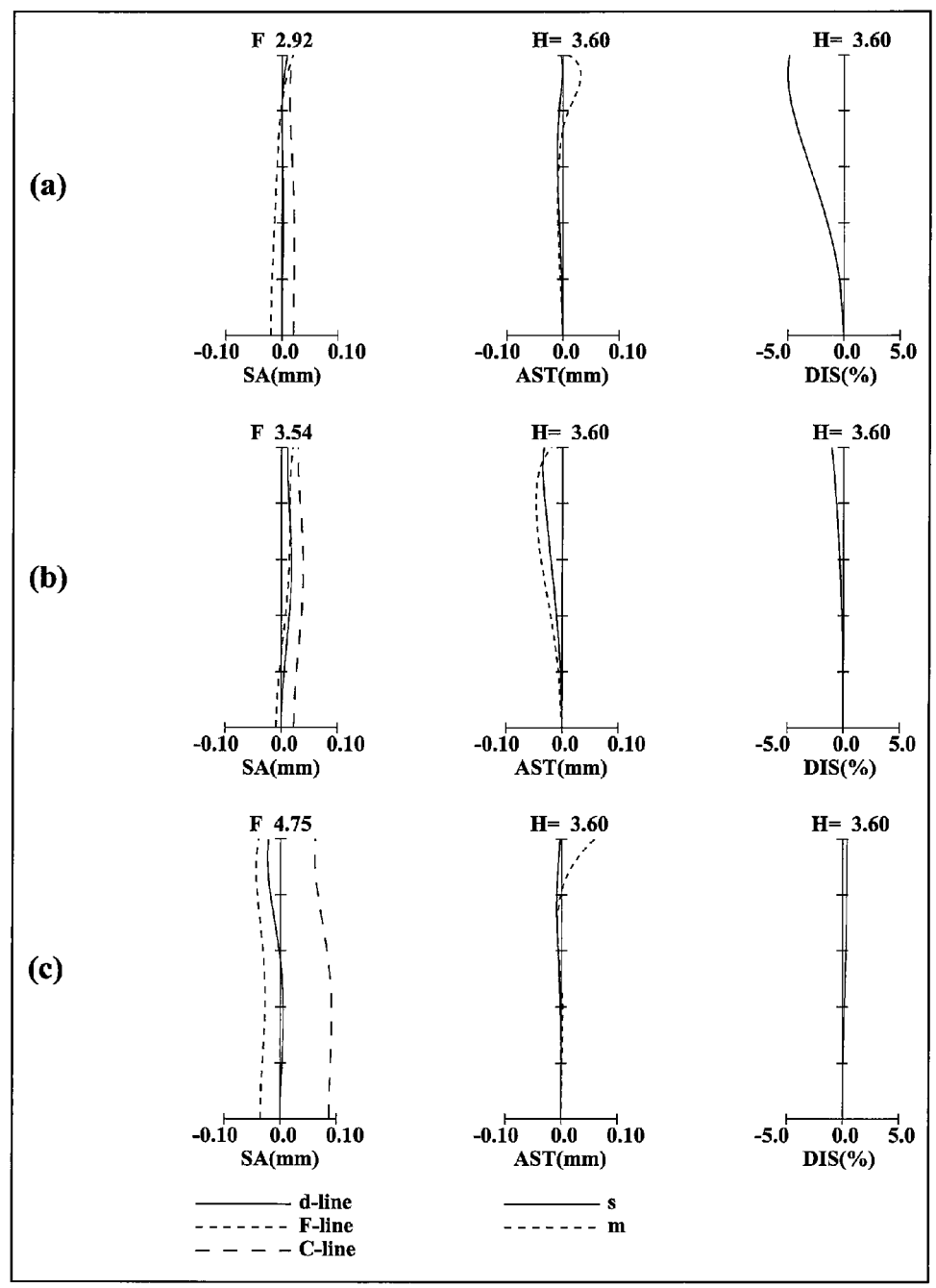
FIGS. 11(a)-(c) are a longitudinal aberration diagram of an infinity in-focus condition of a zoom lens system according to Examples I-4 and II-4.
Figure 14:
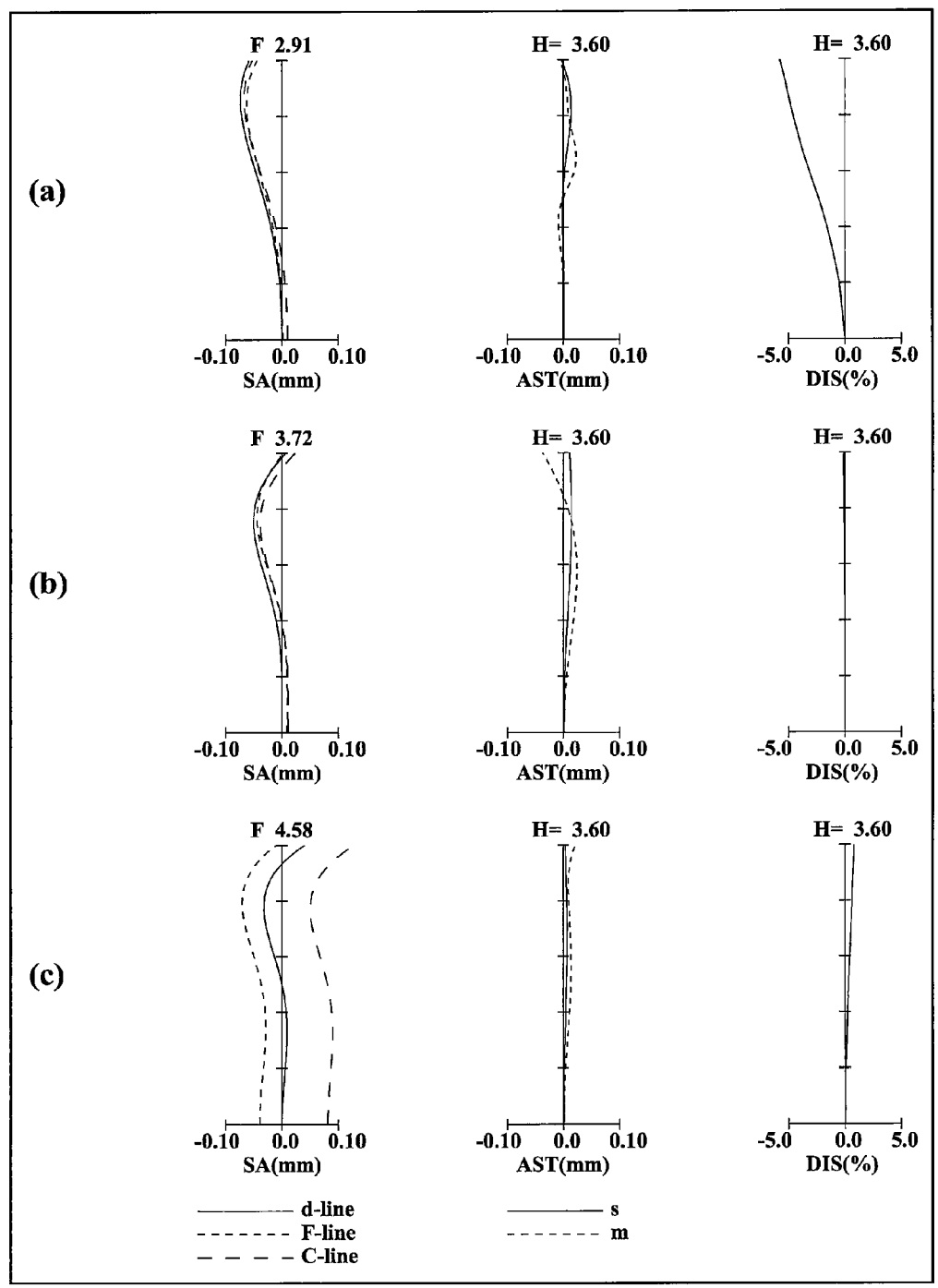
FIGS. 14(a)-(c) are a longitudinal aberration diagram of an infinity in-focus condition of a zoom lens system according to Examples I-5 and II-5.

FIG. 2 is a longitudinal aberration diagram of a zoom lens system according to Examples I-1 and II-1. FIG. 5 is a longitudinal aberration diagram of a zoom lens system according to Examples I-2 and II-2. FIG. 8 is a longitudinal aberration diagram of a zoom lens system according to Examples I-3 and II-3. FIG. 11 is a longitudinal aberration diagram of a zoom lens system according to Examples I-4 and II-4. FIG. 14 is a longitudinal aberration diagram of a zoom lens system according to Examples I-5 and II-5.

Figure 18:
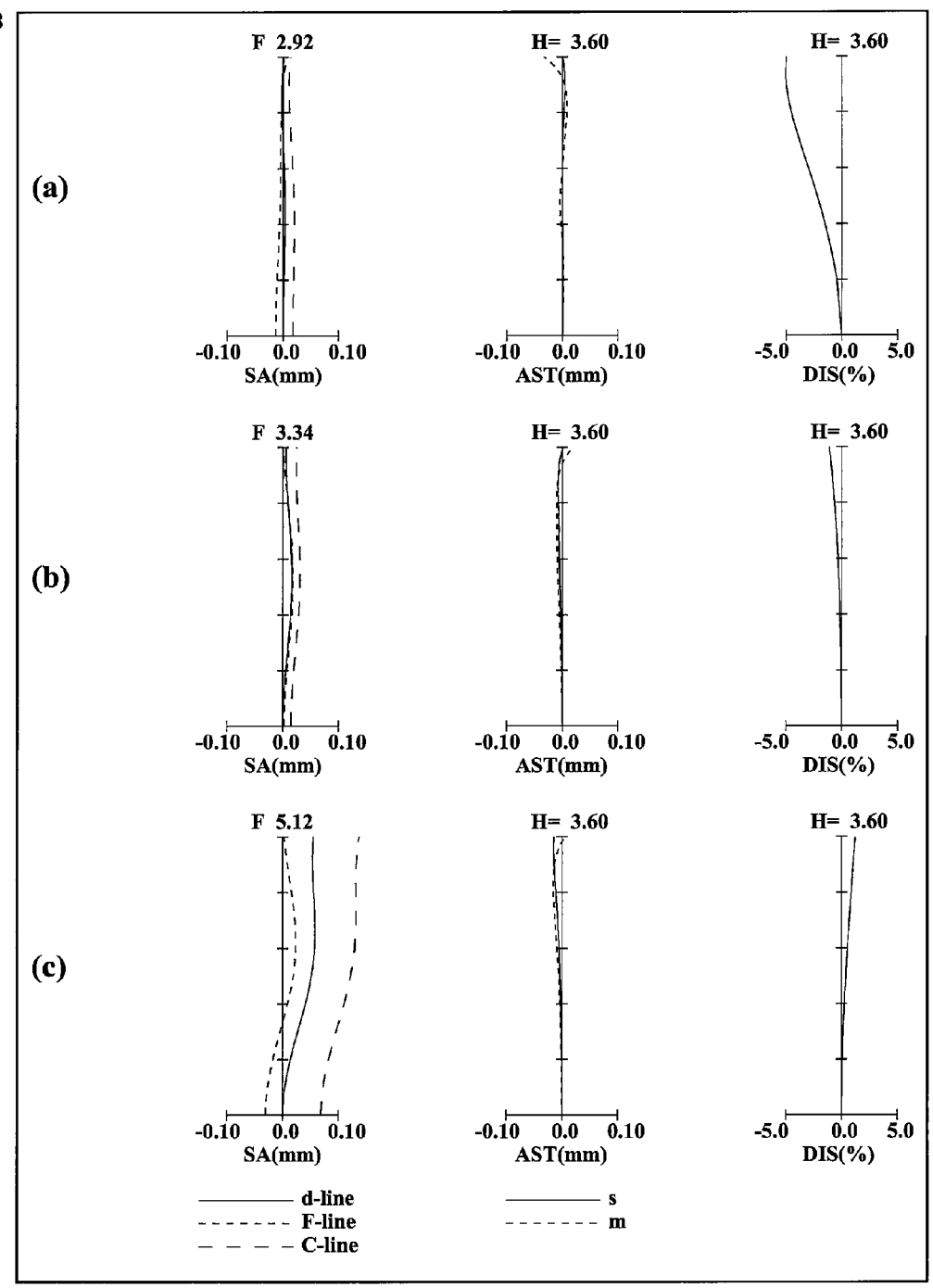
FIGS. 18(a)-(c) are a longitudinal aberration diagram of an infinity in-focus condition of a zoom lens system according to Example III-1.
Figure 21:
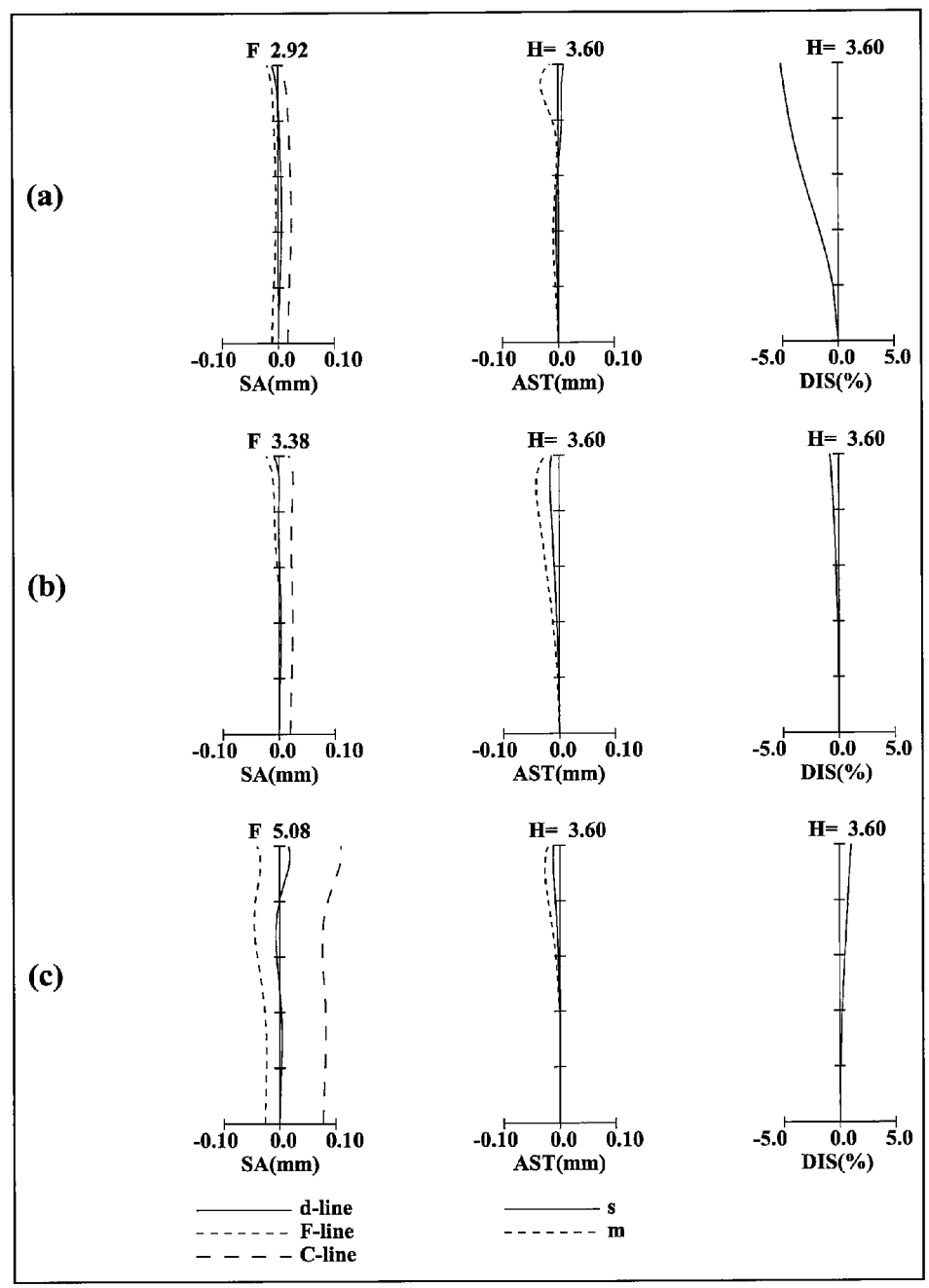
FIGS. 21(a)-(c) are a longitudinal aberration diagram of an infinity in-focus condition of a zoom lens system according to Example III-2.
Figure 24:
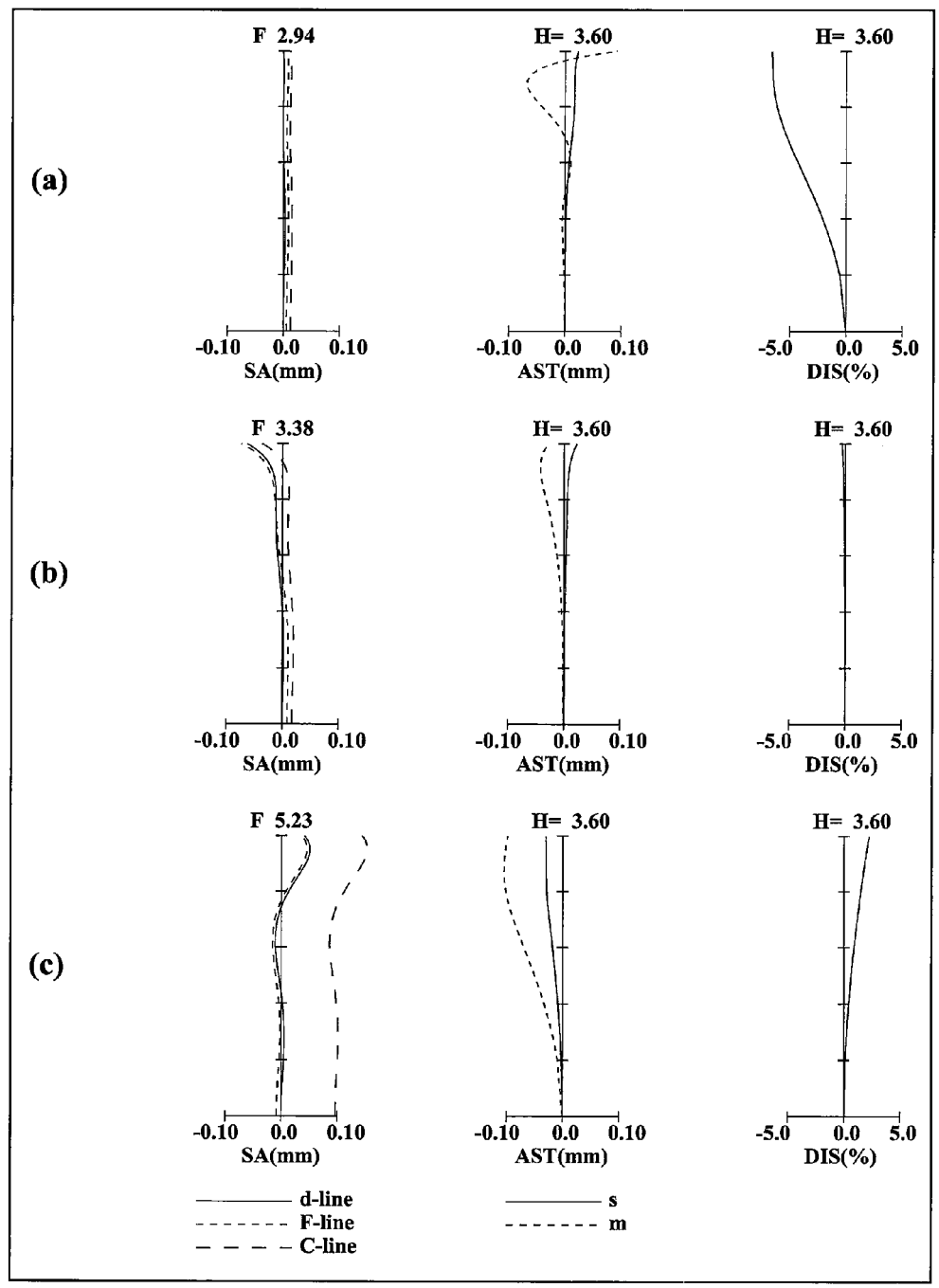
FIGS. 24(a)-(c) are a longitudinal aberration diagram of an infinity in-focus condition of a zoom lens system according to Example III-3.
Figure 27:
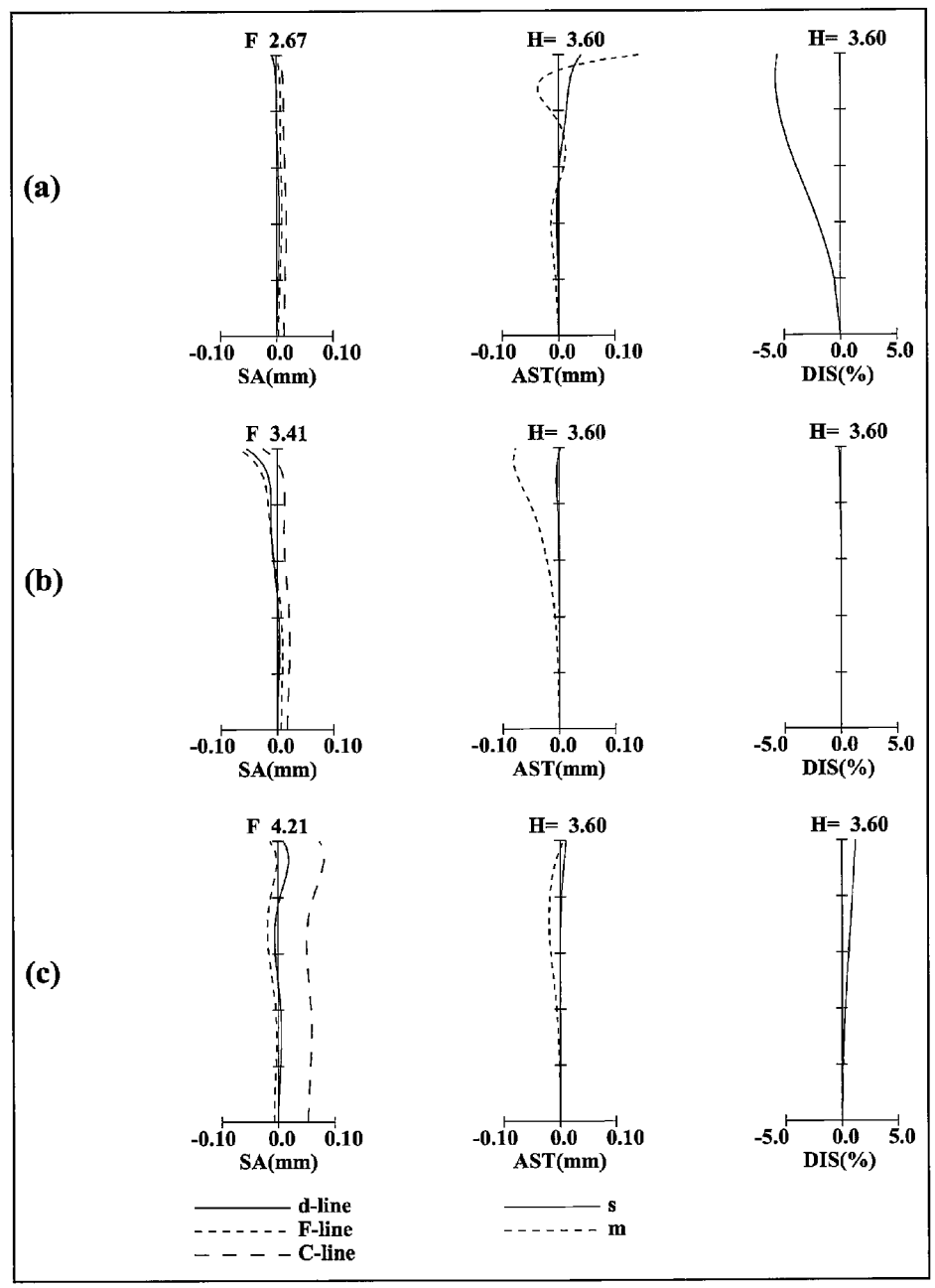
FIGS. 27(a)-(c) are a longitudinal aberration diagram of an infinity in-focus condition of a zoom lens system according to Example III-4.

FIG. 18 is a longitudinal aberration diagram of a zoom lens system according to Example III-1. FIG. 21 is a longitudinal aberration diagram of a zoom lens system according to Example III-2. FIG. 24 is a longitudinal aberration diagram of a zoom lens system according to Example III-3. FIG. 27 is a longitudinal aberration diagram of a zoom lens system according to Example III-4.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each FIG., indicated as F), and the solid line, the short dash line and the long dash line indicate the characteristics to the d-line, the F-line and the C-line, respectively. In each astigmatism diagram, the vertical axis indicates the image height (in each FIG., indicated as H), and the solid line and the dash line indicate the characteristics to the sagittal plane (in each FIG., indicated as "s") and the meridional plane (in each FIG., indicated as "m"), respectively. In each distortion diagram, the vertical axis indicates the image height (in each FIG., indicated as H).

Figure 3:
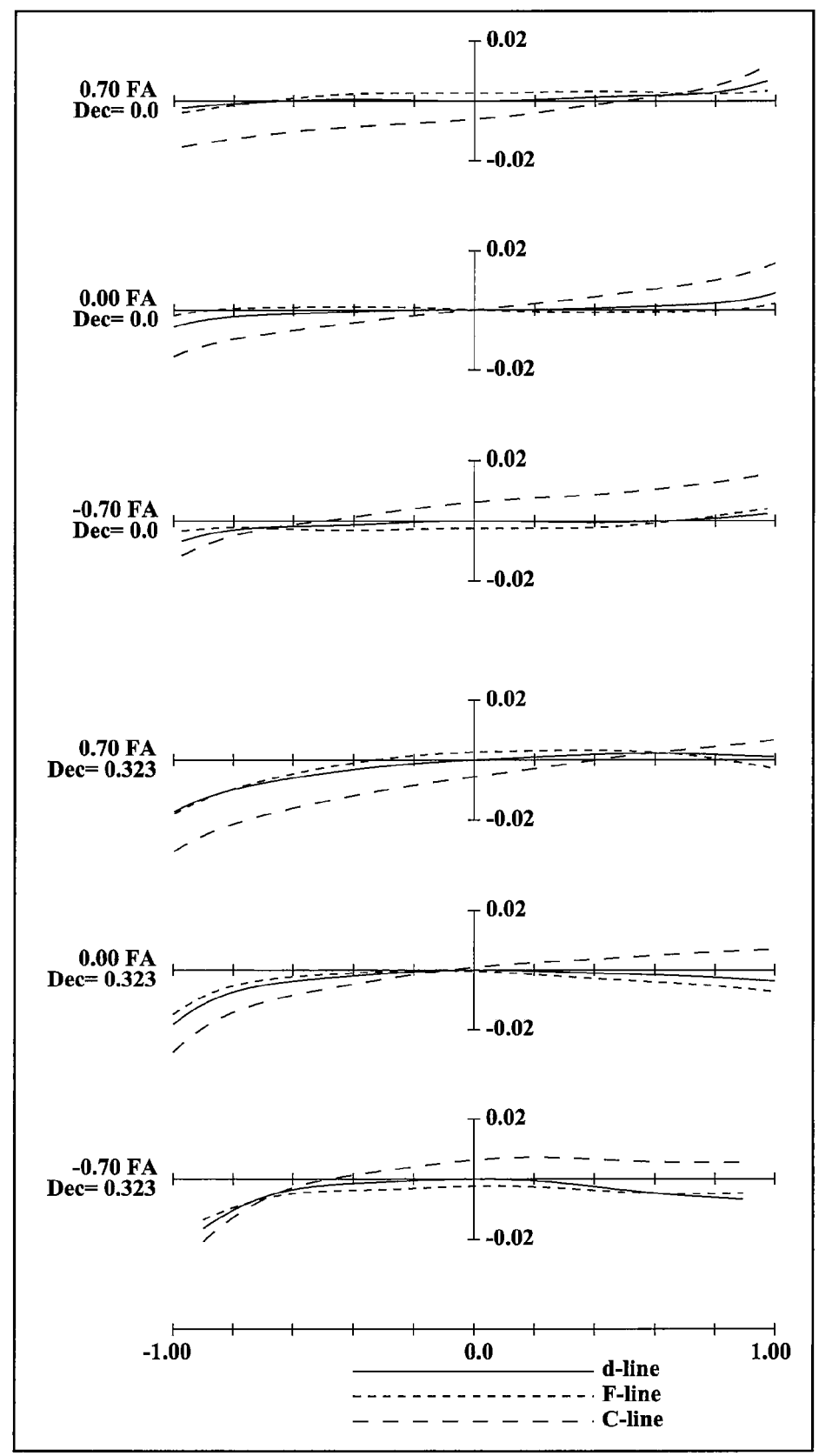
FIG. 3 is a lateral aberration diagram in a basic state where image blur compensation is not performed and in an image blur compensation state at a telephoto limit of a zoom lens system according to Examples I-1 and II-1.
Figure 6:
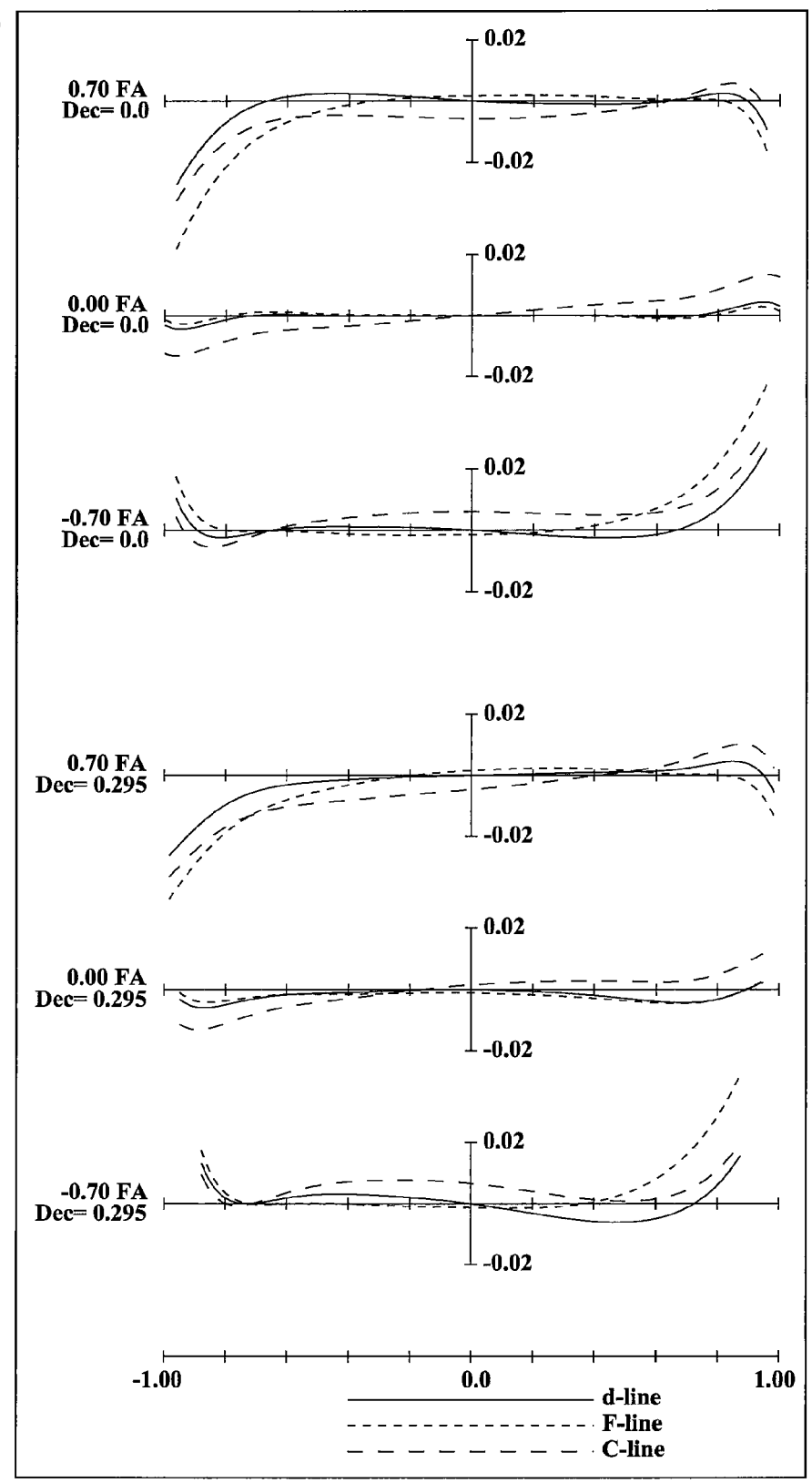
FIG. 6 is a lateral aberration diagram in a basic state where image blur compensation is not performed and in an image blur compensation state at a telephoto limit of a zoom lens system according to Examples I-2 and II-2.
Figure 9:
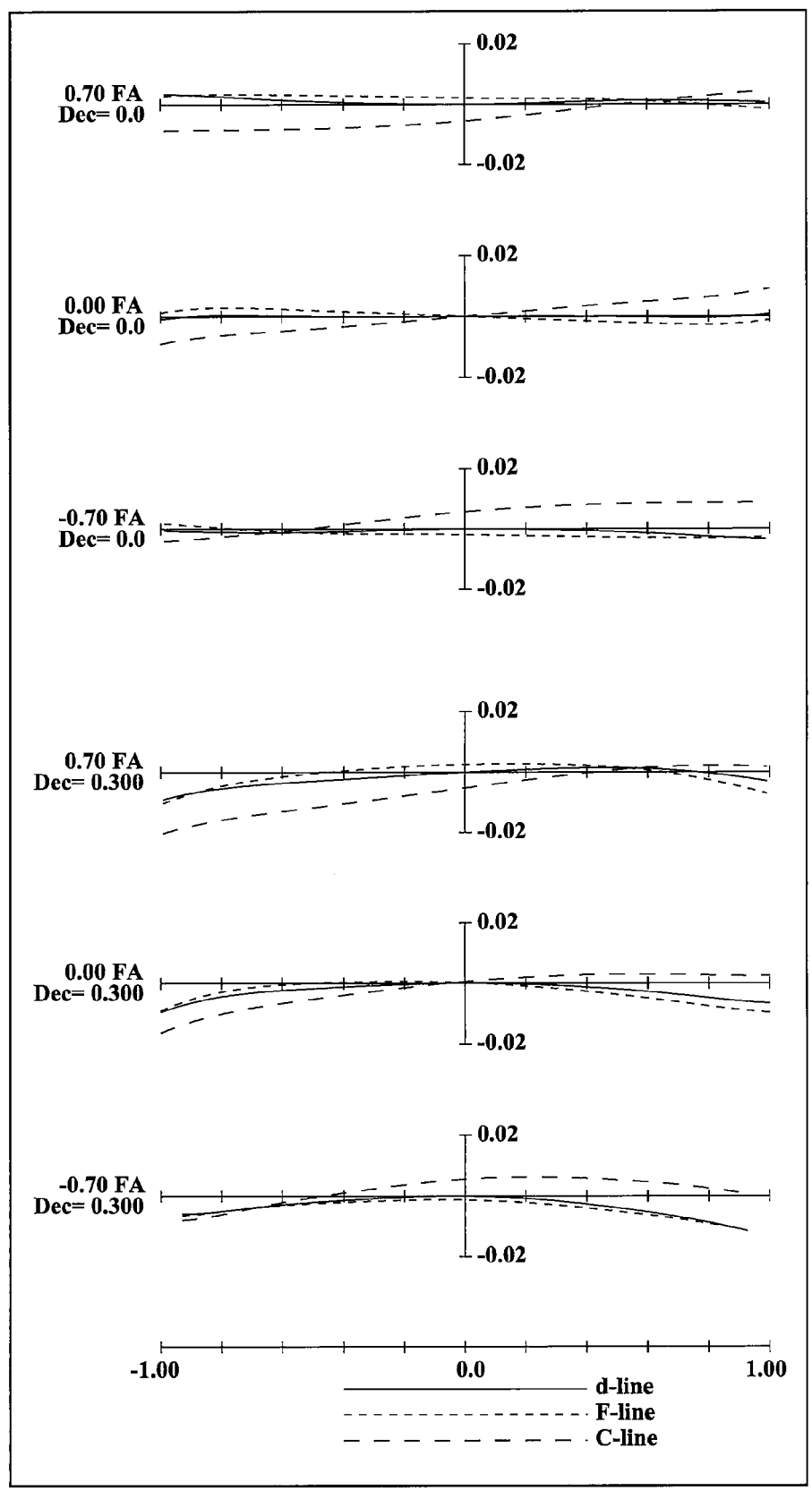
FIG. 9 is a lateral aberration diagram in a basic state where image blur compensation is not performed and in an image blur compensation state at a telephoto limit of a zoom lens system according to Examples I-3 and II-3.
Figure 12:
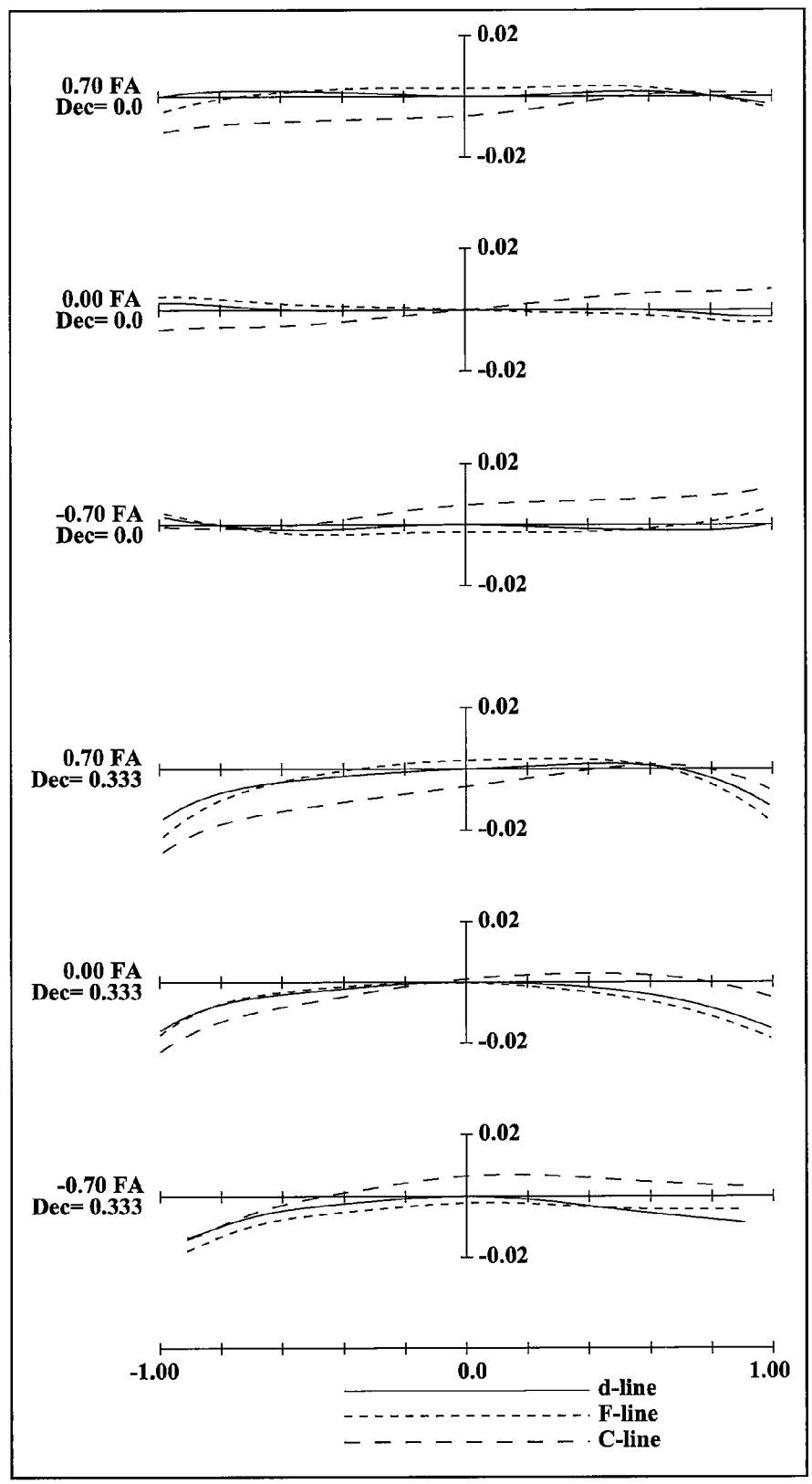
FIG. 12 is a lateral aberration diagram in a basic state where image blur compensation is not performed and in an image blur compensation state at a telephoto limit of a zoom lens system according to Examples I-4 and II-4.
Figure 15:
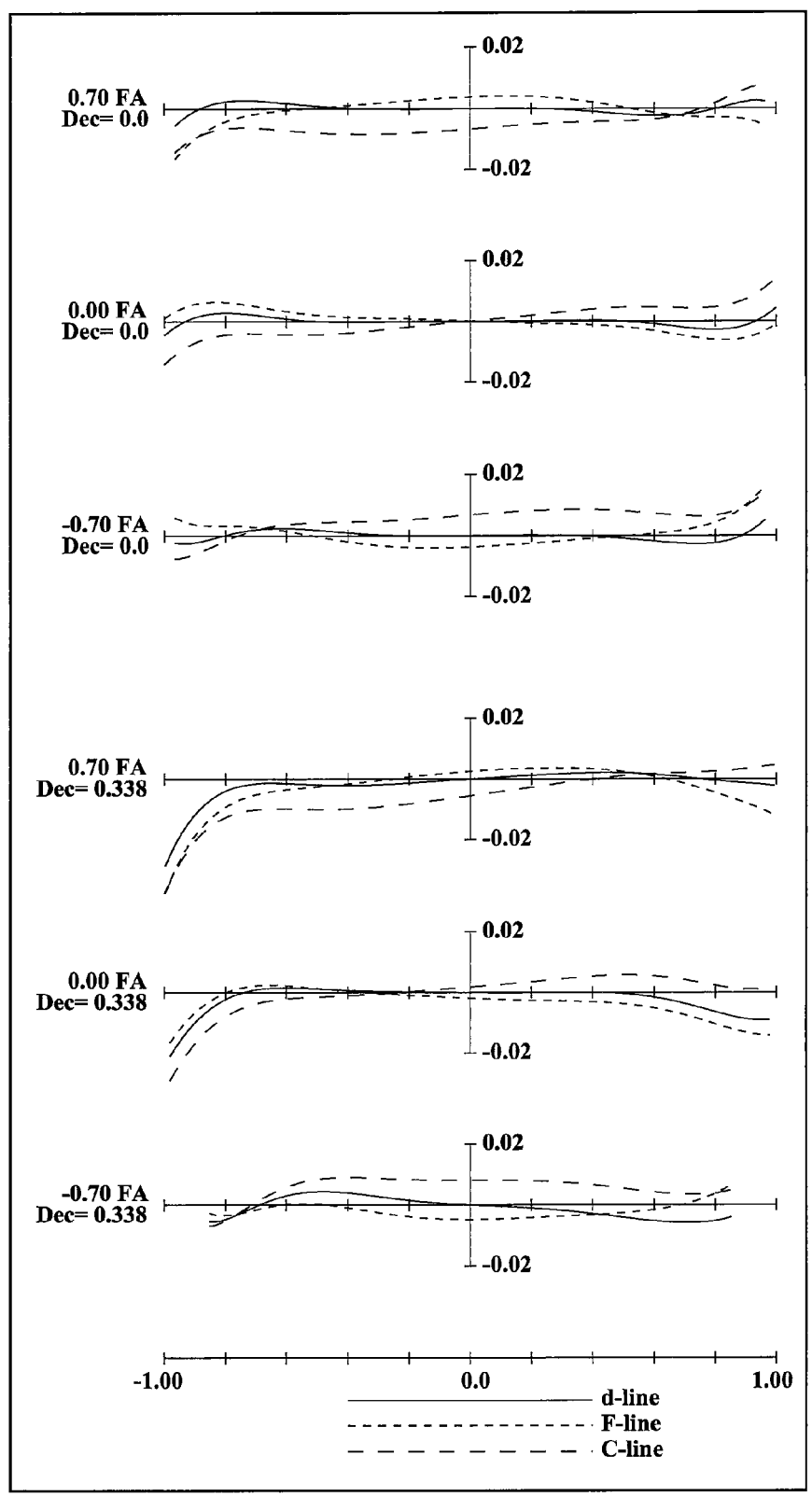
FIG. 15 is a lateral aberration diagram in a basic state where image blur compensation is not performed and in an image blur compensation state at a telephoto limit of a zoom lens system according to Examples I-5 and II-5.

Further, FIG. 3 is a lateral aberration diagram at a telephoto limit of a zoom lens system according to Examples I-1 and II-1. FIG. 6 is a lateral aberration diagram at a telephoto limit of a zoom lens system according to Examples I-2 and II-2. FIG. 9 is a lateral aberration diagram at a telephoto limit of a zoom lens system according to Examples I-3 and II-3. FIG. 12 is a lateral aberration diagram at a telephoto limit of a zoom lens system according to Examples I-4 and II-4. FIG. 15 is a lateral aberration diagram at a telephoto limit of a zoom lens system according to Examples I-5 and II-5.

Figure 19:
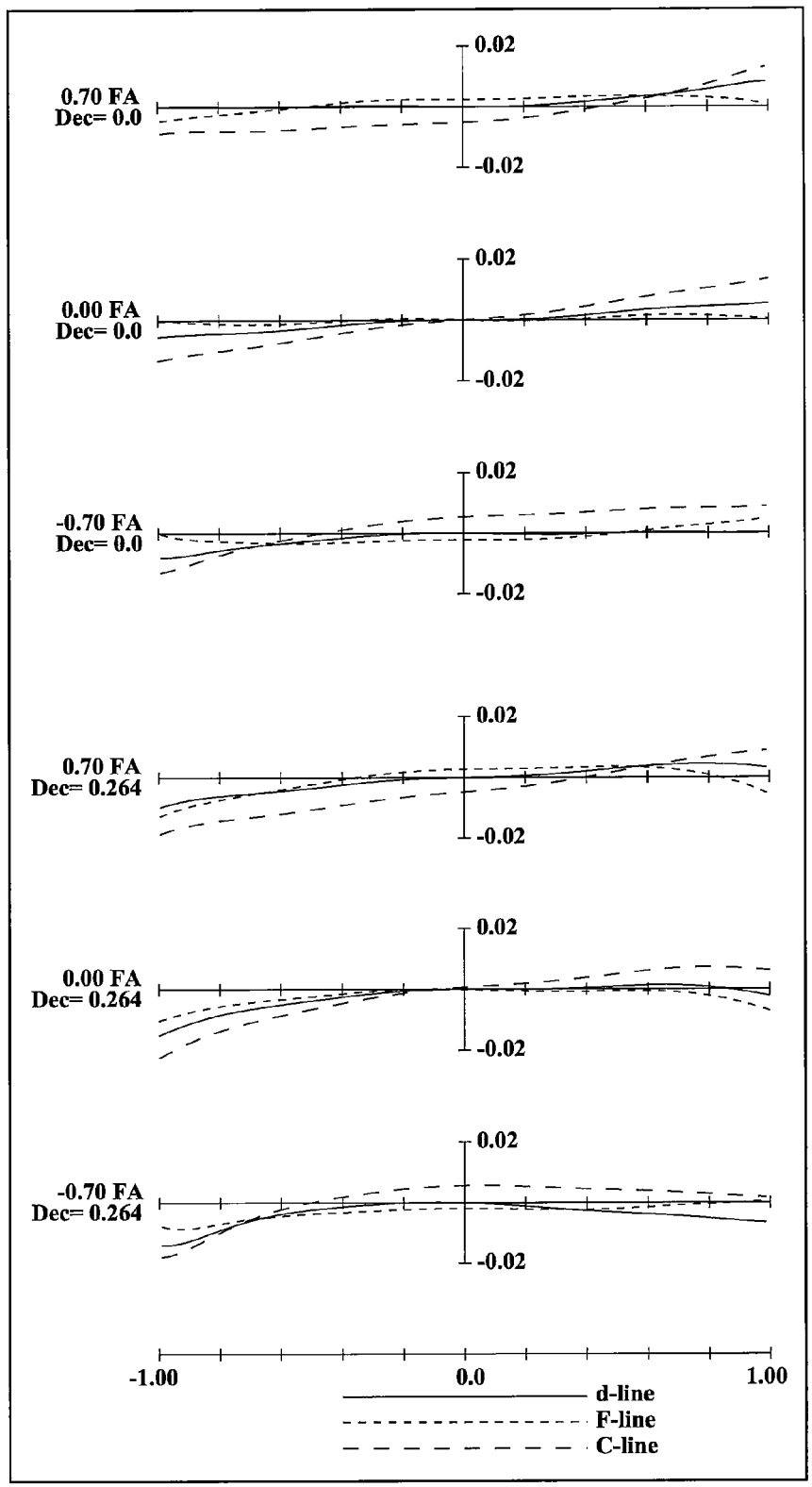
FIG. 19 is a lateral aberration diagram in a basic state where image blur compensation is not performed and in an image blur compensation state at a telephoto limit of a zoom lens system according to Example III-1.
Figure 22:
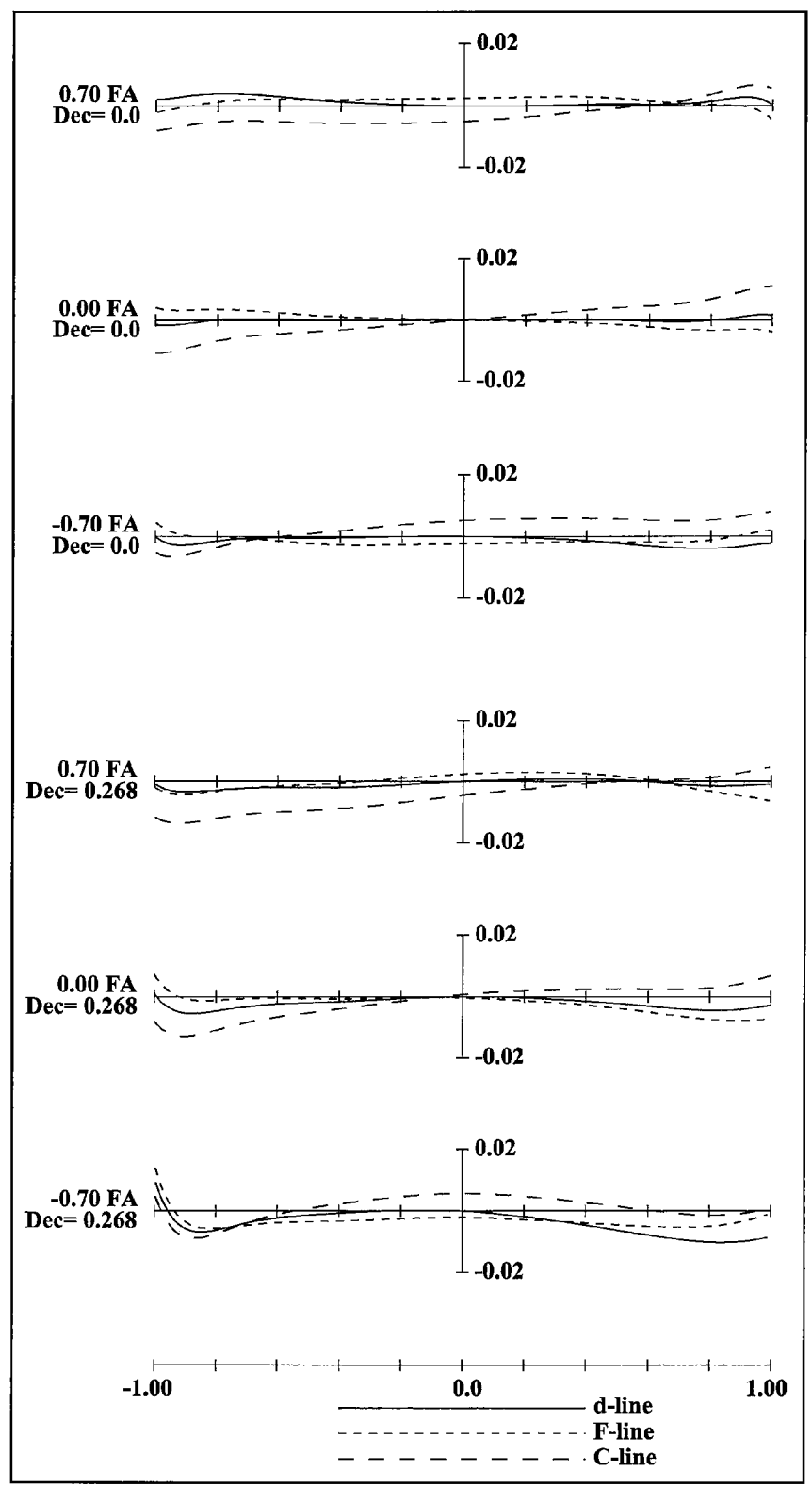
FIG. 22 is a lateral aberration diagram in a basic state where image blur compensation is not performed and in an image blur compensation state at a telephoto limit of a zoom lens system according to Example III-2.
Figure 25:
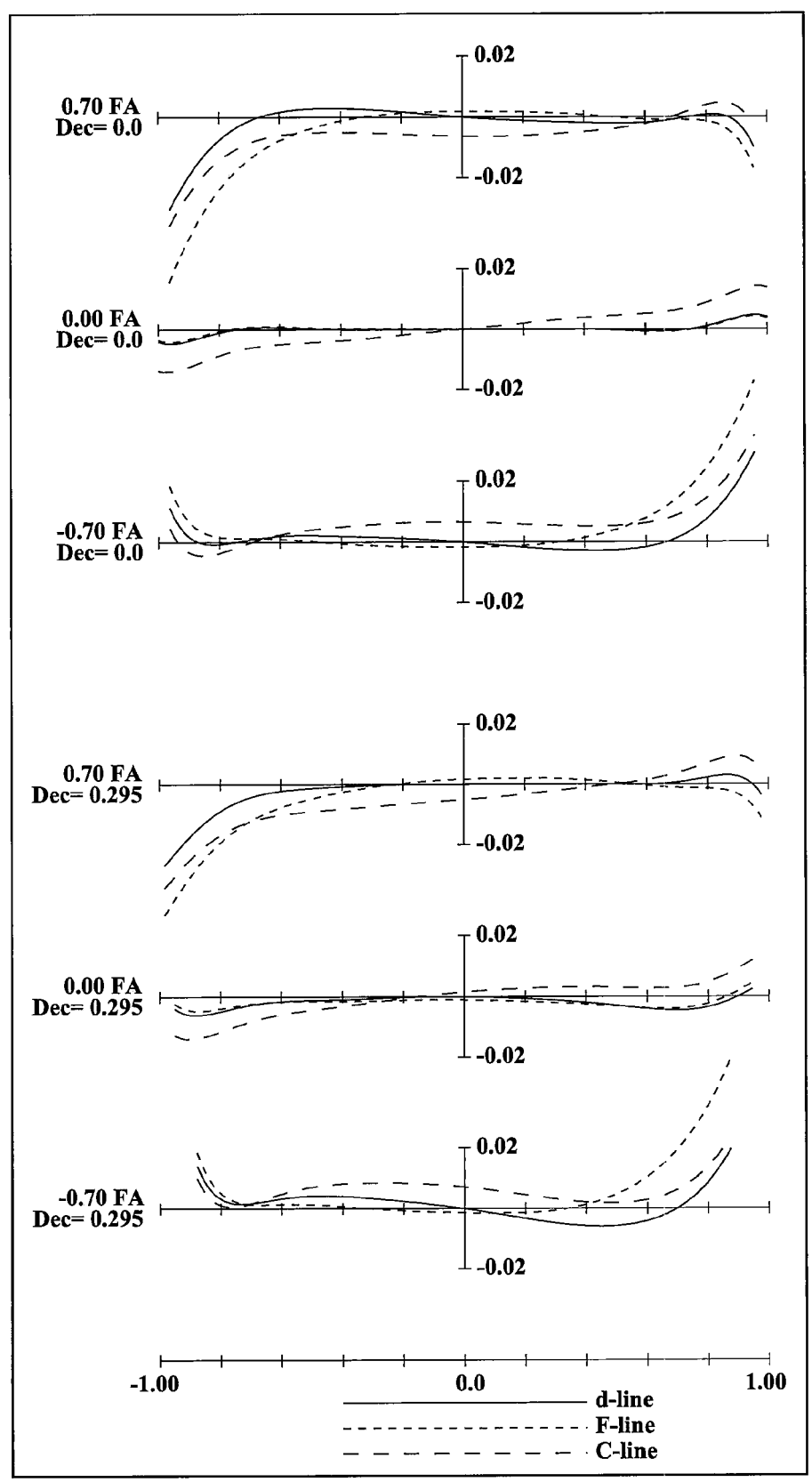
FIG. 25 is a lateral aberration diagram in a basic state where image blur compensation is not performed and in an image blur compensation state at a telephoto limit of a zoom lens system according to Example III-3.
Figure 28:
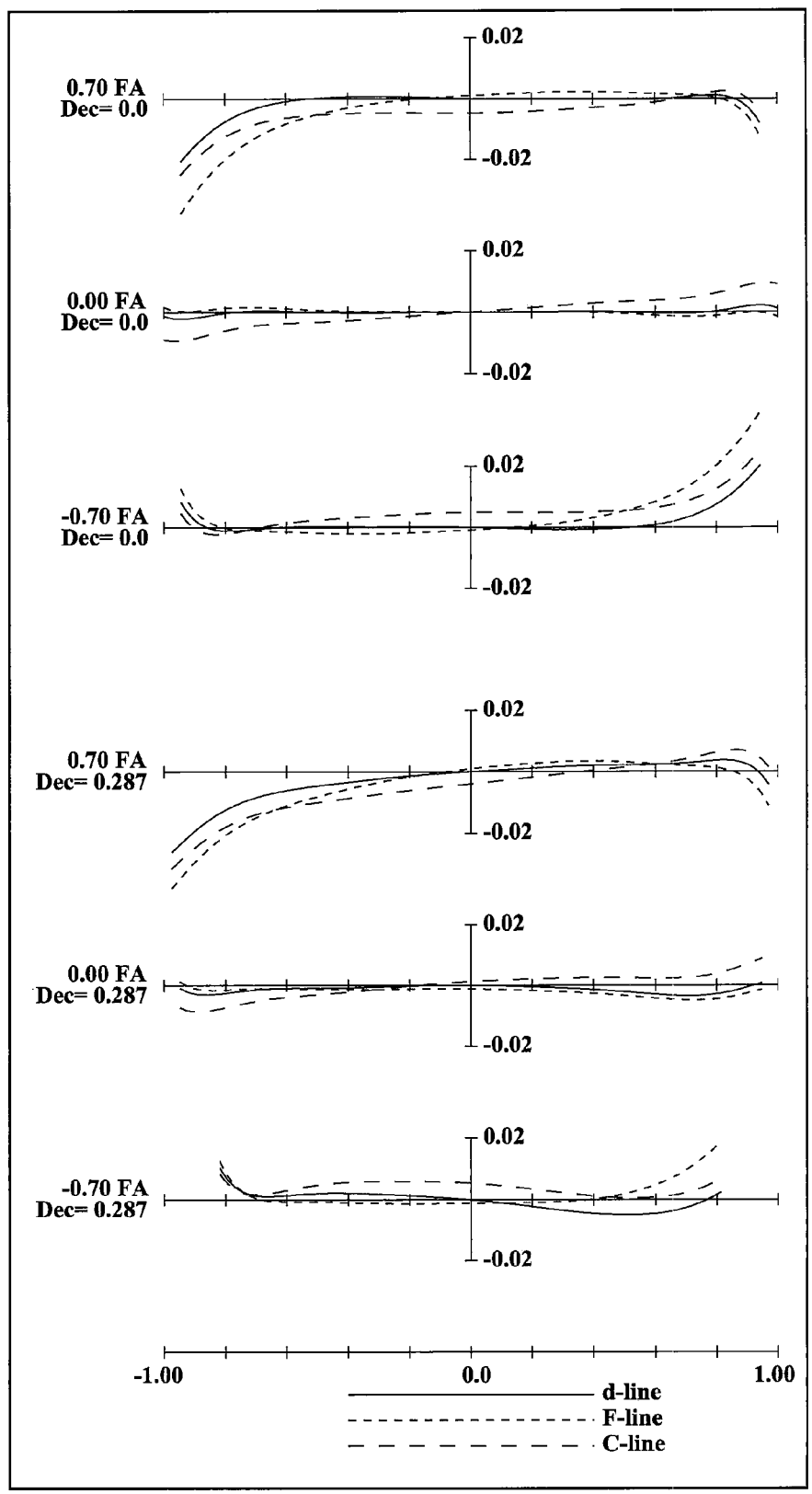
FIG. 28 is a lateral aberration diagram in a basic state where image blur compensation is not performed and in an image blur compensation state at a telephoto limit of a zoom lens system according to Example III-4.

Further, FIG. 19 is a lateral aberration diagram at a telephoto limit of a zoom lens system according to Example III-1. FIG. 22 is a lateral aberration diagram at a telephoto limit of a zoom lens system according to Example III-2. FIG. 25 is a lateral aberration diagram at a telephoto limit of a zoom lens system according to Example III-3. FIG. 28 is a lateral aberration diagram at a telephoto limit of a zoom lens system according to Example III-4.

In each lateral aberration diagram, the upper three aberration diagrams correspond to a basic state where image blur compensation is not performed at a telephoto limit, while the lower three aberration diagrams correspond to an image blur compensation state where the entire third lens unit G3 is moved by a predetermined amount in a direction perpendicular to the optical axis at a telephoto limit. Among the lateral aberration diagrams of the basic state, the upper one shows the lateral aberration at an image point of 70% of the maximum image height, the middle one shows the lateral aberration at the axial image point, and the lower one shows the lateral aberration at an image point of −70% of the maximum image height. Among the lateral aberration diagrams of an image blur compensation state, the upper one shows the lateral aberration at an image point of 70% of the maximum image height, the middle one shows the lateral aberration at the axial image point, and the lower one shows the lateral aberration at an image point of −70% of the maximum image height. In each lateral aberration diagram, the horizontal axis indicates the distance from the principal ray on the pupil surface. The solid line indicates the characteristics to the d-line, the short dash line indicates the characteristics to the F-line, and the long dash line indicates the characteristics to the C-line. In each lateral aberration diagram, the meridional plane is adopted as the plane containing the optical axis of the first lens unit G1 and the optical axis of the third lens unit G3.

The amount of movement of the third lens unit G3 in a direction perpendicular to the optical axis in the image blur compensation state at a telephoto limit is as follows.

Examples I-1 and II-1 0.323 mm
    Examples I-2 and II-2 0.295 mm
    Examples I-3 and II-3 0.300 mm
    Examples I-4 and II-4 0.333 mm
    Examples I-5 and II-5 0.338 mm
    Example III-1 0.264 mm
    Example III-2 0.268 mm
    Example III-3 0.295 mm
    Example III-4 0.287 mm When the shooting distance is infinity, at a telephoto limit, the amount of image decentering in a case that the zoom lens system inclines by 0.3° is equal to the amount of image decentering in a case that the entire third lens unit G3 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +70% image point and the lateral aberration at the −70% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

Numerical Examples I-1 and II-1

The zoom lens systems of Numerical Examples I-1 and II-1 correspond respectively to Embodiments I-1 and II-1 shown in FIG. 1. Table I•II-1 shows the surface data of the zoom lens systems of Numerical Examples I-1 and II-1. Table I•II-2 shows the aspherical data. Table I•II-3 shows various data.

TABLE I·II-1

(Surface data)

| Surface number | r | d | nd | vd |
|---|---|---|---|---|
| Object surface | ∞ | ∞ | | |
| 1 | 54.67874 | 1.15000 | 2.20000 | 24.0 |
| 2 | 36.43543 | 5.05340 | 1.49700 | 81.6 |
| 3 | −416.24419 | 0.15000 | | |
| 4 | 31.15733 | 3.57660 | 1.75161 | 48.6 |
| 5 | 85.40205 | Variable | | |
| 6 | 41.03425 | 0.70000 | 2.00000 | 40.0 |
| 7 | 7.60737 | 4.29990 | | |
| 8* | −19.89329 | 0.80000 | 1.72500 | 54.0 |
| 9* | 32.70363 | 0.99640 | | |
| 10 | 22.93899 | 1.67400 | 2.20000 | 24.0 |
| 11 | −97.37342 | 0.45000 | 1.79999 | 41.7 |
| 12 | 111.71189 | Variable | | |
| 13 (Diaphragm) | ∞ | 1.20000 | | |
| 14 | 7.49994 | 1.92750 | 1.63645 | 59.1 |
| 15 | 215.91767 | 1.69790 | | |
| 16* | 9.43190 | 1.90840 | 1.69652 | 42.0 |
| 17 | −11.33555 | 0.45000 | 1.80595 | 30.0 |
| 18 | 5.99424 | Variable | | |
| 19* | 12.22671 | 2.80000 | 1.50044 | 69.0 |
| 20 | −14.83348 | 0.45000 | 1.84700 | 23.8 |
| 21 | −22.64524 | Variable | | |
| 22 | ∞ | 0.78000 | 1.51680 | 64.2 |
| 23 | ∞ | (BF) | | |
| Image surface | ∞ | | | |

TABLE I·II-2

(Aspherical data)

Surface No. 8

K = 0.00000E+00, A4 = 3.50052E−04, A6 = −1.20811E−05, A8 = 1.44741E−07 A10 = −1.04598E−09

Surface No. 9

K = 0.00000E+00, A4 = 2.88194E−04, A6 = −1.20520E−05, A8 = 1.42732E−07 A10 = −6.36269E−10

Surface No. 16

K = 0.00000E+00, A4 = −3.76392E−04, A6 = −5.68479E−06, A8 = −4.59085E−07 A10 = 4.37960E−09

Surface No. 19

K = 0.00000E+00, A4 = −5.44658E−05, A6 = 2.12430E−06, A8 = −3.55190E−08 A10 = 0.00000E+00

TABLE I·II-3

(Various data)
Zooming ratio 17.36563

| | Wide-angle limit | Middle position | Telephoto limit |
|---|---|---|---|
| Focal length | 4.7524 | 33.0049 | 82.5290 |
| F-number | 2.91648 | 3.48271 | 4.34807 |
| View angle | 38.5456 | 6.2523 | 2.4721 |
| Image height | 3.6000 | 3.6000 | 3.6000 |
| Overall length of lens system | 73.9059 | 79.1817 | 89.0086 |
| BF | 0.87587 | 0.87107 | 0.87851 |
| d5 | 0.6000 | 26.5565 | 33.9577 |
| d12 | 30.3658 | 3.5702 | 2.1000 |
| d18 | 6.4260 | 6.1225 | 18.5502 |
| d21 | 5.5741 | 11.9973 | 3.4581 |
| Entrance pupil position | 18.0226 | 120.2230 | 262.6229 |
| Exit pupil position | −32.7172 | −37.5269 | 95.6119 |
| Front principal points position | 22.1027 | 124.8587 | 417.0488 |
| Back principal points position | 69.1534 | 46.1768 | 6.4796 |

Numerical Examples I-2 and II-2

The zoom lens systems of Numerical Examples I-2 and II-2 correspond respectively to Embodiments I-2 and II-2 shown in FIG. 4. Table I•II-4 shows the surface data of the zoom lens systems of Numerical Examples I-2 and II-2. Table I•II-5 shows the aspherical data. Table I•II-6 shows various data.

TABLE I·II-4

(Surface data)

| Surface number | r | d | nd | vd |
|---|---|---|---|---|
| Object surface | ∞ | ∞ | | |
| 1 | 45.52425 | 1.30000 | 1.84666 | 23.8 |
| 2 | 32.16757 | 6.00000 | 1.49700 | 81.6 |
| 3 | −474.36440 | 0.15000 | | |
| 4 | 31.42311 | 3.20000 | 1.60311 | 60.7 |
| 5 | 71.93247 | Variable | | |
| 6 | 85.97154 | 0.70000 | 1.90366 | 31.3 |
| 7 | 7.78750 | 4.70000 | | |
| 8* | −20.49027 | 0.80000 | 1.66547 | 55.2 |
| 9* | 31.55131 | 0.85000 | | |
| 10 | 20.49610 | 2.45000 | 1.92286 | 20.9 |

TABLE I·II-4-continued (Surface data)

| Surface number | r | d | nd | vd |
|---|---|---|---|---|
| 11 | −33.70458 | 0.60000 | 1.83481 | 42.7 |
| 12 | 150.07760 | Variable | | |
| 13 (Diaphragm) | ∞ | 2.30000 | | |
| 14 | 8.35327 | 1.90000 | 1.69680 | 55.5 |
| 15 | 53.32427 | 2.25000 | | |
| 16* | 9.98413 | 1.58000 | 1.66547 | 55.2 |
| 17 | −21.94441 | 0.50000 | 1.71736 | 29.5 |
| 18 | 6.46504 | Variable | | |
| 19* | 13.63884 | 3.80000 | 1.60602 | 57.4 |
| 20 | −10.92392 | 0.60000 | 1.68893 | 31.2 |
| 21 | −48.40053 | Variable | | |
| 22 | ∞ | 1.50000 | 1.51633 | 64.0 |
| 23 | ∞ | (BF) | | |
| Image surface | ∞ | | | |

TABLE I·II-5

(Aspherical data)

Surface No. 8

$K = -6.51516E+00, A4 = 1.85470E-04, A6 = -2.94467E-06,$
$A8 = 3.17185E-08\ A10 = 9.46754E-10, A12 = -4.06466E-11$

Surface No. 9

$K = 1.96222E+01, A4 = 1.45329E-04, A6 = -5.97511E-06,$
$A8 = 1.32603E-07\ A10 = -3.11453E-09, A12 = -4.13309E-12$

Surface No. 16

$K = 0.00000E+00, A4 = -3.49509E-04, A6 = -1.57238E-06,$
$A8 = -9.09262E-07\ A10 = 4.55753E-08, A12 = 0.00000E+00$

Surface No. 19

$K = 0.00000E+00, A4 = -1.00133E-05, A6 = 1.18861E-06,$
$A8 = -1.20988E-08\ A10 = 0.00000E+00, A12 = 0.00000E+00$

TABLE I·II-6

(Various data)
Zooming ratio 20.73116

| | Wide-angle limit | Middle position | Telephoto limit |
|---|---|---|---|
| Focal length | 4.7135 | 32.2077 | 97.7165 |
| F-number | 2.90061 | 3.42257 | 5.05142 |
| View angle | 39.0553 | 6.3899 | 2.0709 |
| Image height | 3.6000 | 3.6000 | 3.6000 |
| Overall length of lens system | 76.3557 | 83.2004 | 97.3161 |
| BF | 0.36998 | 0.36997 | 0.36990 |
| d5 | 0.6545 | 25.5533 | 32.6164 |
| d12 | 28.3328 | 3.0495 | 1.3091 |
| d18 | 5.9770 | 6.9976 | 25.9569 |
| d21 | 5.8414 | 12.0500 | 1.8838 |
| Entrance pupil position | 19.6265 | 123.7296 | 262.6743 |
| Exit pupil position | −35.5639 | −48.0276 | 49.4999 |
| Front principal points position | 23.7217 | 134.5036 | 554.7428 |
| Back principal points position | 71.6422 | 50.9927 | −0.4004 |

Numerical Examples I-3 and II-3

The zoom lens systems of Numerical Examples I-3 and II-3 correspond respectively to Embodiments I-3 and II-3 shown in FIG. 7. Table I•II-7 shows the surface data of the zoom lens systems of Numerical Examples I-3 and II-3. Table I•II-8 shows the aspherical data. Table I•II-9 shows various data.

TABLE I·II-7

(Surface data)

| Surface number | r | d | nd | vd |
|---|---|---|---|---|
| Object surface | ∞ | ∞ | | |
| 1 | 47.40168 | 1.15000 | 2.20000 | 24.0 |
| 2 | 32.73210 | 4.60560 | 1.49700 | 81.6 |
| 3 | 1811.82817 | 0.15000 | | |
| 4 | 29.28012 | 3.25450 | 1.77209 | 45.3 |
| 5 | 73.51295 | Variable | | |
| 6 | 23.77851 | 0.70000 | 2.20000 | 24.0 |
| 7 | 9.42084 | 4.40000 | | |
| 8 | −22.78173 | 0.80000 | 1.72500 | 54.0 |
| 9 | 13.93477 | 1.72500 | | |
| 10* | 16.62157 | 2.14990 | 1.92286 | 20.9 |
| 11 | −62.38542 | 0.45000 | 1.72500 | 54.0 |
| 12 | 60.02022 | Variable | | |
| 13 (Diaphragm) | ∞ | 1.20000 | | |
| 14 | 8.88082 | 1.65680 | 1.81328 | 37.1 |
| 15 | 227.60274 | 0.93430 | | |
| 16* | 9.98408 | 2.13640 | 1.73182 | 52.5 |
| 17 | −10.72168 | 0.45000 | 1.82217 | 27.4 |
| 18 | 5.77290 | Variable | | |
| 19* | 12.46093 | 2.50000 | 1.49190 | 69.9 |
| 20 | −13.24787 | 0.45000 | 1.84700 | 23.8 |
| 21 | −20.44955 | Variable | | |
| 22 | ∞ | 0.78000 | 1.51680 | 64.2 |
| 23 | ∞ | (BF) | | |
| Image surface | ∞ | | | |

TABLE I·II-8

(Aspherical data)

Surface No. 10

$K = 0.00000E+00, A4 = -1.14154E-05, A6 = -3.77234E-07,$
$A8 = 4.74170E-09\ A10 = -4.43720E-11$

Surface No. 16

$K = 0.00000E+00, A4 = -1.91350E-04, A6 = -2.30283E-06,$
$A8 = -1.23140E-07\ A10 = 2.39200E-09$

Surface No. 19

$K = 0.00000E+00, A4 = -6.46229E-05, A6 = 1.80827E-06,$
$A8 = -2.76706E-08\ A10 = 0.00000E+00$

TABLE I·II-9

(Various data)
Zooming ratio 17.36185

| | Wide-angle limit | Middle position | Telephoto limit |
|---|---|---|---|
| Focal length | 4.7532 | 33.0062 | 82.5250 |
| F-number | 2.91537 | 3.36011 | 4.67079 |
| View angle | 38.5791 | 6.3085 | 2.4788 |
| Image height | 3.6000 | 3.6000 | 3.6000 |
| Overall length of lens system | 73.9109 | 76.2516 | 89.0354 |
| BF | 0.88092 | 0.87773 | 0.90550 |
| d5 | 0.6000 | 25.8935 | 31.8378 |
| d12 | 30.3595 | 3.6537 | 2.1000 |
| d18 | 6.9274 | 4.6762 | 21.2415 |
| d21 | 5.6506 | 11.6580 | 3.4581 |
| Entrance pupil position | 19.1833 | 128.4786 | 242.8861 |
| Exit pupil position | −31.8559 | −28.5804 | 72.2290 |

TABLE I·II-9-continued (Various data)
Zooming ratio 17.36185

|  | Wide-angle limit | Middle position | Telephoto limit |
|---|---|---|---|
| Front principal points position | 23.2464 | 124.5032 | 420.8967 |
| Back principal points position | 69.1577 | 43.2454 | 6.5104 |

Numerical Examples I-4 and II-4

The zoom lens systems of Numerical Examples I-4 and II-4 correspond respectively to Embodiments I-4 and II-4 shown in FIG. 10. Table I•II-10 shows the surface data of the zoom lens systems of Numerical Examples I-4 and II-4. Table I•II-11 shows the aspherical data. Table I•II-12 shows various data.

TABLE I·II-10

(Surface data)

| Surface number | r | d | nd | vd |
|---|---|---|---|---|
| Object surface | ∞ | ∞ | | |
| 1 | 43.82438 | 1.15000 | 2.20000 | 24.0 |
| 2 | 31.02039 | 5.27900 | 1.49700 | 81.6 |
| 3 | 658.44950 | 0.15000 | | |
| 4 | 28.52422 | 3.61590 | 1.75034 | 48.7 |
| 5 | 68.48960 | Variable | | |
| 6 | 29.56473 | 0.70000 | 2.00000 | 40.0 |
| 7 | 8.61895 | 3.90870 | | |
| 8 | −51.68615 | 0.80000 | 2.00000 | 40.0 |
| 9 | 11.64585 | 1.11860 | | |
| 10* | 14.40520 | 1.99730 | 1.99537 | 20.7 |
| 11 | 499.61576 | 0.30000 | | |
| 12 | ∞ | Variable | | |
| 13 (Diaphragm) | ∞ | 1.20000 | | |
| 14 | 8.59978 | 1.74890 | 1.74441 | 49.9 |
| 15 | 227.60274 | 0.79490 | | |
| 16* | 10.68361 | 2.20130 | 1.76720 | 46.0 |
| 17 | −8.54791 | 0.52740 | 1.80467 | 31.9 |
| 18 | 5.91886 | Variable | | |
| 19* | 13.47020 | 2.50000 | 1.49264 | 69.8 |
| 20 | −13.34321 | 0.45000 | 1.83850 | 24.0 |
| 21 | −19.19175 | Variable | | |
| 22 | ∞ | 0.78000 | 1.51680 | 64.2 |
| 23 | ∞ | (BF) | | |
| Image surface | ∞ | | | |

TABLE I·II-11

(Aspherical data)

Surface No. 10

K = 0.00000E+00, A4 = 1.26403E−05, A6 = −3.24464E−07,
A8 = 5.16296E−09 A10 = −7.88014E−11

Surface No. 16

K = 0.00000E+00, A4 = −2.12912E−04, A6 = −1.22648E−06,
A8 = −2.48503E−07 A10 = 6.20350E−09

Surface No. 19

K = 0.00000E+00, A4 = −8.34287E−05, A6 = 2.95627E−06,
A8 = −6.11855E−08 A10 = 0.00000E+00

TABLE I·II-12

(Various data)
Zooming ratio 19.25092

|  | Wide-angle limit | Middle position | Telephoto limit |
|---|---|---|---|
| Focal length | 4.6667 | 30.0051 | 89.8390 |
| F-number | 2.91703 | 3.53914 | 4.75267 |
| View angle | 39.0420 | 6.9132 | 2.2857 |
| Image height | 3.6000 | 3.6000 | 3.6000 |
| Overall length of lens system | 71.0108 | 73.8911 | 88.8837 |
| BF | 0.88090 | 0.87889 | 0.90694 |
| d5 | 0.6000 | 24.2513 | 32.4604 |
| d12 | 28.5134 | 4.2216 | 2.1880 |
| d18 | 5.0635 | 2.2496 | 20.6447 |
| d21 | 6.7310 | 13.0677 | 3.4617 |
| Entrance pupil position | 19.4202 | 112.7683 | 269.9674 |
| Exit pupil position | −25.5549 | −23.9178 | 75.6116 |
| Front principal points position | 23.2631 | 106.4658 | 467.8458 |
| Back principal points position | 66.3441 | 43.8859 | −0.9553 |

Numerical Examples I-5 and II-5

The zoom lens systems of Numerical Examples I-5 and II-5 correspond respectively to Embodiments I-5 and II-5 shown in FIG. 13. Table I•II-13 shows the surface data of the zoom lens systems of Numerical Examples I-5 and II-5. Table I•II-14 shows the aspherical data. Table I•II-15 shows various data.

TABLE I.II-13

(Surface data)

| Surface number | r | d | nd | vd |
|---|---|---|---|---|
| Object surface | ∞ | ∞ | | |
| 1 | 54.95769 | 1.15000 | 1.84666 | 23.8 |
| 2 | 33.68335 | 5.33100 | 1.49700 | 81.6 |
| 3 | −358.26960 | 0.15000 | | |
| 4 | 29.22272 | 3.40000 | 1.72916 | 54.7 |
| 5 | 71.95118 | Variable | | |
| 6* | 200.99950 | 1.40000 | 1.80470 | 41.0 |
| 7* | 7.36029 | 4.00000 | | |
| 8 | −33.58337 | 0.80000 | 1.77250 | 49.6 |
| 9 | 13.29976 | 0.69390 | | |
| 10 | 13.65144 | 2.10000 | 1.92286 | 20.9 |
| 11 | 162.11920 | Variable | | |
| 12 (Diaphragm) | ∞ | 1.20000 | | |
| 13 | 6.66982 | 2.00000 | 1.49700 | 81.6 |
| 14 | 75.59153 | 2.60000 | | |
| 15* | 13.37576 | 1.70000 | 1.74993 | 45.4 |
| 16 | −11.69083 | 0.45000 | 1.80610 | 33.3 |
| 17 | 9.13583 | Variable | | |
| 18* | 16.30295 | 2.90000 | 1.60602 | 57.4 |
| 19 | −12.50230 | 0.55000 | 1.68893 | 31.2 |
| 20 | −38.77835 | Variable | | |
| 21 | ∞ | 0.90000 | 1.51633 | 64.0 |
| 22 | ∞ | (BF) | | |
| Image surface | ∞ | | | |

TABLE I.II-14

(Aspherical data)

Surface No. 6

$K = 0.00000E+00, A4 = 7.79768E-05, A6 = -2.12141E-07,$
$A8 = -7.61782E-09\ A10 = 4.77942E-11$

Surface No. 7

$K = 0.00000E+00, A4 = 6.66509E-05, A6 = -2.93266E-06,$
$A8 = 2.74874E-07\ A10 = -5.69183E-09$

Surface No. 15

$K = 0.00000E+00, A4 = -4.94612E-04, A6 = -7.34009E-06,$
$A8 = -9.58053E-07\ A10 = 2.36960E-08$

Surface No. 18

$K = 0.00000E+00, A4 = -1.70925E-05, A6 = 1.22307E-06,$
$A8 = -1.87306E-08\ A10 = 0.00000E+00$

TABLE I.II-15

(Various data)
Zooming ratio 19.30843

|  | Wide-angle limit | Middle position | Telephoto limit |
|---|---|---|---|
| Focal length | 4.7492 | 30.0052 | 91.6997 |
| F-number | 2.90658 | 3.72119 | 4.58238 |

TABLE I.II-15-continued (Various data)
Zooming ratio 19.30843

|  | Wide-angle limit | Middle position | Telephoto limit |
|---|---|---|---|
| View angle | 38.8247 | 6.8503 | 2.2304 |
| Image height | 3.6000 | 3.6000 | 3.6000 |
| Overall length of lens system | 72.9618 | 79.7551 | 90.0796 |
| BF | 0.92610 | 0.90181 | 0.89690 |
| d5 | 0.6000 | 21.4792 | 30.0457 |
| d11 | 28.1807 | 4.9031 | 2.1000 |
| d17 | 4.5971 | 6.3517 | 21.1363 |
| d20 | 7.3330 | 14.7944 | 4.5758 |
| Entrance pupil position | 18.8931 | 97.6963 | 253.4224 |
| Exit pupil position | -28.2798 | -43.1524 | 97.4921 |
| Front principal points position | 22.8701 | 107.2651 | 432.1745 |
| Back principal points position | 68.2126 | 49.7499 | -1.6201 |

The following Table 1-16 and Table II-16 show the corresponding values to the individual conditions in the zoom lens system of the numerical examples.

Table I-16 (Corresponding Values to Conditions)

TABLE 1

|  | Condition | Numerical Example | | | | |
|---|---|---|---|---|---|---|
|  |  | I-1 | I-2 | I-3 | I-4 | I-5 |
| (8) | $dG3/dG$ | 0.213 | 0.199 | 0.188 | 0.194 | 0.231 |
| (1) | $(f_4 \cdot f_W \cdot \tan\omega)/L_W$ | 0.114 | 0.114 | 0.114 | 0.119 | 0.123 |
| (2) | $f_3/f_4$ | 0.965 | 0.941 | 0.937 | 0.942 | 0.876 |
| (3) | $(nd_4 - 1) + (nd_6 - 1)$ | 2.200 | 1.827 | 2.123 | 1.995 | 1.728 |
| (4) | $nd_1 - nd_2$ | 0.703 | 0.350 | 0.703 | 0.703 | 0.350 |
| (5) | $(nd_1 - 1) + (nd_3 - 1)$ | 1.952 | 1.450 | 1.972 | 1.950 | 1.576 |
| (9) | $f_3^2 + f_4^2)/|f_2|$ | 2.81 | 3.15 | 2.85 | 2.97 | 3.45 |
| (10) | $m_{2T}/m_{34T}$ | 3.470 | 2.598 | 2.772 | 3.275 | 3.181 |
| (I · II-11) | $d1NG/d1G$ | 0.1158 | 0.1221 | 0.1255 | 0.1128 | 0.1146 |
| (12) | $f_W \cdot \tan(\omega - \omega_0)$ | 0.11625 | 0.15681 | 0.11943 | 0.11361 | 0.13778 |
| (13) | $f_4/f_T$ | 0.226 | 0.189 | 0.229 | 0.210 | 0.230 |
| (14) | $|M_1/M_2|$ | 0.730 | 1.005 | 0.659 | 0.860 | 1.215 |
| (15) | $|M_3/M_2|$ | 0.484 | 0.765 | 0.529 | 0.594 | 0.976 |
| (16) | $(m_{2T}/m_{2W})/(f_T/f_W)$ | 0.550 | 0.431 | 0.480 | 0.511 | 0.521 |
| (17) | $m_{3T}/m_{3W}$ | 1.504 | 1.572 | 1.726 | 1.457 | 1.519 |
| (18) | $(f_3^2 + f_4^2)/(f_W \cdot \tan\omega)$ | 6.83 | 7.07 | 6.82 | 6.83 | 7.34 |
| (19) | $(L_T - L_W)/(f_W \cdot \tan\omega)$ | 3.99 | 5.12 | 3.99 | 4.72 | 4.48 |
| (20) | $(L_T \cdot f_T)/f_4(f_W \cdot \tan\omega)$ | 104.2 | 133.1 | 102.7 | 112.1 | 102.4 |
| (21) | $(L_W \cdot f_T)/f_4(f_W \cdot \tan\omega)$ | 86.5 | 106.0 | 85.2 | 89.5 | 82.9 |
| (22) | $f_3/f_W \cdot \tan\omega$ | 4.75 | 4.85 | 4.67 | 4.68 | 4.84 |

Table II-16 (Corresponding Values to Conditions)

TABLE 2

|  | Condition | Numerical Example | | | | |
|---|---|---|---|---|---|---|
|  |  | II-1 | II-2 | II-3 | II-4 | II-5 |
| (9) | $f_3^2 + f_4^2)/|f_2|$ | 2.81 | 3.15 | 2.85 | 2.97 | 3.45 |
| (1) | $(f_4 \cdot f_W \cdot \tan\omega)/L_W$ | 0.114 | 0.114 | 0.114 | 0.119 | 0.123 |
| (2) | $f_3/f_4$ | 0.965 | 0.941 | 0.937 | 0.942 | 0.876 |
| (3) | $(nd_4 - 1) + (nd_6 - 1)$ | 2.200 | 1.827 | 2.123 | 1.995 | 1.728 |
| (4) | $nd_1 - nd_2$ | 0.703 | 0.350 | 0.703 | 0.703 | 0.350 |
| (5) | $(nd_1 - 1) + (nd_3 - 1)$ | 1.952 | 1.450 | 1.972 | 1.950 | 1.576 |
| (8) | $dG3/dG$ | 0.213 | 0.199 | 0.188 | 0.194 | 0.231 |
| (10) | $m_{2T}/m_{34T}$ | 3.470 | 2.598 | 2.772 | 3.275 | 3.181 |
| (I · II-11) | $d1NG/d1G$ | 0.1158 | 0.1221 | 0.1255 | 0.1128 | 0.1146 |

TABLE 2-continued

|  | Condition | Numerical Example | | | | |
|---|---|---|---|---|---|---|
|  |  | II-1 | II-2 | II-3 | II-4 | II-5 |
| (12) | $f_W \cdot \tan(\omega - \omega_0)$ | 0.11625 | 0.15681 | 0.11943 | 0.11361 | 0.13778 |
| (13) | $f_4/f_T$ | 0.226 | 0.189 | 0.229 | 0.210 | 0.230 |
| (14) | $|M_1/M_2|$ | 0.730 | 1.005 | 0.659 | 0.860 | 1.215 |
| (15) | $|M_3/M_2|$ | 0.484 | 0.765 | 0.529 | 0.594 | 0.976 |
| (16) | $(m_{2T}/m_{2W})/(f_T/f_W)$ | 0.550 | 0.431 | 0.480 | 0.511 | 0.521 |
| (17) | $m_{3T}/m_{3W}$ | 1.504 | 1.572 | 1.726 | 1.457 | 1.519 |
| (18) | $(f_3^2 + f_4^2)/(f_W \cdot \tan\omega)$ | 6.83 | 7.07 | 6.82 | 6.83 | 7.34 |
| (19) | $(L_T - L_W)/(f_W \cdot \tan\omega)$ | 3.99 | 5.12 | 3.99 | 4.72 | 4.48 |
| (20) | $(L_T \cdot f_T)/f_4(f_W \cdot \tan\omega)$ | 104.2 | 133.1 | 102.7 | 112.1 | 102.4 |
| (21) | $(L_W \cdot f_T)/f_4(f_W \cdot \tan\omega)$ | 86.5 | 106.0 | 85.2 | 89.5 | 82.9 |
| (22) | $f_3/f_W \cdot \tan\omega$ | 4.75 | 4.85 | 4.67 | 4.68 | 4.84 |

Numerical Example III-1

The zoom lens system of Numerical Example III-1 corresponds to Embodiment III-1 shown in FIG. 17. Table III-1 shows the surface data of the zoom lens system of Numerical Example III-1. Table III-2 shows the aspherical data. Table III-3 shows various data.

TABLE III-1

(Surface data)

| Surface number | r | d | nd | vd |
|---|---|---|---|---|
| Object surface | ∞ | ∞ | | |
| 1 | 48.06627 | 1.31770 | 1.84666 | 23.8 |
| 2 | 31.48376 | 4.91580 | 1.49700 | 81.6 |
| 3 | 1728.23379 | 0.15000 | | |
| 4 | 27.88601 | 3.35970 | 1.73057 | 52.7 |
| 5 | 60.86419 | Variable | | |
| 6 | 39.64833 | 0.70000 | 2.00060 | 25.5 |
| 7* | 7.55348 | 4.40000 | | |
| 8 | −22.27615 | 0.98830 | 1.72949 | 53.0 |
| 9 | 16.58189 | 0.67210 | | |
| 10 | 16.63263 | 1.94860 | 1.94595 | 18.0 |
| 11 | −137.62919 | Variable | | |
| 12 (Diaphragm) | ∞ | 1.20000 | | |
| 13 | 8.51724 | 1.79450 | 1.68197 | 56.2 |
| 14 | 134.42539 | 2.46100 | | |
| 15* | 10.64755 | 2.00610 | 1.67606 | 53.7 |
| 16 | −8.26781 | 0.45330 | 1.72936 | 32.4 |
| 17 | 6.74795 | Variable | | |
| 18* | 12.89946 | 2.50000 | 1.53888 | 65.5 |
| 19 | −15.41242 | 0.45000 | 1.84541 | 24.2 |
| 20 | −29.55429 | Variable | | |
| 21 | ∞ | 0.78000 | 1.51680 | 64.2 |
| 22 | ∞ | (BF) | | |
| Image surface | ∞ | | | |

TABLE III-2

(Aspherical data)

Surface No. 7

K = 0.00000E+00, A4 = −2.33390E−05, A6 = −1.61626E−06,
A8 = 4.05408E−08 A10 = −7.54173E−10
Surface No. 15

K = 0.00000E+00, A4 = −3.37336E−04, A6 = −2.41260E−06,
A8 = −4.80071E−07 A10 = 1.21221E−08
Surface No. 18

K = 0.00000E+00, A4 = −2.10927E−05, A6 = 1.48017E−06,
A8 = −1.82833E−08 A10 = 0.00000E+00

TABLE III-3

(Various data)

Zooming ratio 17.67284

| | Wide-angle limit | Middle position | Telephoto limit |
|---|---|---|---|
| Focal length | 4.7526 | 33.0002 | 83.9918 |
| F-number | 2.92199 | 3.34254 | 5.12386 |
| View angle | 38.5613 | 6.2952 | 2.4247 |
| Image height | 3.6000 | 3.6000 | 3.6000 |
| Overall length of lens system | 73.9064 | 75.5308 | 88.5709 |
| BF | 0.87657 | 0.86700 | 0.84665 |
| d5 | 0.6000 | 24.7699 | 29.6745 |
| d11 | 30.6217 | 4.0296 | 2.4000 |
| d17 | 6.6771 | 4.5673 | 23.3280 |
| d20 | 5.0339 | 11.1999 | 2.2246 |
| Entrance pupil position | 18.6139 | 125.2091 | 213.4676 |
| Exit pupil position | −33.3561 | −30.4634 | 66.7590 |
| Front principal points position | 22.7067 | 123.4503 | 404.4897 |
| Back principal points position | 69.1538 | 42.5306 | 4.5791 |

| Magnification of zoom lens unit | | | | |
|---|---|---|---|---|
| Lens unit | Initial surface No. | Wide-angle limit | Middle position | Telephoto limit |
| 1 | 1 | 0.00000 | 0.00000 | 0.00000 |
| 2 | 6 | −0.26263 | −0.92704 | −1.90494 |
| 3 | 12 | −0.62020 | −2.46243 | −1.22591 |
| 4 | 18 | 0.60691 | 0.30070 | 0.74813 |

Numerical Example III-2

The zoom lens system of Numerical Example III-2 corresponds to Embodiment III-2 shown in FIG. 20. Table III-4 shows the surface data of the zoom lens system of Numerical Example III-2. Table III-5 shows the aspherical data. Table III-6 shows various data.

TABLE III-4

(Surface data)

| Surface number | r | d | nd | vd |
|---|---|---|---|---|
| Object surface | ∞ | ∞ | | |
| 1 | 45.58027 | 0.29880 | 1.84666 | 23.8 |
| 2 | 29.13959 | 4.64030 | 1.49700 | 81.6 |
| 3 | 3144.16519 | 0.15000 | | |

TABLE III-4-continued (Surface data)

| Surface number | r | d | nd | vd |
|---|---|---|---|---|
| 4 | 26.07049 | 3.15470 | 1.72500 | 54.0 |
| 5 | 64.13617 | Variable | | |
| 6* | 113.44694 | 1.40000 | 1.80470 | 41.0 |
| 7* | 6.91788 | 5.01430 | | |
| 8 | −14.58562 | 0.30000 | 1.71891 | 54.3 |
| 9 | 50.43219 | 0.30640 | | |
| 10 | 20.56042 | 1.77880 | 1.84700 | 23.8 |
| 11 | −25.90405 | 0.55000 | 1.72500 | 54.0 |
| 12 | −284.10307 | Variable | | |
| 13 (Diaphragm) | ∞ | 1.20000 | | |
| 14* | 10.21465 | 2.87650 | 1.59050 | 61.9 |
| 15 | −29.79241 | 2.19600 | | |
| 16 | 10.32052 | 1.11950 | 1.66979 | 56.9 |
| 17 | −41.94030 | 0.44920 | 1.71166 | 31.8 |
| 18 | 6.68552 | Variable | | |
| 19* | 14.65464 | 2.88740 | 1.60602 | 57.4 |
| 20 | −16.44133 | 0.54980 | 1.84704 | 23.8 |
| 21 | −37.86003 | Variable | | |
| 22 | ∞ | 0.78000 | 1.51680 | 64.2 |
| 23 | ∞ | (BF) | | |
| Image surface | ∞ | | | |

TABLE III-5

(Aspherical data)

Surface No. 6

K = 0.00000E+00, A4 = 2.01937E−04, A6 = −2.56319E−06,
A8 = 1.52224E−08 A10 = −3.89292E−11
Surface No. 7

K = 0.00000E+00, A4 = 2.05664E−04, A6 = 2.06908E−06,
A8 = 4.49468E−08 A10 = −1.25683E−09
Surface No. 14

K = 0.00000E+00, A4 = −1.72554E−04, A6 = 1.33674E−06,
A8 = −2.02892E−07 A10 = 7.52576E−09
Surface No. 19

K = 0.00000E+00, A4 = −1.62255E−05, A6 = 6.87596E−07,
A8 = −4.80109E−09 A10 = 0.00000E+00

TABLE III-6

(Various data)

Zooming ratio 17.66807

| | Wide-angle limit | Middle position | Telephoto limit |
|---|---|---|---|
| Focal length | 4.7532 | 32.9970 | 83.9796 |
| F-number | 2.92135 | 3.38151 | 5.08174 |
| View angle | 38.6042 | 6.2756 | 2.4298 |
| Image height | 3.6000 | 3.6000 | 3.6000 |
| Overall length of lens system | 70.6847 | 72.7597 | 88.0179 |
| BF | 1.17730 | 0.87395 | 0.89751 |
| d5 | 0.6000 | 21.7525 | 26.3849 |
| d12 | 26.7016 | 3.2299 | 2.1000 |
| d18 | 6.5447 | 4.4121 | 25.5257 |
| d21 | 6.0094 | 12.8395 | 3.4581 |
| Entrance pupil position | 17.8051 | 111.6713 | 199.0761 |
| Exit pupil position | −34.9864 | −32.7508 | 58.0796 |
| Front principal points position | 21.9335 | 112.2873 | 406.3912 |
| Back principal points position | 65.9315 | 39.7627 | 4.0383 |

TABLE III-6-continued (Various data)

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | −0.26635 | −0.92800 | −2.03523 |
| 3 | 13 | −0.76090 | −3.59377 | −1.40660 |
| 4 | 19 | 0.54536 | 0.23007 | 0.68213 |

Numerical Example III-3

The zoom lens system of Numerical Example III-3 corresponds to Embodiment III-3 shown in FIG. 23. Table III-7 shows the surface data of the zoom lens system of Numerical Example III-3. Table III-8 shows the aspherical data. Table III-9 shows various data.

TABLE III-7

(Surface data)

| Surface number | r | d | nd | vd |
|---|---|---|---|---|
| Object surface | ∞ | ∞ | | |
| 1 | 45.32568 | 1.30000 | 1.84666 | 23.8 |
| 2 | 31.96732 | 6.00000 | 1.49700 | 81.6 |
| 3 | −465.95760 | 0.15000 | | |
| 4 | 31.02235 | 3.20000 | 1.60311 | 60.7 |
| 5 | 70.61610 | Variable | | |
| 6 | 101.53090 | 0.70000 | 1.90366 | 31.3 |
| 7 | 7.86890 | 4.70000 | | |
| 8* | −20.55497 | 0.80000 | 1.66547 | 55.2 |
| 9* | 31.47034 | 0.85000 | | |
| 10 | 20.42499 | 2.45000 | 1.92286 | 20.9 |
| 11 | −33.42648 | 0.60000 | 1.83481 | 42.7 |
| 12 | 140.41630 | Variable | | |
| 13 (Diaphragm) | ∞ | 2.30000 | | |
| 14 | 8.34831 | 1.90000 | 1.69680 | 55.5 |
| 15 | 53.23219 | 2.25000 | | |
| 16* | 10.01290 | 1.58000 | 1.66547 | 55.2 |
| 17 | −22.10466 | 0.50000 | 1.71736 | 29.5 |
| 18 | 6.46268 | Variable | | |
| 19* | 13.27992 | 3.80000 | 1.60602 | 57.4 |
| 20 | −10.79685 | 0.60000 | 1.68893 | 31.2 |
| 21 | −52.08229 | Variable | | |
| 22 | ∞ | 1.50000 | 1.51633 | 64.0 |
| 23 | ∞ | (BF) | | |
| Image surface | ∞ | | | |

TABLE III-8

(Aspherical data)

Surface No. 8

K = −6.51516E+00, A4 = 1.83172E−04, A6 = −2.80928E−06,
A8 = 3.42057E−08 A10 = 9.87349E−10, A12 = −3.74201E−11
Surface No. 9

K = 1.96222E+01, A4 = 1.46869E−04, A6 = −5.98441E−06,
A8 = 1.36308E−07 A10 = −3.03194E−09, A12 = −4.21254E−12
Surface No. 16

K = 0.00000E+00, A4 = −3.48709E−04, A6 = −1.57547E−06,
A8 = −9.11687E−07 A10 = 4.51561E−08, A12 = 0.00000E+00

TABLE III-8-continued (Aspherical data)

Surface No. 19

K = 0.00000E+00, A4 = −7.49537E−06, A6 = 1.22932E−06,
A8 = −1.00174E−08 A10 = 0.00000E+00, A12 = 0.00000E+00

TABLE III-9

(Various data)

Zooming ratio 22.24156

|  | Wide-angle limit | Middle position | Telephoto limit |
|---|---|---|---|
| Focal length | 4.7300 | 32.3327 | 105.2017 |
| F-number | 2.93911 | 3.38403 | 5.23447 |
| View angle | 39.1735 | 6.3700 | 1.9176 |
| Image height | 3.6000 | 3.6000 | 3.6000 |
| Overall length of lens system | 77.0121 | 82.2972 | 96.7586 |
| BF | 0.37000 | 0.36999 | 0.36998 |
| d5 | 0.6545 | 25.5975 | 32.6534 |
| d12 | 28.6039 | 3.0484 | 1.3091 |
| d18 | 6.5672 | 6.0613 | 26.5797 |
| d21 | 5.6364 | 12.0401 | 0.6665 |
| Entrance pupil position | 19.6238 | 126.0506 | 272.8794 |
| Exit pupil position | −38.6210 | −42.0732 | 48.4452 |
| Front principal points position | 23.7800 | 133.7527 | 608.2910 |
| Back principal points position | 72.2821 | 49.9646 | −8.4431 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | −0.24250 | −0.80342 | −2.32434 |
| 3 | 13 | −0.73360 | −3.92128 | −1.15289 |
| 4 | 19 | 0.52565 | 0.20290 | 0.77615 |

Numerical Example III-4

The zoom lens system of Numerical Example III-4 corresponds to Embodiment III-4 shown in FIG. 26. Table III-10 shows the surface data of the zoom lens system of Numerical Example III-4. Table III-11 shows the aspherical data. Table III-12 shows various data.

TABLE III-10

(Surface data)

| Surface number | r | d | nd | vd |
|---|---|---|---|---|
| Object surface | ∞ | ∞ | | |
| 1 | 46.44500 | 1.30000 | 1.84666 | 23.8 |
| 2 | 32.72500 | 6.00000 | 1.49700 | 81.6 |
| 3 | −982.64300 | 0.15000 | | |
| 4 | 31.73700 | 3.20000 | 1.60311 | 60.7 |
| 5 | 80.08200 | Variable | | |
| 6 | 67.96500 | 0.70000 | 1.90366 | 31.3 |
| 7 | 7.58200 | 4.70000 | | |
| 8* | −19.90900 | 0.80000 | 1.66547 | 55.2 |
| 9* | 30.64300 | 0.85000 | | |
| 10 | 20.43900 | 2.45000 | 1.92286 | 20.9 |
| 11 | −35.61000 | 0.60000 | 1.83481 | 42.7 |
| 12 | 205.15200 | Variable | | |
| 13 (Diaphragm) | ∞ | 2.30000 | | |
| 14 | 8.34800 | 1.90000 | 1.69680 | 55.5 |
| 15 | 53.88700 | 2.25000 | | |
| 16* | 9.73700 | 1.58000 | 1.66547 | 55.2 |
| 17 | −19.97400 | 0.50000 | 1.71736 | 29.5 |
| 18 | 6.45700 | Variable | | |
| 19* | 13.57200 | 3.80000 | 1.60602 | 57.4 |
| 20 | −11.07700 | 0.60000 | 1.68893 | 31.2 |
| 21 | −48.33800 | Variable | | |
| 22 | ∞ | 1.50000 | 1.51633 | 64.0 |
| 23 | ∞ | (BF) | | |
| Image surface | ∞ | | | |

TABLE III-11

(Aspherical data)

Surface No. 8

K = −6.51516E+00, A4 = 1.89183E−04, A6 = −2.49064E−06,
A8 = 2.77094E−08 A10 = 6.84399E−10, A12 = −5.15964E−11

Surface No. 9

K = 1.96222E+01, A4 = 1.45171E−04, A6 = −5.85108E−06,
A8 = 1.29651E−07 A10 = −3.48894E−09, A12 = −1.54662E−11

Surface No. 16

K = 0.00000E+00, A4 = −3.55330E−04, A6 = −1.23807E−06,
A8 = −8.99076E−07 A10 = 4.13198E−08, A12 = 0.00000E+00

Surface No. 19

K = 0.00000E+00, A4 = −1.52310E−05, A6 = 8.65343E−07,
A8 = −6.40898E−09 A10 = 0.00000E+00, A12 = 0.00000E+00

TABLE III-12

(Various data)

Zooming ratio 16.56444

|  | Wide-angle limit | Middle position | Telephoto limit |
|---|---|---|---|
| Focal length | 4.5227 | 32.1468 | 74.9158 |
| F-number | 2.67412 | 3.40666 | 4.20747 |
| View angle | 40.1340 | 6.4020 | 2.7184 |
| Image height | 3.6000 | 3.6000 | 3.6000 |
| Overall length of lens system | 75.6478 | 82.5569 | 94.6221 |
| BF | 4.61064 | 2.39245 | 4.30248 |
| d5 | 0.6545 | 25.5587 | 32.3597 |
| d12 | 28.4185 | 2.2206 | 1.3091 |
| d18 | 5.4751 | 7.2857 | 20.7204 |
| d21 | 1.3091 | 9.9194 | 0.7504 |
| Entrance pupil position | 19.4978 | 118.9789 | 242.2873 |
| Exit pupil position | −28.7952 | −48.5941 | 77.6649 |
| Front principal points position | 23.4081 | 130.8573 | 393.7053 |
| Back principal points position | 71.1252 | 50.4101 | 19.7062 |

Magnification of zoom lens unit

| Lens unit | Initial surface No. | Wide-angle limit | Middle position | Telephoto limit |
|---|---|---|---|---|
| 1 | 1 | 0.00000 | 0.00000 | 0.00000 |
| 2 | 6 | −0.24005 | −0.75819 | −1.84676 |

TABLE III-12-continued (Various data)

| | | | | |
|---|---|---|---|---|
| 3 | 13 | −0.69140 | −3.95981 | −1.37544 |
| 4 | 19 | 0.53187 | 0.20899 | 0.57566 |

The following Table III-13 shows the corresponding values to the individual conditions in the zoom lens systems of the numerical examples.

Table III-13 (Corresponding Values to Conditions)

TABLE 3

| | | Numerical Example | | | |
|---|---|---|---|---|---|
| | Condition | III-1 | III-2 | III-3 | III-4 |
| (III-11) | d1NG/d1G | 0.13524 | 0.03625 | 0.12207 | 0.12207 |
| (1) | $(f_4 \cdot f_W \cdot \tan\omega)/L_W$ | 0.118 | 0.125 | 0.114 | 0.110 |
| (2) | $f_3/f_4$ | 0.854 | 0.851 | 0.941 | 0.917 |
| (3) | $(nd_4 - 1) + (nd_6 - 1)$ | 1.947 | 1.652 | 1.827 | 1.827 |
| (8) | dG3/dG | 0.236 | 0.240 | 0.199 | 0.199 |
| (9) | $(f_3^2 + f_4^2)/|f_2|$ | 2.98 | 3.44 | 3.15 | 3.07 |
| (10) | $m_{2T}/m_{34T}$ | 2.080 | 2.121 | 2.598 | 2.332 |
| (12) | $f_W \cdot \tan(\omega - \omega_0)$ | 0.1176 | 0.1215 | 0.1568 | 0.1275 |
| (13) | $f_4/f_T$ | 0.239 | 0.246 | 0.189 | 0.264 |
| (14) | $|M_1/M_2|$ | 1.018 | 0.909 | 1.005 | 1.490 |
| (15) | $|M_3/M_2|$ | 0.959 | 0.847 | 0.765 | 1.129 |
| (16) | $(m_{2T}/m_{2W})/(f_T/f_W)$ | 0.411 | 0.432 | 0.431 | 0.464 |
| (17) | $m_{3T}/m_{3W}$ | 1.974 | 1.849 | 1.572 | 1.990 |
| (18) | $(f_3^2 + f_4^2)/(f_W \cdot \tan\omega)$ | 6.98 | 7.16 | 7.07 | 7.04 |
| (19) | $(L_T - L_W)/(f_W \cdot \tan\omega)$ | 3.87 | 4.57 | 5.12 | 4.98 |
| (20) | $(L_T \cdot f_T)/f_4(f_W \cdot \tan\omega)$ | 97.7 | 94.1 | 133.1 | 97.2 |
| (21) | $(L_W \cdot f_T)/f_4(f_W \cdot \tan\omega)$ | 81.5 | 75.6 | 106.0 | 78.3 |
| (22) | $f_3/f_W \cdot \tan\omega$ | 4.53 | 4.64 | 4.85 | 4.76 |

INDUSTRIAL APPLICABILITY

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital still camera, a digital video camera or the like.

The invention claimed is:

1. A zoom lens system, in order from an object side to an image side, comprising a first lens unit having positive optical power, a second lens unit having negative optical power, a third lens unit having positive optical power, and a fourth lens unit having positive optical power, wherein
in zooming from a wide-angle limit to a telephoto limit, all of the first lens unit, the second lens unit, the third lens unit and the fourth lens unit move along an optical axis, and wherein
the following conditions are satisfied:

$$0.15 < dG3/dG < 0.27 \qquad (8)$$

here, $16 < f_T/f_W$ and $\omega > 35$
where,
dG 3 is an optical axial center thickness of the third lens unit,
dG is a sum of the optical axial thicknesses of the first lens unit, the second lens unit, the third lens unit and the fourth lens unit,
ω is a half view angle (°) at a wide-angle limit,
$f_T$ is a focal length of the entire system at a telephoto limit, and
$f_W$ is a focal length of the entire system at a wide-angle limit, wherein the third lens unit moves in a direction perpendicular to the optical axis.

2. An imaging device capable of outputting an optical image of an object as an electric image signal, comprising:
a zoom lens system that forms the optical image of the object; and
an image sensor that converts the optical image formed by the zoom lens system into the electric image signal, wherein
in the zoom lens system,
the zoom lens system, in order from an object side to an image side, comprises a first lens unit having positive optical power, a second lens unit having negative optical power, a third lens unit having positive optical power, and a fourth lens unit having positive optical power, wherein
in zooming from a wide-angle limit to a telephoto limit, all of the first lens unit, the second lens unit, the third lens unit and the fourth lens unit move along an optical axis, and wherein
the following conditions are satisfied:

$$0.15 < dG3/dG < 0.27 \qquad (8)$$

here, $16 < f_T/f_W$ and $\omega > 35$
where,
dG 3 is an optical axial center thickness of the third lens unit,
dG is a sum of the optical axial thicknesses of the first lens unit, the second lens unit, the third lens unit and the fourth lens unit,
ω is a half view angle (°) at a wide-angle limit,
$f_T$ is a focal length of the entire system at a telephoto limit, and
$f_W$ is a focal length of the entire system at a wide-angle limit, wherein the third lens unit moves in a direction perpendicular to the optical axis.

3. A camera for converting an optical image of an object into an electric image signal and then performing at least one of displaying and storing of the converted image signal, comprising
an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having positive optical power, a second lens unit having negative optical power, a third lens unit having positive optical power, and a fourth lens unit having positive optical power, wherein in zooming from a wide-angle limit to a telephoto limit, all of the first lens unit, the second lens unit, the third lens unit and the fourth lens unit move along an optical axis, and wherein the following conditions are satisfied:

$$0.15 < dG3/dG < 0.27 \tag{8}$$

here, $16 < f_T/f_W$ and $\omega > 35$ where, dG 3 is an optical axial center thickness of the third lens unit, dG is a sum of the optical axial thicknesses of the first lens unit, the second lens unit, the third lens unit and the fourth lens unit, $\omega$ is a half view angle (°) at a wide-angle limit, $f_T$ is a focal length of the entire system at a telephoto limit, and $f_W$ is a focal length of the entire system at a wide-angle limit, wherein the third lens unit moves in a direction perpendicular to the optical axis.

* * * * *